United States Patent
Kong

(10) Patent No.: US 12,496,083 B2
(45) Date of Patent: Dec. 16, 2025

(54) ATTACHMENT ASSEMBLY, CONTROL HANDLE, SERIES MOTION MECHANISM, AND MINIMALLY INVASIVE SURGICAL INSTRUMENT

(71) Applicant: WUHAN UNITED IMAGING HEALTHCARE SURGICAL TECHNOLOGY CO., LTD., Hubei (CN)

(72) Inventor: Wei-Yang Kong, Wuhan (CN)

(73) Assignee: WUHAN UNITED IMAGING HEALTHCARE SURGICAL TECHNOLOGY CO., LTD., Wuhan (CN)

( * ) Notice: Subject to any disclaimer, the term of this patent is extended or adjusted under 35 U.S.C. 154(b) by 560 days.

(21) Appl. No.: 18/009,735

(22) PCT Filed: Jun. 11, 2021

(86) PCT No.: PCT/CN2021/099803
§ 371 (c)(1),
(2) Date: Dec. 11, 2022

(87) PCT Pub. No.: WO2021/249550
PCT Pub. Date: Dec. 16, 2021

(65) Prior Publication Data
US 2023/0293200 A1 Sep. 21, 2023

(30) Foreign Application Priority Data

Jun. 12, 2020 (CN) .......................... 202010537152.0
Jun. 23, 2020 (CN) .......................... 202010580158.6
(Continued)

(51) Int. Cl.
*A61B 17/29* (2006.01)
*A61B 17/00* (2006.01)

(52) U.S. Cl.
CPC .... *A61B 17/2909* (2013.01); *A61B 17/00234* (2013.01); *A61B 2017/00314* (2013.01);
(Continued)

(58) Field of Classification Search
CPC .. A61B 17/320758; A61B 2017/00199; A61B 2017/0042; A61B 2017/00526;
(Continued)

(56) References Cited

U.S. PATENT DOCUMENTS 9,629,689 B2   4/2017   Bowles et al.
9,814,451 B2   11/2017  Sharma et al.
(Continued)

FOREIGN PATENT DOCUMENTS

CN   101785705 A   7/2010
CN   103269649 A   8/2013
(Continued)

OTHER PUBLICATIONS

Office Action of CN202010684267.2.
(Continued)

*Primary Examiner* — Shaun L David
*Assistant Examiner* — Rachael L Geiger

(57) ABSTRACT

Disclosed are a series motion mechanism and a minimally invasive surgical instrument. The series motion mechanism includes an attachment assembly attached to a wrist, a control handle, and a series joint including two joints. Rotation axes of the two joints are perpendicular to each other, the control handle and the attachment assembly are connected by the series joint to resolve a motion state of the control handle and convert the motion state into joint motions of the series joint.

17 Claims, 34 Drawing Sheets

(30) Foreign Application Priority Data

| | | | |
|---|---|---|---|
| Jul. 14, 2020 | (CN) | ................... | 202010678005.5 |
| Jul. 16, 2020 | (CN) | ................... | 202010684267.2 |
| Nov. 25, 2020 | (CN) | ................... | 202011336905.8 |

(52) U.S. Cl.
CPC ............ *A61B 2017/00442* (2013.01); *A61B 2017/291* (2013.01)

(58) Field of Classification Search
CPC ......... A61B 2017/00964; A61B 2017/320004; A61B 2017/00336; A61B 2017/00398; A61B 2017/00477; A61B 2017/00876; A61B 2017/22049; A61B 17/2909; A61B 17/00234; A61B 2017/00314; A61B 2017/00442; A61B 2017/291; A61B 90/11; A61B 2017/00367; A61B 2017/00424; A61B 2017/003; A61B 2017/2919; A61B 2017/00991; A61B 2017/2911

See application file for complete search history.

(56) References Cited

U.S. PATENT DOCUMENTS

| | | |
|---|---|---|
| 9,869,339 B2 | 1/2018 | Zimmerman et al. |
| 2011/0023283 A1 | 2/2011 | Blachon |
| 2013/0035698 A1 | 2/2013 | Stone et al. |
| 2014/0330288 A1 | 11/2014 | Date et al. |
| 2015/0327974 A1 | 11/2015 | Allen et al. |
| 2016/0303734 A1 | 10/2016 | Bowles et al. |
| 2017/0095236 A1 | 4/2017 | Sharma |
| 2017/0097035 A1 | 4/2017 | Zimmerman et al. |
| 2018/0125519 A1 | 5/2018 | Beira et al. |
| 2022/0175441 A1* | 6/2022 | Weber .................... A61B 17/29 |

FOREIGN PATENT DOCUMENTS

| | | | |
|---|---|---|---|
| CN | 105125241 A | 12/2015 | |
| CN | 105232095 A | 1/2016 | |
| CN | 105380748 A | 3/2016 | |
| CN | 205493953 U | 8/2016 | |
| CN | 106456164 A | 2/2017 | |
| CN | 206126732 U | 4/2017 | |
| CN | 107072684 A | 8/2017 | |
| CN | 107080588 A | 8/2017 | |
| CN | 206601253 U | 10/2017 | |
| CN | 108030518 A | 5/2018 | |
| CN | 108670320 A | 10/2018 | |
| CN | 108712886 A | 10/2018 | |
| CN | 109009261 A | 12/2018 | |
| CN | 109009262 A | 12/2018 | |
| CN | 209136784 U | 7/2019 | |
| CN | 110974319 A | 4/2020 | |
| CN | 111096800 A | 5/2020 | |
| CN | 111658025 A | 9/2020 | |
| CN | 211460502 U | 9/2020 | |
| CN | 111803144 A | 10/2020 | |
| CN | 111803210 A | 10/2020 | |
| CN | 111820961 A | 10/2020 | |
| CN | 212326467 U | 1/2021 | |
| CN | 112472296 A | 3/2021 | |
| JP | 2015080556 A | 4/2015 | |
| WO | WO-2017147607 A1 * | 8/2017 | ............ A61B 34/71 |
| WO | WO2019105289 A1 | 6/2019 | |
| WO | WO2019105350 A1 | 6/2019 | |
| WO | WO2019201774 A1 | 10/2019 | |
| WO | 2020038233 A1 | 2/2020 | |

OTHER PUBLICATIONS

International Search Report of PCT/CN2021/099803.
Chinese Office Action (CN Application No. 202010684267.2), dated Mar. 18, 2025, 5 pages.
European First Office Action (EP Application No. 21821155.5), dated Jun. 6, 2024, 6 pages.

* cited by examiner

A

ATTACHMENT ASSEMBLY, CONTROL HANDLE, SERIES MOTION MECHANISM, AND MINIMALLY INVASIVE SURGICAL INSTRUMENT

CROSS-REFERENCE TO RELATED APPLICATION

The present disclosure application is a U.S. National Stage of International Application No. PCT/CN2021/099803, filed on Jun. 11, 2021, which claims the priority of the Chinese patent application No. 202010537152.0, filed with China National Intellectual Property Administration on Jun. 12, 2020 and entitled "WRIST ATTACHMENT DEVICE AND REMOTE ACCESS DEVICE", Chinese patent application No. 202010580158.6, filed with China National Intellectual Property Administration on Jun. 23, 2020 and entitled "WRIST ATTACHMENT DEVICE AND REMOTE ACCESS DEVICE", Chinese patent application No. 202010678005.5, filed with China National Intellectual Property Administration on Jul. 14, 2020 and entitled "UNLIMITED-ROLLING-AND-ROTATING HANDLE STRUCTURE", Chinese patent application No. 202010684267.2, filed with China National Intellectual Property Administration on Jul. 16, 2020 and entitled "MINIMALLY INVASIVE SURGICAL INSTRUMENT", Chinese patent application No. 202011336905.8, filed with China National Intellectual Property Administration on Nov. 25, 2020 and entitled "SERIES MOTION MECHANISM, SURGICAL INSTRUMENT CONTROL MECHANISM AND HAND-HELD SURGICAL DEVICE", the entire contents of which are incorporated herein by reference.

TECHNICAL FIELD

The present application relates to the technical field of minimally invasive surgical instruments, in particular to an attachment assembly, a control handle, a series motion mechanism, and a minimally invasive surgical instrument.

BACKGROUND

Compared with a traditional open surgery, a minimally invasive surgery has the advantages of smaller surgical incision, less blood loss, smaller postoperative scars, and faster recovery time, which greatly reduces pains suffered by patients. At present, the minimally invasive surgery has been widely used in various fields of surgery, such as neurosurgery, brain surgery, urinary surgery, thoracic and abdominal surgery, gynecology, and urinary surgery.

A common minimally invasive surgical instrument includes a control assembly at a proximal end, a connecting rod, and an execution assembly (including a forceps instrument, a scissor instrument, a hook instrument, or a puncturing instrument) at a distal end, and a wire passes through the inside of the connecting rod to achieve the effects that the controller at the proximal end can manipulate the execution assembly at the distal end. Execution assemblies of different types at the distal end are used to complete surgical operations such as cutting, clamping, suturing, pulling and dissociating organs and tissues. However, the common minimally invasive surgical instrument has too many parts, a complex structure and an expensive production cost, which makes it inconvenient to use and promote the instrument.

SUMMARY

According to various embodiments of the present application, an attachment assembly, a control handle, a series motion mechanism, and a minimally invasive surgical instrument are provided.

An attachment assembly according to an embodiment of the present application, includes:
  a fixing member, the fixing member being in a shape of a ring, an inner side of the fixing member having a first surface in a shape of a spherical ring, and the sphere center of the first surface being located between two side edges of the first surface;
  an attachment member, the attachment member being in a shape of a ring, an outer side of the attachment member having a second surface in a shape of a spherical ring, the sphere center of the first surface being coincident with a sphere center of the second surface, the second surface being at least partially in contact with the first surface, and a width of the second surface being less than a width of the first surface, the attachment member being capable of rolling freely relative to the fixing member, and a rolling center of the attachment member being the sphere center of the first surface.

An attachment assembly according to another embodiment of the present application, includes:
  a fixing member, the fixing member is in a shape of a ring;
  an attachment member, detachably connected to the fixing member; and
  an sleeve member, attached to an inner side of the attachment member and configured to be attached to a user's forearm or wrist.

A control handle of an embodiment of the present application, includes:
  a basal body structure; and
  a thumbwheel structure, comprising:
    a thumbwheel case, one end of the thumbwheel case defines a wire inlet hole, and the other end of the thumbwheel case is rotatably connected to the basal body structure;
    a wire transferring member, movable inside the thumbwheel case; and
    a wire, configured to enter the thumbwheel case through the wire inlet hole, and be transferred by the wire transferring member, and then be connected to the basal body structure;
    while connecting the wire, the wire transferring member also enables one wire connected to a front of the wire connector and another wire connected to a rear of the wire connector to rotate relatively around the axial direction.

A series motion mechanism of an embodiment of the present application includes:
  an attachment assembly, attached to a wrist;
  a control handle; and
  a series joint, comprising two joints. Rotation axes of the two joints are perpendicular to each other, the control handle and the attachment assembly are connected by the series joint to resolve a motion state of the control handle and convert the motion state into joint motions of the series joint.

A minimally invasive surgical instrument of an embodiment of the present application, includes:

a main control assembly;

an execution assembly; and a connection assembly, disposed between the main control assembly and the execution assembly, and including:

a master transmission mechanism, including a master transmission basal body and a master transmitting member, the master transmission basal body being fixedly connected to the main control assembly configured to output an execution action, the master transmitting member being disposed on the master transmission basal body, and the master transmitting member being further drivably connected to the main control assembly;

a slave transmission mechanism, including a slave transmission basal body and a slave transmitting member, the slave transmission basal body being fixedly connected to the execution assembly configured to receive an execution action, the slave transmitting member being disposed on the slave transmission basal body, and the slave transmitting member being further drivably connected to the execution assembly.

The master transmission basal body is detachably engaged with the slave transmission basal body; and when the master transmission basal body engages with the slave transmission basal body, the master transmitting member is drivably connected to the slave transmitting member.

Details of one or more embodiments of the present application are set forth in the accompanying drawings and the description below. Other features, objectives and advantages of the present application will become obvious from the description, the drawings and the claims.

BRIEF DESCRIPTION OF THE DRAWINGS

To better describe and illustrate the embodiments and/or examples of the present disclosure herein, reference may be made to one or more of the accompanying drawings. The additional details or examples used to describe the drawings should not be considered to limit the scope of any one of the present disclosure, the embodiments and/or examples described herein, and the preferred modes of the application presently understood.

DETAILED DESCRIPTION OF THE EMBODIMENTS

The principles and features of the present application will be described hereinafter with reference to the accompanying drawings. The examples are only used to illustrate the present application, but not intended to limit the scope of the present application. The present application is described more specifically by means of example with reference to the accompanying drawings in the following paragraphs. Advantages and features of the present application will become more obvious from the description and claims below. It should be noted that, the accompanying drawings are all provided in a very simplified form and in inaccurate scales, and are only used to conveniently and clearly illustrate the purpose of the embodiments of the present application.

A minimally invasive surgical instrument is a principal tool for completing a minimally invasive surgery, generally including a main control assembly at a proximal end and an execution assembly at a distal end. The main control assembly at the proximal end enables the doctor to operate, and the main control assembly at the proximal end and the execution assembly at the distal end are drivably connected, thus the execution assembly at the distal end may perform corresponding actions according to the operation actions of a surgeon, such as cutting, clamping, suturing, pulling or dissociating, etc. The present application provides a connection assembly, which not only can realize a fixed connection between the main control assembly at the proximal end and the execution assembly at the distal end to make the two assemblies an entirety, but also can realize a drivable connection between the main control assembly at the proximal end and the execution assembly at the distal end, thereby ensuring that the execution assembly at the distal end executes corresponding actions under the control of the main control assembly at the proximal end. It can be understood that the connection assembly provided in the present application not only can be applied to the minimally invasive surgical instrument, but also can be applied to any other structure whose rigid parts are butted and flexible parts therein are drivably connected. The connection assembly applied in the minimally invasive surgical instrument is taken as an example for description. It can be understood that the connection assembly described in the following embodiments can be applied to other application scenarios by simply making adaptive deformation.

Figure 1:
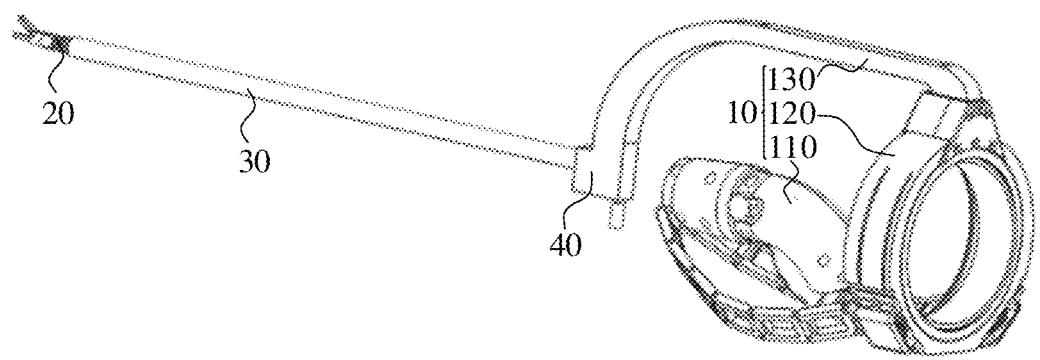
FIG. 1 is a schematic structural view of a minimally invasive surgical instrument according to an embodiment of the present application.

As shown in FIG. 1, an embodiment of the present application provides a minimally invasive surgical instrument, including a main control assembly 10, an execution assembly 20, and a connection assembly 40. The connection assembly 40 is disposed between the main control assembly 10 and the execution assembly 20.

In an embodiment, as shown in FIG. 1, the main control assembly 10 includes a control handle 110, an attachment assembly 120, and a frame 130. The attachment assembly 120 is connected to an end of the frame 130 and the control handle 110, respectively.

Figure 2:
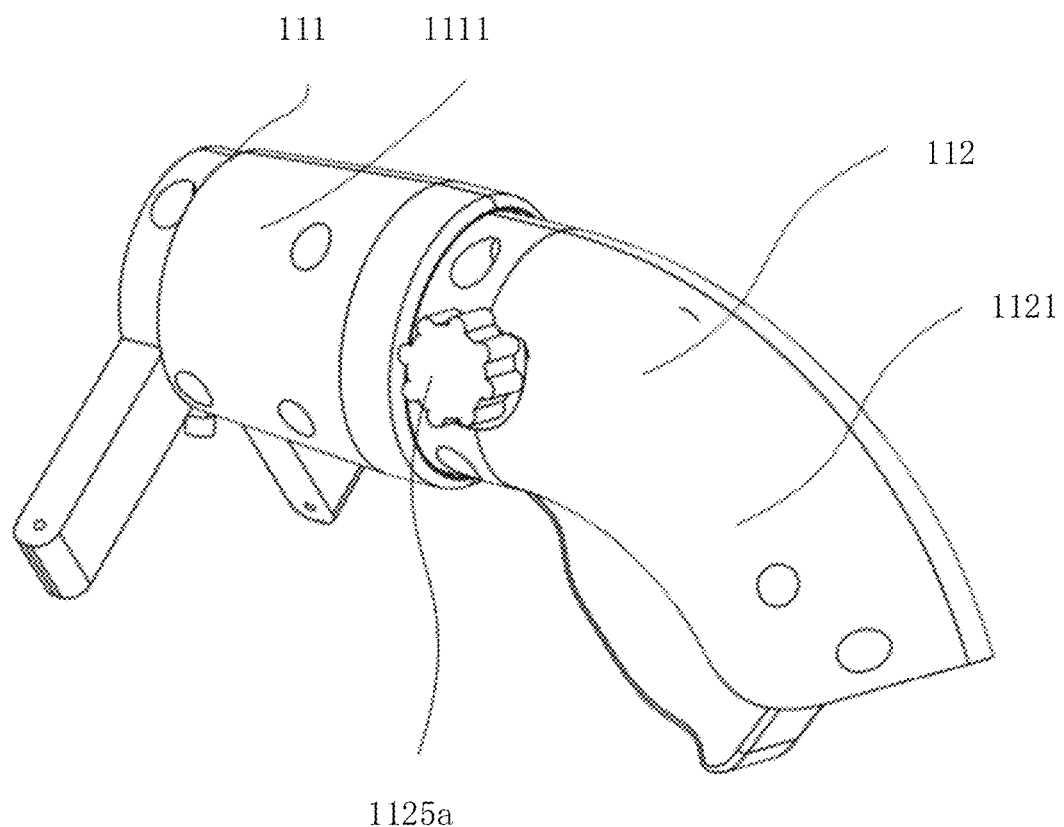
FIG. 2 is a schematic structural view of a control handle according to an embodiment of the present application.

In an embodiment, as shown in FIG. 2, the control handle 110 includes a thumbwheel structure 111 and a basal body structure 112. The thumbwheel structure 111 is connected to the basal body structure 112, and the basal body structure 112 may rotate relative to the thumbwheel structure 111 without restriction. During use, the basal body structure 112 functions as a holding part, and the basal body structure 112 is bent to be curved to fit a holding posture of a human body.

Figure 3:
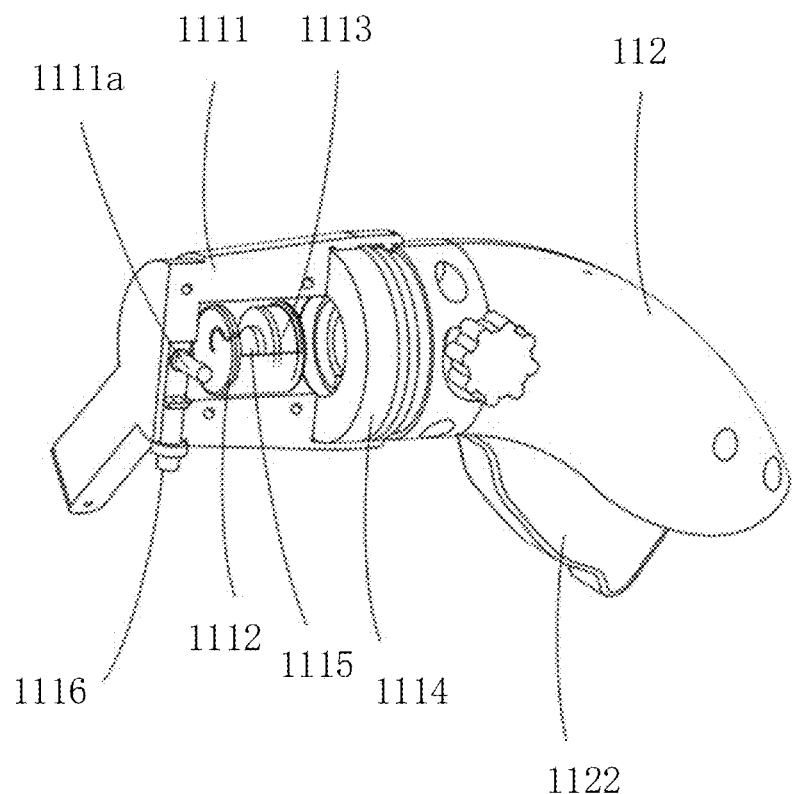
FIG. 3 is a schematic structural view of a thumbwheel structure in FIG. 2.

Specifically, as shown in FIG. 2-3, the thumbwheel structure 111 includes a thumbwheel case 1111, a wire transferring member and a wire. One end of the thumbwheel case 1111 defines a wire inlet hole, and the other end thereof is rotatably connected to the basal body structure. The wire transferring member is movable inside the thumbwheel case 1111. The wire enters the thumbwheel case 1111 through the wire inlet hole, and is transferred by the wire transferring member, and then connected to the basal body structure 112. While connecting the wire, the wire transferring member also enables one wire connected to the front of the wire connector and another wire connected to the rear of the wire connector to rotate relatively around the axial direction.

Specifically, the wire transferring member includes a slidable member 1112 and a rotatable member 1113. A receiving cavity is formed in the thumbwheel case 1111 along a length direction of the thumbwheel case 1111. The slidable member 1112 is slidably arranged inside the receiving cavity. The rotatable member 1113 is rotatably connected to the slidable member 1112. The wire includes a first wire and a second wire. The first wire passes through the wire inlet hole and is connected to the slidable member 1112, and one end of the second wire is connected to the rotatable member 1113, and the other end of the second wire is connected to the basal body structure 112. When the basal body structure 112 rotates, the second wire drives the rotatable member 1113 to rotate relative to the slidable member 1112, and the first wire connected to the execution assembly 20 outside the control handle 110 will not rotate along with the basal body structure 112, thereby preventing the wire from being entangled inside, and achieving the effect that the basal body structure 112 rotates relative to the thumbwheel structure 111 without restriction.

Optionally, the slidable member 1112 may translate in the receiving cavity to change a length of a section of the first wire outside the control handle 110, so as to achieve the effect that the first wire regulates the execution assembly 20 outside the control handle 110. For the slidable member 1112, it only needs to be able to translate in the receiving cavity, so it is not limited to a structure having a specific shape. For example, in some similar embodiments, the slidable member 1112 is a disc or a stripped member, and the volume of the disc or stripped member is smaller than the volume of the receiving cavity, and the disc or stripped member may translate in the receiving cavity.

In some embodiments, the slidable member 1112 is rod-shaped. One end of the slidable member is connected to the first wire, and the other end is movably connected to the rotatable member 1113. The rotatable member 1113 is rod-shaped. One end of the rotatable member 1113 is movably connected to the slidable member 1112, and the other end of the rotatable member 1113 is connected to the second wire.

In this embodiment, the slidable member 1112 includes a cylindrical sliding portion, a front fixing member installed at one end of the sliding portion opposite to the wire inlet hole, and a rear fixing member installed at the other end of the sliding portion. An outer wall of the sliding portion slidably contacts an inner wall of the receiving cavity, and the rotatable member 1113 is arranged inside the slidable member 1112 and rotatably connected to the rear fixing member. The rear fixing member is annular, and the second wire passes through the rear fixing member and is connected to the rotatable member 1113.

In this embodiment, as shown in FIG. 2, the slidable member 1112 is cylindrical, and a length of the slidable member 1112 is less than a length of the receiving cavity, and the shape of the outer wall of the slidable member 1112 matches with the inner wall of the receiving cavity, so that the slidable member 1112 can only translate inside the receiving cavity, thereby preventing the slidable member 1112 in use from shaking and colliding with the inner wall of the receiving cavity and thus reducing the service life. The equipment of the present application belongs to a precision equipment, which requires high precision, and the cylindrical slide may improve the stability of slide. Cooperating with the built-in rotatable member 1113, on the one hand, the equipment may ensure that the sliding member 1112 has a certain length, thereby ensuring the stability of slide. Moreover, the rotatable member 1113 is prevented from occupying a space, which is beneficial to a reduction of a space occupancy rate of the entire equipment. It should be noted that, in other embodiments, the slide between the slidable member 1112 and the inner wall of the receiving cavity may be realized in other ways.

Further, a curved through hole is defined in the front fixing member of the slidable member 1112, and one end of the first wire extends into the curved through hole and is fixed with the slidable member 1112. In order to facilitate the fixing of the first wire on the slidable member 1112, in this embodiment, as shown in FIG. 2, the rotatable member 1113 is a bearing, having a first rotatable part and a second rotatable part. The first rotatable part and the second rotatable part are rotatably connected, the first rotatable part is fixedly installed at one end of the slidable member away from the wire inlet, and the second rotatable part is fixed with one end of the first wire.

Further, as shown in FIG. 3, the thumbwheel structure 111 further includes a wire tying pin 1115. The wire tying pin 1115 is fixed with a portion of the rotatable member 1113, which portion is movable relative to the basal body structure 112. One end of the second wire is tied to the wire tying pin 1115, thus realizing the effect that the second wire is rotatable relative to the basal body structure 112, which also facilitates the fixing of the second wire on the rotatable member 1113.

Further, as shown in FIG. 3, the thumbwheel structure 111 further includes a thrust bearing 1114. The thrust bearing 1114 is embedded on the inner wall of the thumbwheel case 1111, the basal body structure 112 is connected to the thrust bearing 1114, and the basal body structure 112 is rotatably connected to the thumbwheel case 1111 by the thrust bearing 1114, thus facilitating a smooth rotation between the basal body structure 112 and the thumbwheel case 1111.

Further, as shown in FIG. 3, the thumbwheel structure 111 further includes a wire inlet connector 1116. The inner wall of the thumbwheel case 1111 protrudes to form a wire winding shaft 1111a, and the wire inlet connector 1116 is embedded on the inner wall of the thumbwheel case 1111. One end of the wire inlet connector 1116 is disposed outside the thumbwheel case 1111, and the other end of the wire inlet connector 1116 is disposed inside the thumbwheel case 1111, thus making the wire easily enter the thumbwheel structure 111. The first wire enters the thumbwheel case 1111 through the wire inlet connector 1116, and winds around the wire winding shaft 1111a, and then is fixed on the basal body structure 112.

For the basal body structure 112, it only needs to be able to be movably connected to the thumbwheel case 1111. Therefore, aiming at the technical problem of "rolling and rotating without restriction", the structure of the basal body structure 112 needs not to be specially limited. It should be understood that the basal body structure 112 is a conventional structure in the art.

In this embodiment, the basal body structure 112, as the holding part, is bent to have an arc shape to fit the shape of the hand for holding, which is more ergonomic.

Figure 4:
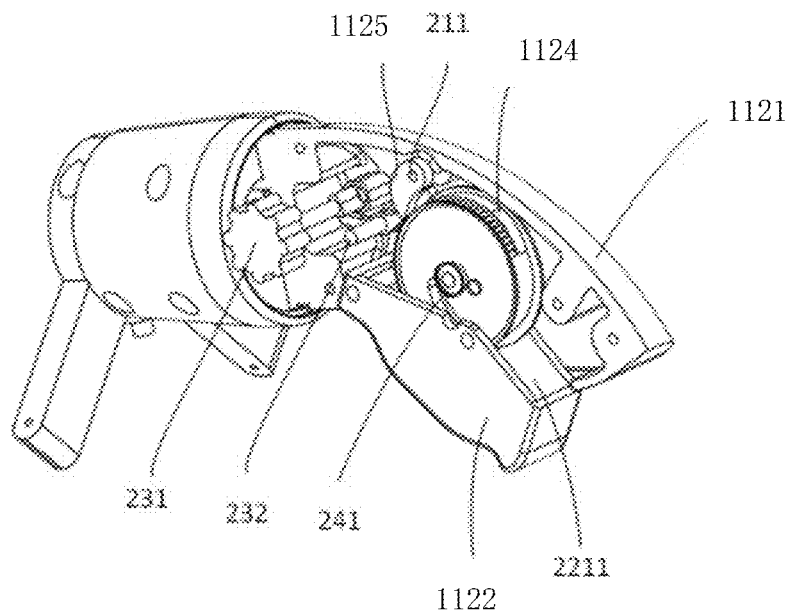
FIG. 4 is a schematic structural view of a basal body structure in FIG. 2.

Specifically, as shown in FIG. 4, the basal body structure 112 includes a handle case 1121, a driving member 1122, a position moving member 1124, and a limiting member 1125. The handle case 1121 is rotatably connected to the thumbwheel case 1111, and the position moving member 1124 is arranged inside the handle case 1121 and rotatably connected to the inner wall of the handle case 1121. One end of the second wire away from the thumbwheel structure 111 is connected to the position moving member 1124. One end of the driving member 1122 is connected to the position moving member 1124, and the other end of the driving member 1122 is configured to pass through the handle case 1121 to drive the position moving member 1124 to rotate by a set rotation angle relative to the handle case 1121. The limiting member 1125 is configured to abut against the position moving member 1124 and configured to controllably limit the position moving member 1124 to rotate in one direction only.

The end of the second wire entering the basal body structure 112 is wound around the position moving member 1124. The driving member 1122 drives the position moving member 1124 to rotate, thus shortening the second wire. The slidable member 1112 is pulled to translate inside the receiving cavity, so that the length of the section of the wire, which is outside the handle structure that is capable of rolling and rotating without restriction, may be shortened, thus achieving the effect of regulating the controlled unit. The limiting member 1125 restricts the position moving member 1124 to rotate in one direction, thereby forcing the position moving member 1124 to maintain a current rotating state, and realizing an automatic locking for the position moving member 1124, so that there is no need to control the rotating state of the rotation member (such as stop operating the driving member) all the time, thereby greatly improving the experience during use.

In this embodiment, the handle case 1121 is connected to the thrust bearing 1114 to realize the rotational connection between the handle case 1121 and the thumbwheel case 1111. For the driving member 1122, it only needs to be operable to drive the position moving member 1124 to rotate. In some embodiments, the driving member 1122 includes a connecting rod and a rotating wheel. One end of the connecting rod is coaxially connected to the position moving member 1124, and the other end of the connecting rod is coaxially connected to the rotating wheel. When the rotating wheel is rotated, the position moving member 1124 also rotates, thus forcing the second wire to be shortened.

Figure 7:
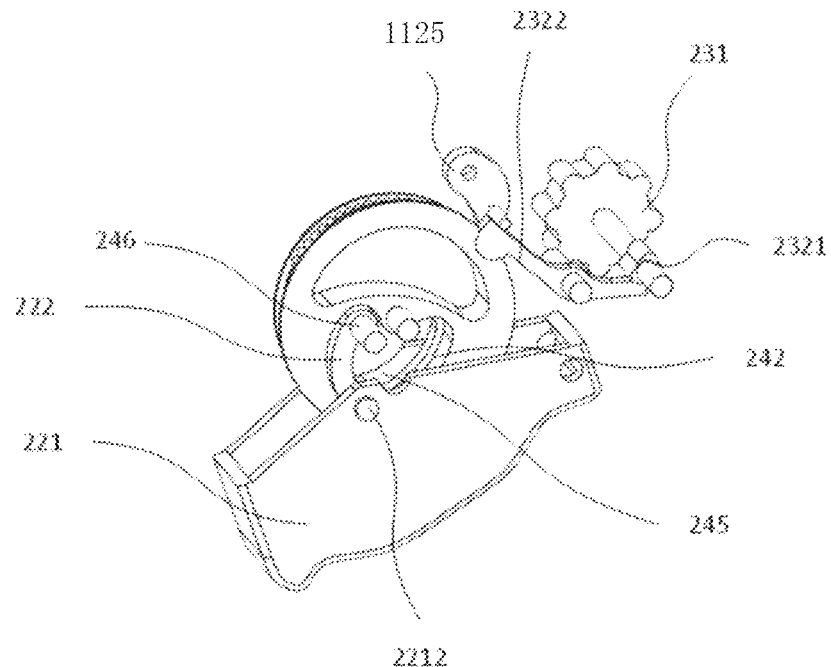
FIG. 7 is an assembly schematic view showing a driving member, a limiting member, the position moving member and the control part in FIG. 4.

In this embodiment, as shown in FIG. 7, the driving member 1122 includes a handle 221 and a curved connecting rod 222. One end of the handle 221 is hinged with the handle case 1121, and the other end of the handle 221 forms a driving side and a connecting side. The driving side at least partially exits through the handle case 1121, and the connecting side at least partially extends into the handle case 1121 and is hinged with one end of the curved connecting rod 222. The other end of the curved connecting rod 222 is hinged with the position moving member 1124. In this way, it is convenient for the user to operate with one hand.

For the position moving member 1124, it only needs to be operable to wind the second wire.

Further, an assembling groove 242 is disposed on the position moving member 1124, and an curved through hole 245 is defined in the bottom surface of the assembling groove 242. The bottom surface of the assembling groove 242 protrudes to form a rotation shaft 246, and a receiving groove 2211 is disposed on a surface of the handle 221, which is proximate to the position moving member 1124. Part of the position moving member 1124 extends into the receiving groove 2211. The curved connecting rod 222 is arranged in the assembling groove 242, and one end of the curved connecting rod 222 is sleeved on the rotation shaft 246. The curved through hole 245 is centered on the rotation shaft 246. A connecting rod 1124e is arranged between side walls of the receiving groove 2211, and the connecting rod 1124e is configured to pass through the curved through hole 245 and the other end of the curved connecting rod 222, thus reducing a space for engagement between the position moving member 1124 and the handle 221, and saving the internal space of the basal body structure 112, so that the basal body structure 112 will not be too bulky and is convenient to be held.

When the other end of the handle 221 is pinched, the handle 221 rotates relative to the handle case 1121, the connecting rod 1124e moves along the curved through hole 245, and the curved connecting rod 222 pushes the position moving member 1124 to rotate. In terms of volume, since the ratchet partially extends into the receiving groove 2211, the space for engagement between the position moving member 1124 and the handle 221 is reduced, thereby effectively saving the internal space of the basal body structure 112.

In order to fix the second wire on the position moving member 1124 easily, the surface of the position moving member 1124 extends in the axial direction to form a boss 241, and a wire winding track is arranged along the circumferential direction of the boss 241, and the second wire entering the basal body structure 112 is wound around the wire winding track.

In this embodiment, the position moving member 1124 is in a shape of a disc, and an outer peripheral surface thereof has a controlling track along the circumferential direction. The limiting member 1125 abuts against the controlling track and may controllably restrict the position moving member 1124 to rotate in one direction only.

Figure 6:
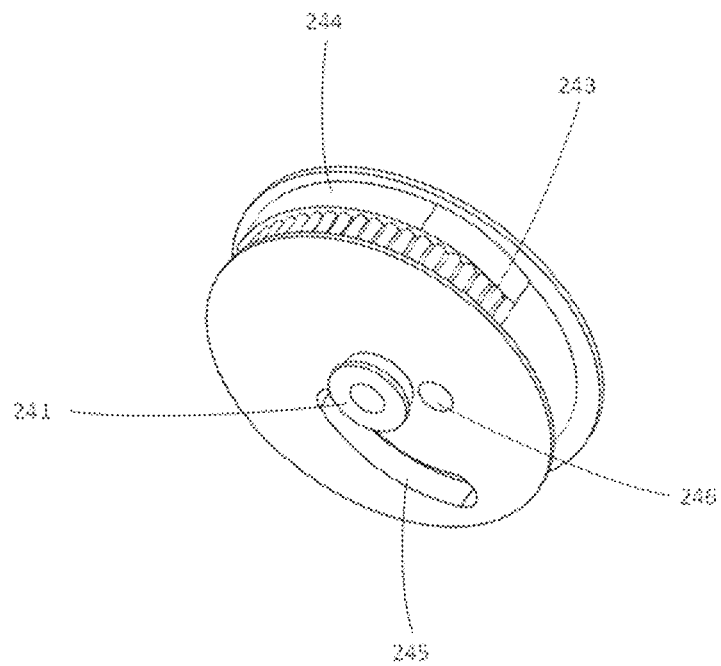
FIG. 6 is a schematic structural view of a position moving member in FIG. 4.

In some embodiments, as shown in FIG. 6, the controlling track is a rugged track 243, and the rugged track includes a curved sliding track arranged circumferentially along the outer peripheral surface of the rotatable member and a plurality of protrusions or grooves evenly arranged along the curved sliding track.

Further, as shown in FIGS. 2-4, the limiting member 1125 includes a limiting part, an elastic part and a control part 1125a. One end of the limiting part is hinged on the inner wall of the handle case 1121, and one end of the elastic part is connected to the limiting part and generates an elastic force to drive the limiting part to rotate forwards, till the other end of the limiting part abuts between two adjacent protrusions or abuts inside one of the grooves on the rugged track. One end of the control part 1125a is connected to the limiting part, and the other end of the control part protrudes from the handle case 1121 and is configured to drive the limiting part to rotate reversely, till the other end of the limiting part disengages from the rotation member. Optionally, the elastic part is a torsion spring.

For the control part 1125a, it only needs to disengage the limiting part from the position moving member 1124. In some embodiments, the control part 1125a is a rope. One end of the rope is connected to the end of the limiting part, which is in contact with the position moving member 1124. When the restraint on the position moving member 1124 needs to be removed, the rope is pulled, so that the end of the limiting part, which is in contact with the position moving member 1124, moves and disengages from the position moving member 1124, thereby removing the restriction on the position moving member 1124.

Figure 5:
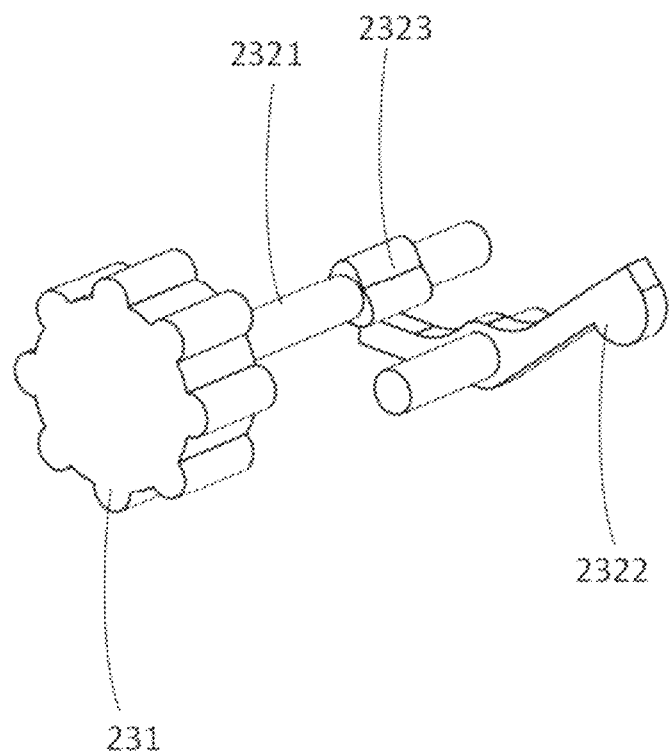
FIG. 5 is a schematic structural view of a control part in FIG. 4.

As shown in FIGS. 5-7, the control part 1125a includes a wheel 231 and a transmitting member 232. The wheel 231 is rotatably arranged on the handle case 1121, and is connected to one end of the transmitting member 232. The other end of the transmitting member 232 is connected to the limiting part, and the transmitting member 232 is configured to convert the rotation amount of the wheel 231 into a force that pushes the limiting part to swing relative to the handle case 1121, thus forcing the limiting part to be switched between two states of abutting against the position moving member 1124 and not.

Further, as shown in FIGS. 5-7, the transmitting member 232 includes a rotatable rod 2321 and a driving lever 2322. One end of the rotatable rod 2321 is fixed on the wheel 231, and the surface of the other end of the rotatable rod 2321 partially protrudes to form a cam 2323. The middle portion of the driving lever 2322 is hinged with the handle case 1121, one end of the driving lever 2322 abuts against the cam 2323, and the other end of the driving lever 2322 abuts against the limiting part. While rotating, the wheel 231 drives the cam 2323 to rotate, and forces the driving lever 2322 to swing to push the limiting part, thereby achieving the effect that the limiting part can disengage from the position moving member 1124 locked at any position, to release the position moving member 1124.

In other embodiments, as shown in FIG. 6, the controlling track includes the rugged track 243 and a smooth track 244 arranged in parallel. The rugged track 243 includes the curved sliding track arranged circumferentially along the outer peripheral surface of the rotatable member and the plurality of protrusions or grooves evenly arranged along the curved sliding track. The smooth track 244 is a curved sliding track, which has a stroke start end protruding from the rugged track 243 and a stroke terminal end smoothly transitioning to the rugged track 243, and the smooth track 244 is gradually widened from the stroke start end to the stroke terminal end. The width of the rugged track 243 gradually decreases from a stroke start end to a stroke terminal end of the rugged track. Correspondingly, the limiting member 1125 includes the limiting part and the elastic part. One end of the limiting part is hinged on the inner wall of the handle case 1121, and a working end of the elastic part is connected to the limiting part and produces the elastic force, which drives the limiting part to translate from the rugged track 243 to the smooth track 244 and drives the limiting part to rotate, till the other end of the limiting part abuts against the controlling track. Optionally, the elastic part is the torsion spring.

When the limiting part reaches the end of the rugged track 243, it is pushed by the torsion spring, so that the limiting part translates along the axis of the pin roll 211, enters the smooth track 244, and releases the locked part of the position moving member 1124. Moreover, the smooth track 244 becomes narrower and narrower from the start end to the terminal end. When the limiting part reaches the terminal end of the smooth track 244, since the terminal end of the smooth track 244 is narrowed, the limiting part is pushed into the rugged track 243. Such a structure may achieve the effect of being helpful for the limiting member to switch a track, so that, after reaching a limit, the locking state of the limiting part and the position moving member 1124 may be automatically released.

Further, since the driving member 1122 only drives the position moving member 1124 to rotate by a certain angle, the rugged track 243 and the smooth track 244 need not to be arranged to surround the circumferential surface of the ratchet, but instead a corresponding radian of the rugged track 243 and the smooth track 244 is equal to a corresponding radian of the curved through hole 245.

Figure 8:
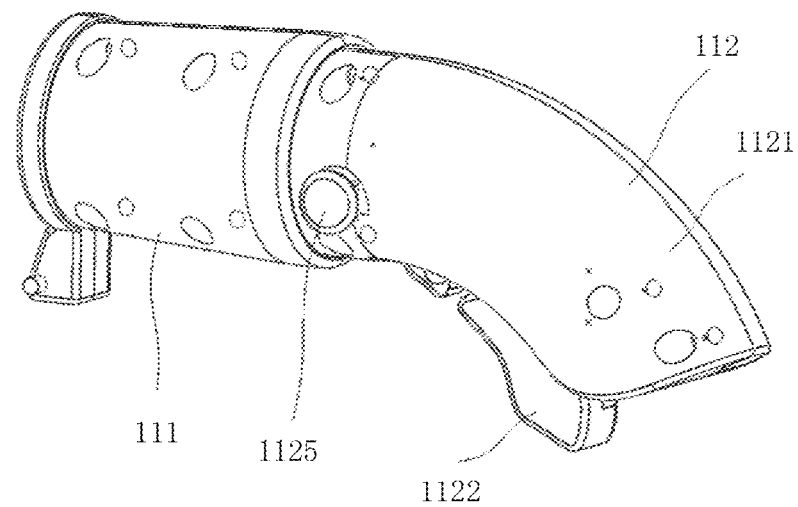
FIG. 8 is a schematic structural view of the control handle according to another embodiment of the present application.
Figure 9:
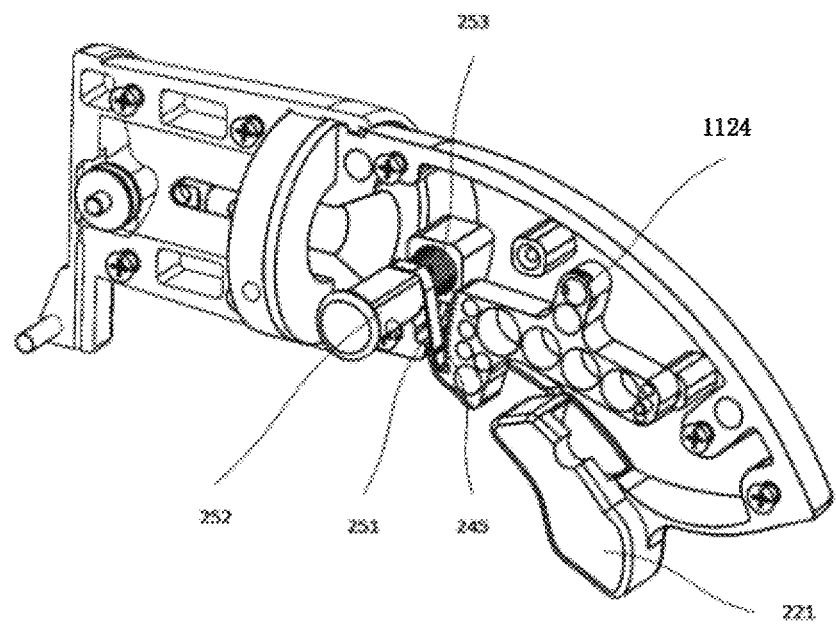
FIG. 9 is schematic sectional view of the basal body structure in FIG. 8.
Figure 10:
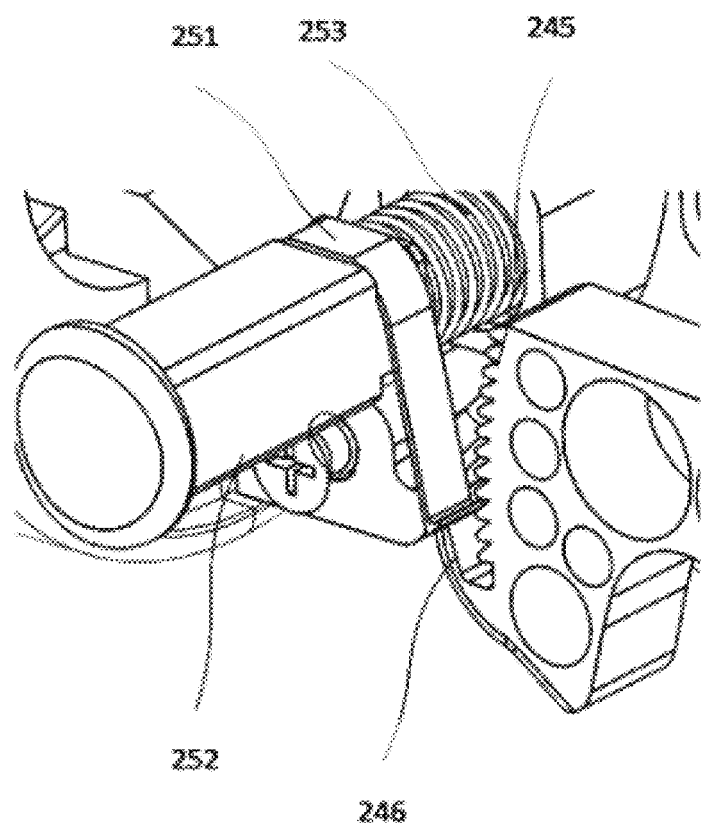
FIG. 10 is an enlarged schematic view showing a limiting member in FIG. 9.

As shown in FIG. 8-10, in another embodiment, the position moving member 1124 is in a shape of a bar, one end of the position moving member 1124 is movably connected to the inner wall of the handle case 1121, and the end surface of the other end is provided with a plurality of wave-shaped teeth 245 for clamping. The driving member 1122 is disposed on the position moving member 1124 and at least partially exits through the handle case 1121. The limiting member 1125 includes a steel sheet 251 with a certain elasticity, a fixing part 252, and a position moving spring 253. One end of the steel sheet 251 away from the position moving member 1124 is fixed on the fixing part 252, and a side surface of the steel sheet 251 facing the position moving member 1124 protrudes to form a protrusion, and a shape of the protrusion is similar to the shape of the wave-shaped teeth 245. In an unstressed state, positions of the protrusion and the wave-shaped teeth 245 are staggered. One end of the position moving spring 253 is fixed to one end of the fixing part 252, and the other end of the position moving spring is fixed to the inner wall of the handle case 1121. When an external force is applied, the position moving spring 253 extends and retracts in the direction perpendicular to the inner wall of the handle case 1121. The other end of the fixing part 252 movably passes through the handle case 1121, and the end of the fixing part outside the handle case 1121 forms a button.

In the embodiment above, the end of the position moving member 1124 proximate to the limiting member 1125 extends to form an anti-reverse abutting member 246, and the anti-reverse abutting member 246 abuts against a surface of the steel sheet 251 away from the position moving member 1124.

In use of the embodiment above, when the driving member 1122 is pinched, the end of the driving member 1122 abutting against the position moving member 1124 pushes the position moving member 1124 to rotate. At this time, the protruding portion is not in contact with the wave-shaped teeth 245, and the position moving member 1124 may rotate freely to pull the second wire. When a locking is required, the button is pressed, so that the position moving spring 253 is compressed, and the steel sheet 251 contacts the position moving member 1124, and the protruding part and the wave-shaped teeth 245 are clamped, and the friction forces between the protruding part and the wave-shaped teeth 245 keep the position moving spring 253 in the compressed state, thereby achieving the purpose of locking. If the wave-shaped teeth 245 are arranged densely enough, the effect of a stepless locking of the second wire may be achieved. When a releasing is required, the button is plucked to break the friction forces between the protrusion and the wave-shaped teeth 245, and the steel sheet 251 disengages from the position moving member 1124, and the position moving member 1124 is released.

Figure 11:
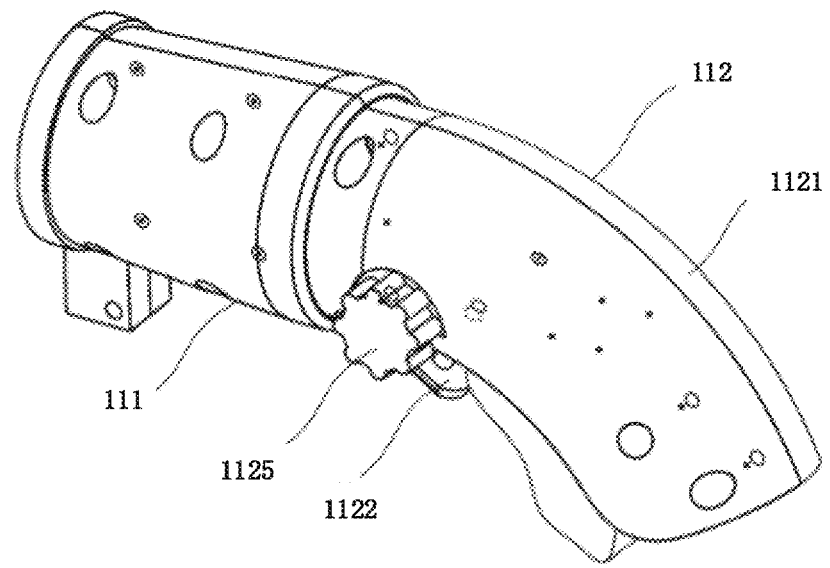
FIG. 11 is a schematic structural view of the control handle according to yet another embodiment of the present application.
Figure 12:
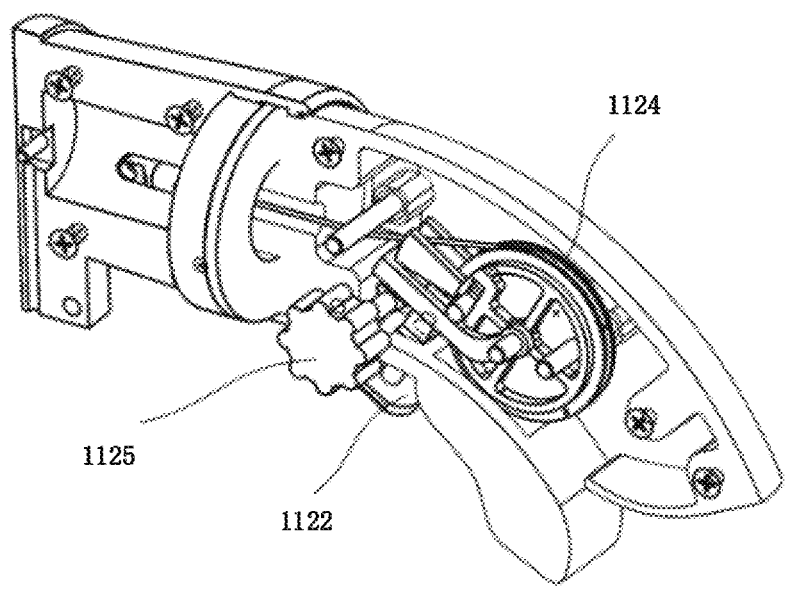
FIG. 12 is a schematic sectional view of the basal body structure in FIG. 11.
Figure 13:
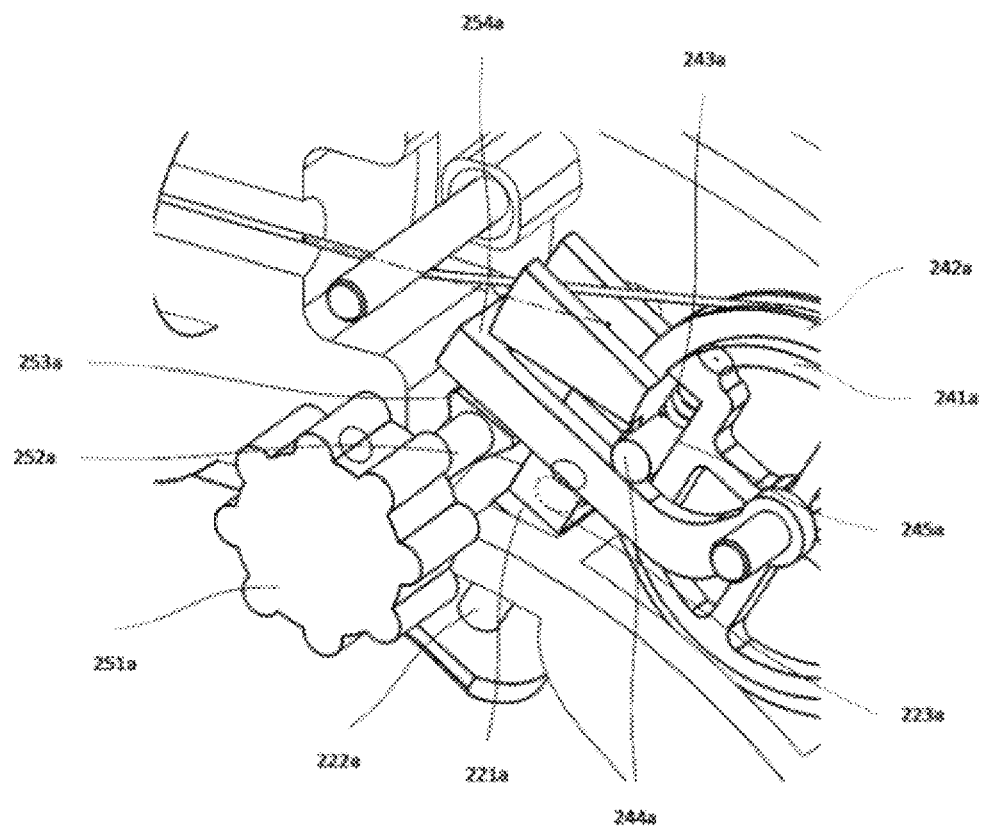
FIG. 13 is an enlarged schematic view showing the limiting member in FIG. 12.

As shown in FIGS. 11-13, in another embodiment, the position moving member 1124 includes an inner ring 241a, an outer ring 242a, an abutting spring 243a, and a steel pillar 244a. The inner ring 241a is fixed on the inner wall of the handle case 1121, and the outer ring 242a is movably sleeved on the outer peripheral surface of the inner ring 241a. The edge of the inner ring 241a defines an opening 245a, and the steel pillar 244a is configured to go through the opening 245a. The peripheral surface of the abutting spring 243a is in contact with the inner ring surface of the outer ring 242a. One end of the abutting spring 243a is fixed with the inner wall of the opening 245a, and the other end of the abutting spring is radially fixed with the steel pillar 244a. The outer peripheral surface of the outer ring 242a is provided with a track for winding the second wire. An abutment platform protrudes from the outer ring 242a in the radial direction and abuts against the driving member 1122.

In the above-mentioned embodiment, the driving member 1122 includes a fixing block 221a, a connecting rod 222a, and an abutting head 223a. The fixing block 221a is fixed to the inner wall of the handle case 1121, the connecting rod 222a is configured to go through the fixing block 221a, and one end of the connecting rod 222a is disposed outside the handle case 1121, and the other end of the connecting rod 222a disposed inside the handle case 1121 is fixed with the abutting head 223a. The abutting head 223a is configured to abut against the abutment platform. The end of the connecting rod 222a disposed outside the handle case 1121 extends to form a button.

In the above-mentioned embodiment, the limiting member 1125 includes a rotating wheel 251a, a rotating wheel connecting rod 252a, a wedge-shaped block 253a, and a lifting fork 254a. The rotating wheel connecting rod 252a is configured to pass through the handle case 1121, one end of the rotating wheel connecting rod 252a disposed outside the handle case 1121 is fixed to the rotating wheel 251a, and the other end of the rotating wheel connecting rod 252a disposed inside the handle case 1121 is coaxially fixed with the wedge-shaped block 253a. One end of the lifting fork 254a is fixed on the inner wall of the handle case 1121 and abuts against the outer peripheral surface of the steel pillar 244a, and the other end of the lifting fork 254a abuts against the outer surface of the wedge-shaped block 253a. The rotation of the rotating wheel 251a drives the wedge-shaped block 253a to rotate, and drives the steel pillar 244a to rise and fall vertically through the lifting fork 254a.

During the use of the embodiment, when the button is pressed, the abutting head 223a abuts against the abutment platform, and pushes the outer ring 242a to rotate. Under the action of the friction force, the steel pillar 244a tightly abuts against the opening 245a. Since the inner ring 241a is fixed relative to the handle case 1121, the outer ring 242a cannot rotate further, thus achieving the effect of reeling part of the second wire. When the second wire needs to be reeled further, the rotating wheel 251a is rotated, the rotation of the rotating wheel 251a drives the wedge-shaped block 253a to rotate, and drives the steel pillar 244a to move toward the abutting spring 243a through the lifting fork 254a, and the steel pillar 244a disengages from the inner wall of the opening 245a completely. At this time, by continuing to press the button, the outer ring 242a may further rotate to further reel the second wire. When the second wire needs to be released, the button is released and the rotating wheel 251a is rotated in the opposite direction.

Figure 14:
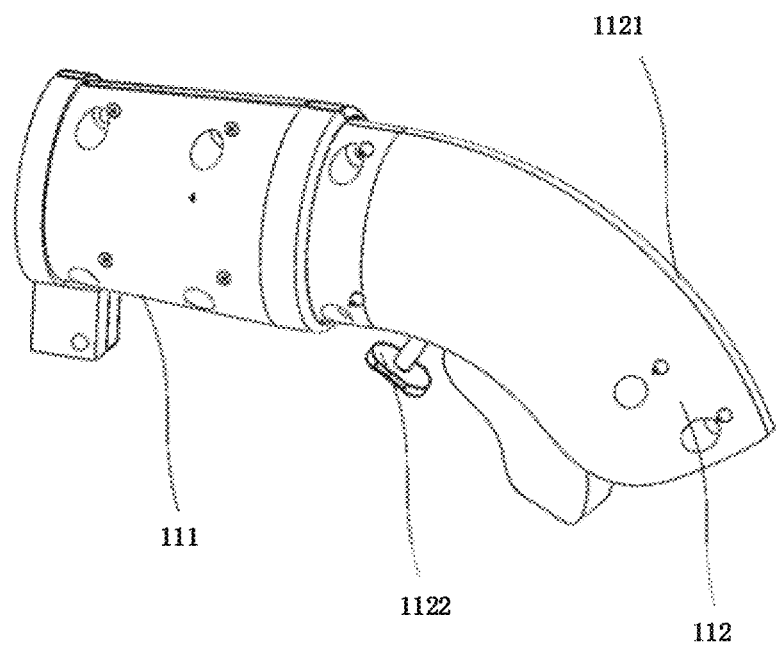
FIG. 14 is a schematic structural view of the control handle according to yet another embodiment of the present application.
Figure 15:
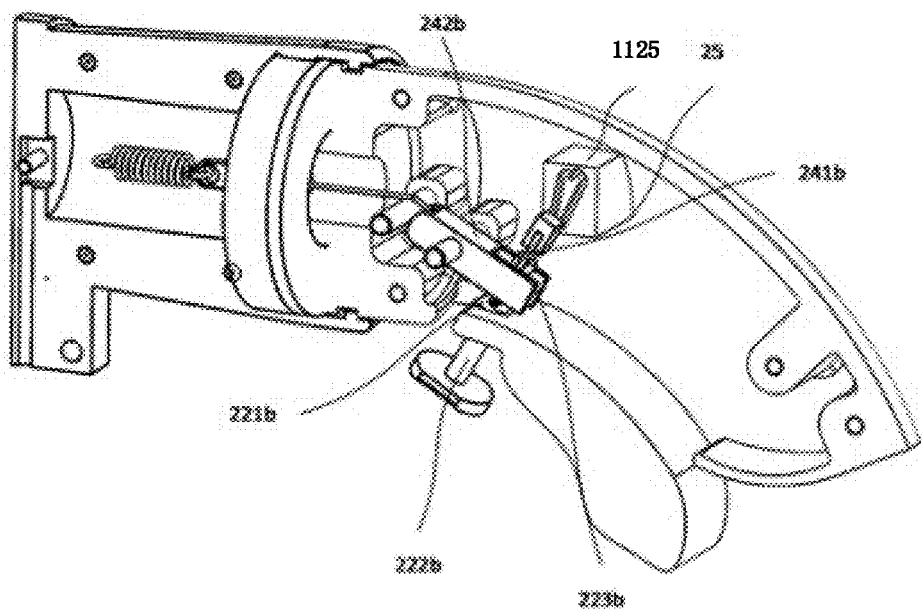
FIG. 15 is a schematic sectional view of the basal body structure in FIG. 14.
Figure 16:
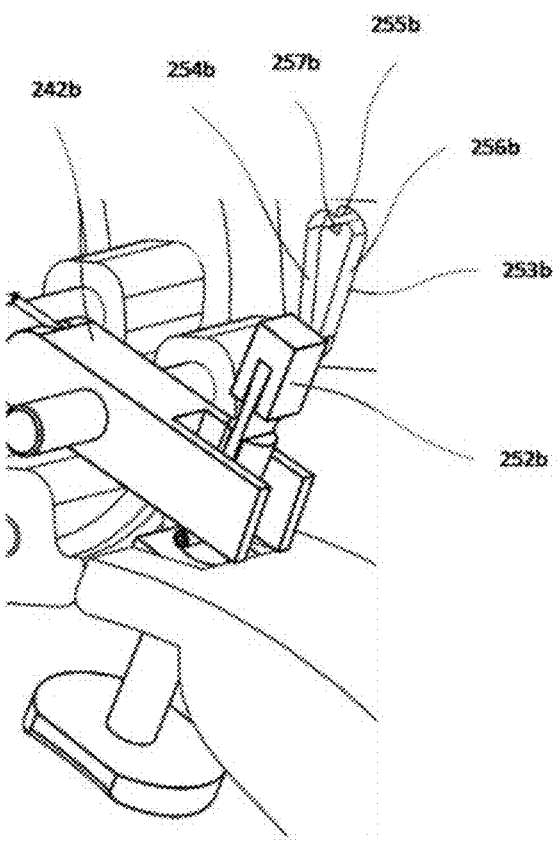
FIG. 16 is an enlarged schematic view showing the limiting member in FIG. 15.

As shown in FIGS. 14-16, in another embodiment, the driving member 1122 includes a hinged plate 221b, a driving rod 222b and a fixing bar 223b. The hinged plate 221b is hinged on the inner wall of the handle case 1121, and the driving rod 222b is configured to go through the hinged plate 221b. One end of the driving rod 222b is disposed outside the handle case 1121, and the other end of the driving rod 222b disposed inside the handle case 1121 is attached to the fixing bar 223b. The end of the driving rod 222b disposed outside the handle case 1121 extends to form the button.

In the above-mentioned embodiment, the position moving member 1124 includes a displacement steel sheet 241b and a lever 242b. One end of the displacement steel sheet 241b is fixedly connected to the fixing bar 223b, the other end of the displacement steel sheet is attached to the limiting member 1125. One end of the lever 242b is hinged with the displacement steel sheet 241b, and the other end of the lever is attached to the second wire. The middle portion of the lever 242b is hinged with the inner wall of the handle case 1121. When the button is pressed, the displacement steel sheet 241b drives one end of the lever 242b to move, and the other end of the lever 242b attached to the second wire moves accordingly, thereby realizing the effect of pulling the second wire.

In the above-mentioned embodiment, the limiting member 1125 includes the position limiting block 251b and the sliding head 252b. The sliding head 252b is attached to the end of the displacement steel sheet 241b away from the fixing bar 223b, and a rebound groove 253b is disposed on the position limiting block 251b. A sliding rod protrudes from the side wall of the sliding head 252b, and the sliding rod is embedded in the rebound groove 253b and is slidable along the rebound groove 253b.

In the above-mentioned embodiment, the bound groove 253b includes a first sliding section 254b, a second sliding section 256b, a first connecting section 255b, and a second connecting section. The first sliding section 254b, the first connecting section 255b, the second sliding section 256b, and the second connecting section are communicated end to end. A first narrow opening 257b for receiving the sliding rod is formed at a position where the first sliding section 254b and the first connecting section 255b are joined, and a second narrow opening for receiving the slidable rod is formed at a position where the second sliding section 256b and the second connecting section are joined. The axis of the first connecting section 255b is parallel to the axis of the sliding head 252b when the slidable rod is located in the first narrow opening 257b, and the axis of the second connecting section is parallel to the axis of the sliding head 252b when the slidable rod is located in the second narrow opening.

In the process of using the above embodiment, when the button is pressed, the slidable rod slides along the first sliding section 254b and then falls into the first narrow opening 257b. Since the slidable rod is received in the first narrow opening 257b, when the button is released at this time, the slidable rod remains within the first narrow opening 257b. Since the axis of the first connecting section 255b is parallel to the axis of the sliding head 252b at this time, when the button is pressed again, the sliding rod enters the first connecting section 255b along the force direction, and slides into the second opening narrow along the first connecting section 255b and the second sliding section 256b. At this time, when the button is released, the slidable rod remains in the second narrow opening. When the button is pressed again, since the axis of the second connecting section is parallel to the axis of the sliding head 252b at this time, the sliding rod enters the second connecting section along the force direction, and slides into the first narrow opening along the second connecting section and the first sliding section 254b. Such the cycle repeats, and the final effect is that when the button is pressed, the second wire is reeled, and when the button is pressed again, the second wire is released.

In the control handle of this embodiment, the thumbwheel structure 111 and the basal body structure 112 may roll relative to each other without restriction, so that a 360-degree uninterrupted rolling may be achieved, and there is no need to stop rotating to adjust the handle during the rotation.

Figure 17:
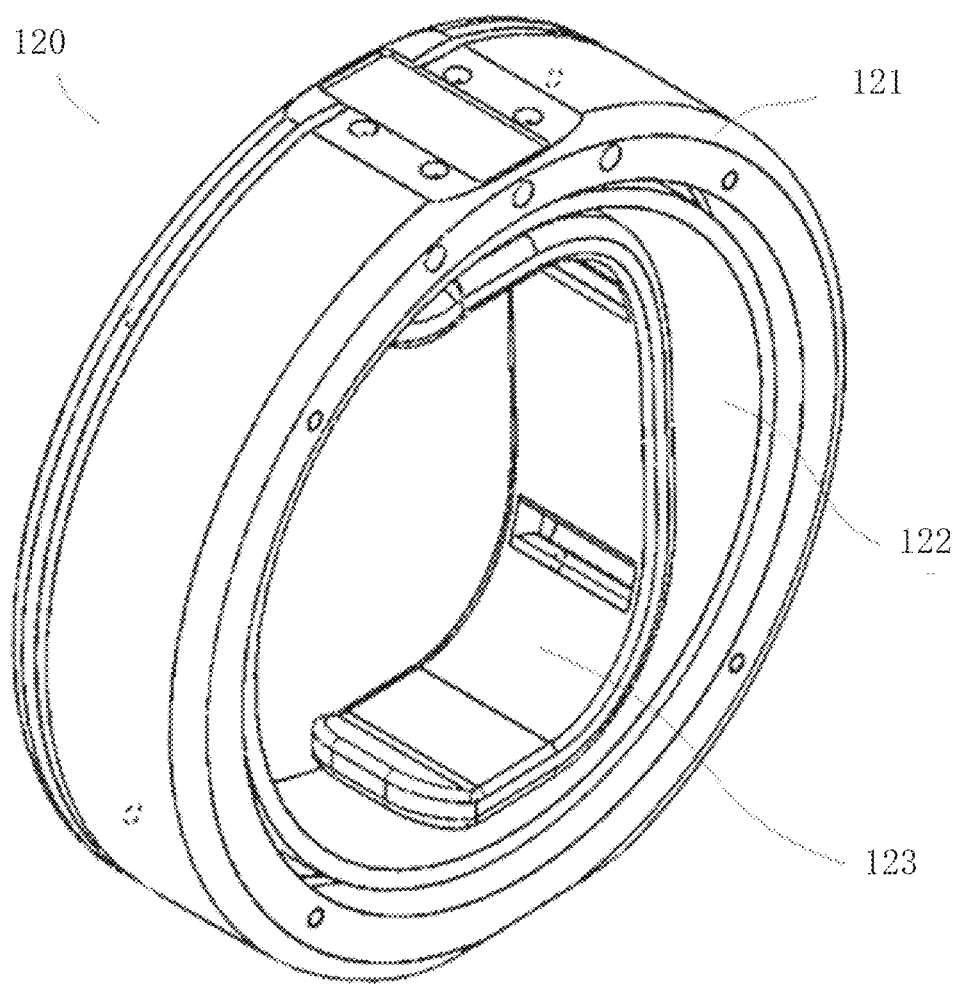
FIG. 17 is a schematic structural view of the attachment assembly according to an embodiment of the present application.
Figure 18:
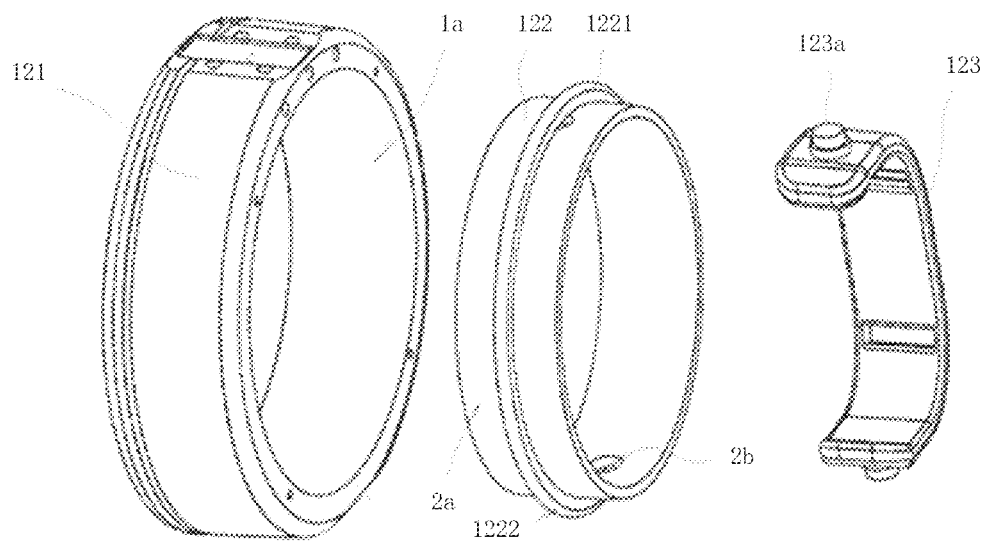
FIG. 18 is an exploded schematic view of FIG. 17.
Figure 19:
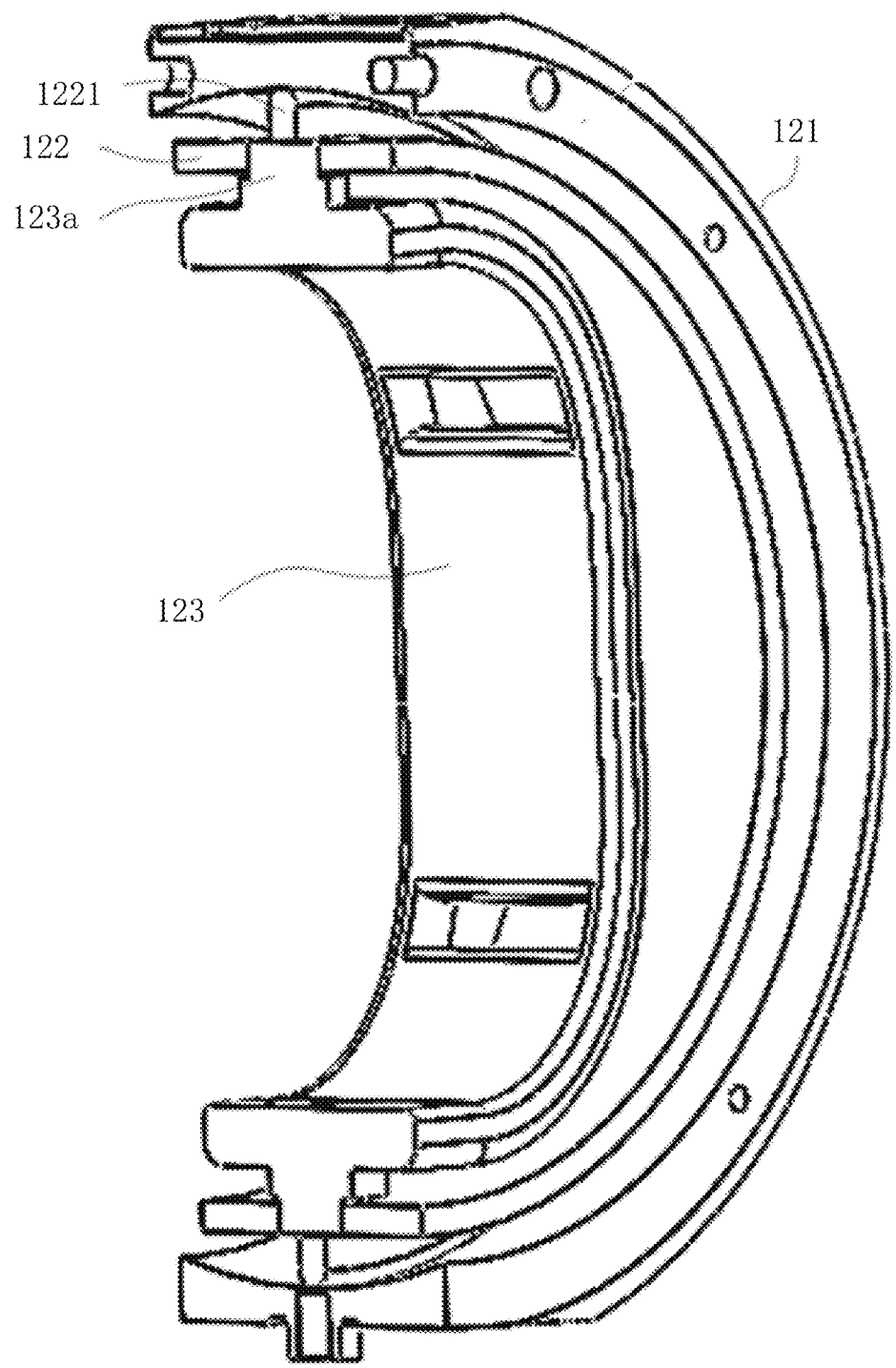
FIG. 19 is a schematic longitudinal section view of FIG. 17.

In an embodiment, as shown in FIGS. 17-19, the attachment assembly 120 includes a fixing member 121 and an attachment member 122.

The fixing member 121 is in a shape of a ring. It can be understood that the ring may be a closed ring, or a non-closed ring such as a C-shaped ring or a U-shaped ring. In this embodiment, the ring is preferably a closed ring. The inner side of the fixing member 121 has a first surface 1a in a shape of a spherical ring, and a sphere center of the first surface 1a is located between the two side edges of the first surface 1a.

The attachment member 122 is in a shape of a ring, and similar to the above-mentioned fixing member 121, the ring may be a closed ring, or a non-closed ring such as a C-shaped ring or a U-shaped ring. In this embodiment, the ring is preferably a closed ring. The outer side of the attachment member 122 has a second surface 2a in a shape of a spherical ring, and the sphere center of the first surface 1a is coincident with a sphere center of the second surface 2a. The second surface 2a is at least partially in contact with the first surface 1a, and a width of the second surface 2a is less than a width of the first surface 1a, so that the attachment member 122 may roll freely relative to the fixing member 121. The rolling center of the attachment member 122 is the sphere center of the first surface 1a. In order to effectively limit the deflection angle of the attachment member 122 to reduce its invalid redundancy, at least one side edge of the first surface 1a is provided with a blocking member 1212, and at least part of the blocking member 1212 extends towards the inner annular space of the fixing member 121. The blocking member 1212 may be a separate part connected to the edges of the openings at both ends of the fixing member 121, or may be a part of the fixing member 121.

Figure 20:
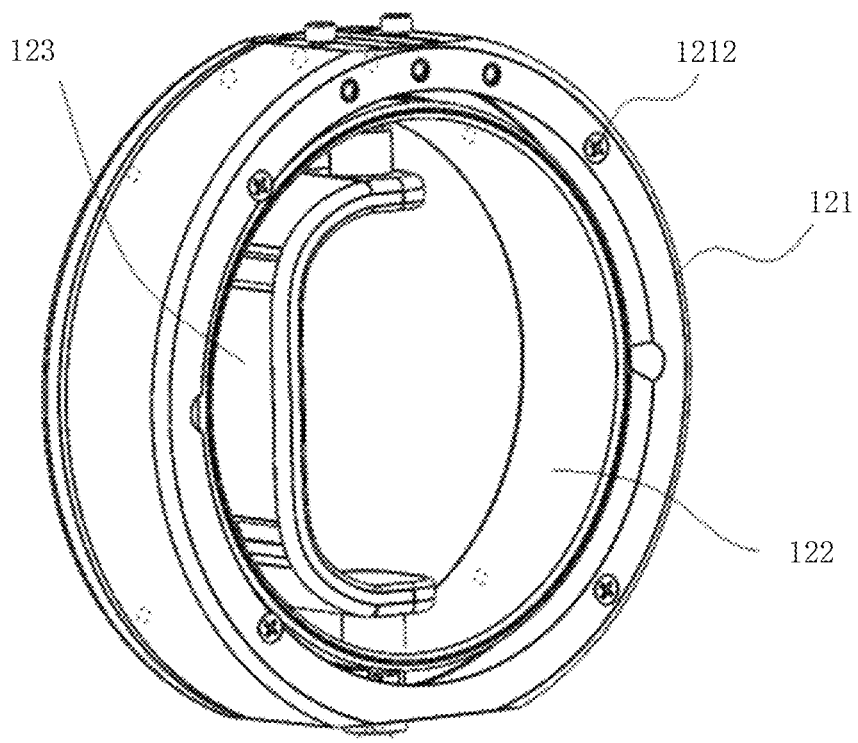
FIG. 20 is a schematic structural view of a blocking member according to another embodiment of the application.

In some embodiments, the blocking member 1212 may include a plurality of blocking pieces disposed at the side edge of the first surface 1a. In other embodiments, as shown in FIG. 20, the blocking member 1212 may include a plurality of screws disposed at the side edge of the first surface 1a, and a wider end of each screw is used as the blocking member 1212.

In this embodiment, two side edges of the first surface 1a each are correspondingly provided with the blocking member 1212, and the blocking members 1212 are the ones arranged at the side edges of the first surface 1a.

It can be understood that the function of the blocking member 1212 is to limit the deflection angle of the attachment member 122. In the case that the sphere center of the first surface 1a is located between the two side edges of the first surface 1a, since, among cross sections of the sphere, a cross section passing through the sphere center has the largest cross-sectional area, when the largest area is located in the inner space of the fixing member 121, only if at least one side edge of the first surface 1a is provided with the blocking member 1212, the deflection angle of the attachment member 122 may be effectively limited.

In this embodiment, the two side edges of the first surface 1a each are provided with the blocking member 1212 correspondingly. Optionally, the blocking member 1212 and the fixing member 121 may be mounted and connected structures, or may be an integrally formed structure. In this embodiment, the blocking member 1212 and the fixing member 121 are the mounted and connected structures.

The width of the second surface 2a is less than the width of the first surface 1a, which can ensure that the attachment member 122 may perform pitching and deflection by a certain angle inside the fixing member 121.

In all embodiments of the present application, that the attachment member 122 is capable of rolling freely relative to the fixing member 121 means that, the attachment member 122, when in any state, may rotate around the axis vertically passing through the attachment member 122 by an unlimited angle without departing from the inner space of the fixing member 121.

In some embodiments, the second surface 2a is the outer surface of the attachment member 122, that is, the outer surface of the attachment member 122 is in the shape of the spherical ring as a whole.

Figure 21:
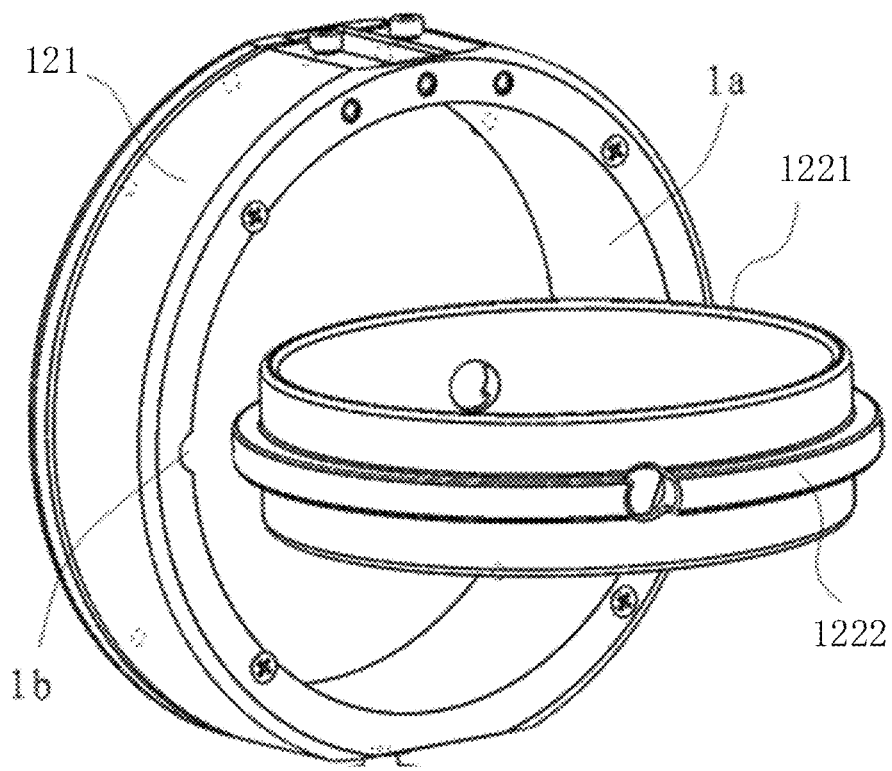
FIG. 21 is a schematic view showing a position of the attachment member before installation according to an embodiment of the application.

When the outer surface of the attachment member 122 is in the shape of the spherical ring as a whole, the sliding engagement between the first surface 1a and the second surface 2a makes the pitching and deflection of the attachment member 122 performed only between the two side edges of the first surface 1a and corresponding two side edges of the second surface 2a. Therefore, in order to ensure that the pitching and deflection angles of the attachment member 122 are sufficient, a width difference between the width of the attachment member 122 and the width of the fixing member 121 needs to be large enough, and is generally not less than 20 mm. In order to ensure the comfort of the user, there should also be a certain width at the position where the attachment member 122 contacts the wrist, and the width is generally not less than 20 mm, which will cause the fixing member 121 to be too wide and cause the attachment assembly 120 to be too bulky as a whole, which is unfavorable for the user to use. In this embodiment, as shown in FIGS. 18 and 21, the attachment member 122 includes a ring body 1221 and an annual flange 1222. The annular flange 1222 is connected to the outer surface of the ring body 1221, and the outer end surface of the annular flange 1222 abuts against the first surface 1a, and the outer end surface of the annular flange 1222 forms the second surface 2a matching with the first surface 1a. In this embodiment, the annular flange 1222 is fixed on and coaxially connected to the middle of the ring body 1221, such that, the slide engagement between the second surface 2a and the first surface 1a for the pitching and deflection of the attachment member 122 is transferred to a slide engagement between the first surface 1a and the middle part of the second surface 2a, so that a width difference between the width of the attachment member 122 and the width of the fixing member 121 needs not to be too large, thereby reducing the overall volume of the attachment assembly 120 and making the attachment assembly 120 more lightweight.

A shape of the cross section of the attachment member 122 of the above structure is similar to a T shape, that is, by reducing a contact area between the attachment member 122 and the fixing member 121, the rotation angle of the attachment member 122 is increased, and the friction force may also be reduced to make the rotation therebetween more flexible. In addition, in the case that the attachment member is directly sleeved on the wrist without using the wrist sleeve member 123, the T-shaped cross section also ensures that the portion of the attachment member 122, which contacts with the wrist, has a certain width, thereby improving the comfort. During production, the width of the annular flange 1222 is generally about 5 mm, therefore, when the pitching and deflection angles are satisfied, the width of the first surface 1a of the fixing member 121 may generally maintains within 30 mm, so that the attachment assembly 120 is not too wide and bulky as a whole.

Figure 22:
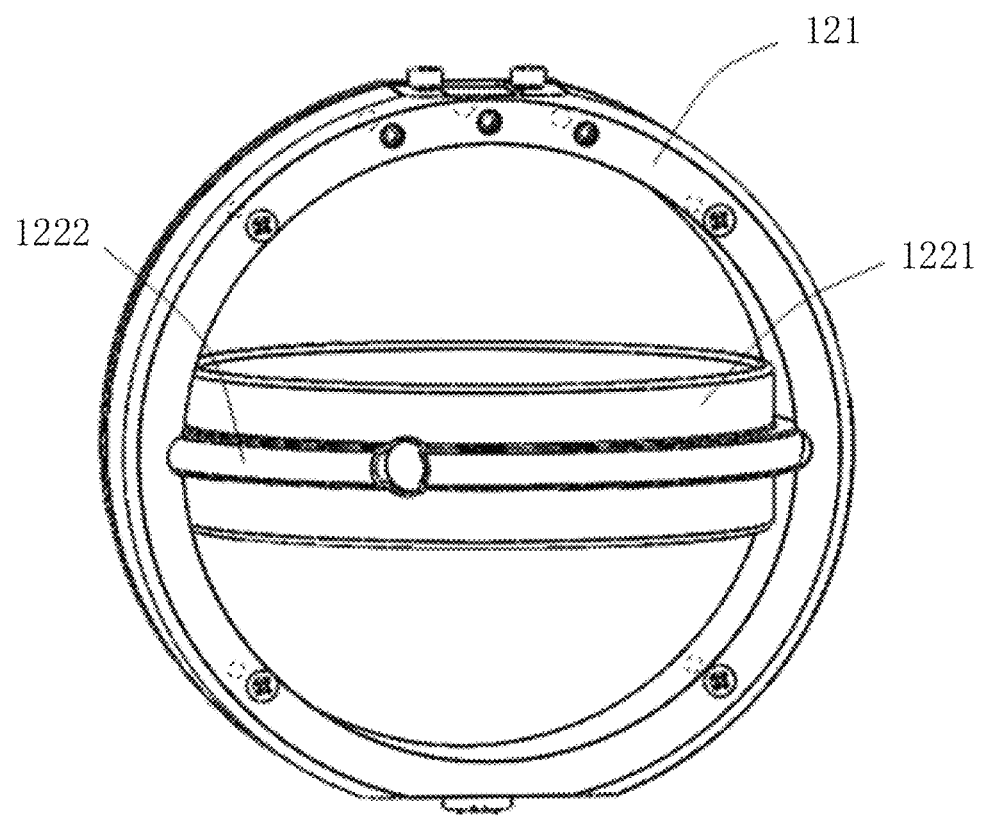
FIG. 22 is a schematic view showing a position of the installed attachment member in FIG. 21.

For the fixing member 121 and the attachment member 122, when either of the fixing member 121 and the attachment member 122 is made of a material with elastic deformation properties, such as a plastic member, the two members may be installed to realize a sleeve connection by means of elasticity of either member. As shown in FIG. 21, when the fixing member 121 and the attachment member 122 are both made of rigid materials, two curved grooves 1b may be symmetrically defined on one side edge of the first surface 1a, and a width between the two curved grooves 1b is greater than a diameter dimension of the annular flange 1222. During installation, as shown in FIGS. 21-22, the annular flange 1222 of the attachment member 122 is aligned with the curved grooves 1b, and the attachment member 122 is inserted into the inner side of the fixing member 121 through the curved grooves 1b. When the sphere centers of the first surface 1a of the fixing member 121 and the second surface 2a of the attachment member 122 are coincident, the attachment member 122 attached to the inner side is overturned by 90 degrees, thus completing the assembly.

According to the description of the above solutions, the pitching and deflection of a certain angle and unlimited-angle rolling between the wrist and the fixing member 121 may be achieved by simply using the attachment member 122 and the fixing member 121. However, according to ergonomics, it may be known that the pitching angle of the human wrist is very small, but the deflection angle is very large. The deflection angle of the wrist in the above solution is consistent with the deflection angle of the attachment part, and limited by the widths of the first surface 1a and the second surface 2a, the deflection angle is generally relative small, which is not in accordance with ergonomic concept and does not meet all needs of the human wrist deflection. Therefore, in this embodiment, as shown in FIG. 17, the attachment assembly 120 further includes a wrist sleeve member 123, wherein the wrist sleeve member 123 is configured to be attached to the user's wrist and to be rotatably mounted on the inner side of the attachment member 122, and the rotation axis of the wrist sleeve member 123 passes through the rolling center of the attachment member 122.

The wrist sleeve member 123 is rotatably mounted on the inner side of the attachment member 122, that is, the wrist sleeve member 123 is connected to the attachment member 122 through a rotating pair, which may effectively increase the left and right deflection angles of the user's wrist. Such a structure increases the effective redundancy and is more ergonomic.

Optionally, the wrist sleeve member 123 is a C-shaped structure 123. More specifically, in this embodiment, the installation method of the C-shaped structure 123 is as follows. Two protrusions 123a are formed on the two ends of the outer side of the C-shaped structure 123. The two protrusions 123a form the rotation shaft of the wrist sleeve member 123. The side wall of the attachment member 122 defines two mounting holes 2b corresponding to the two protrusions 123a respectively, and the C-shaped structure 123 is detachably and rotatably connected to the inner side of the attachment member 122 by the engagement between the mounting holes 2b and the protrusions 123a.

When the user uses the attachment assembly 120, the wrist is put into the space inside the C-shaped structure 123, and the upper and lower sides of the wrist are clamped between the two ends of the C-shaped structure 123, so that when the wrist is performing pitching, deflection or flipping, both the attachment member 122 and the wrist sleeve member 123 may be accurately adapted to the wrist, so as to facilitate the user's work.

Figure 23:
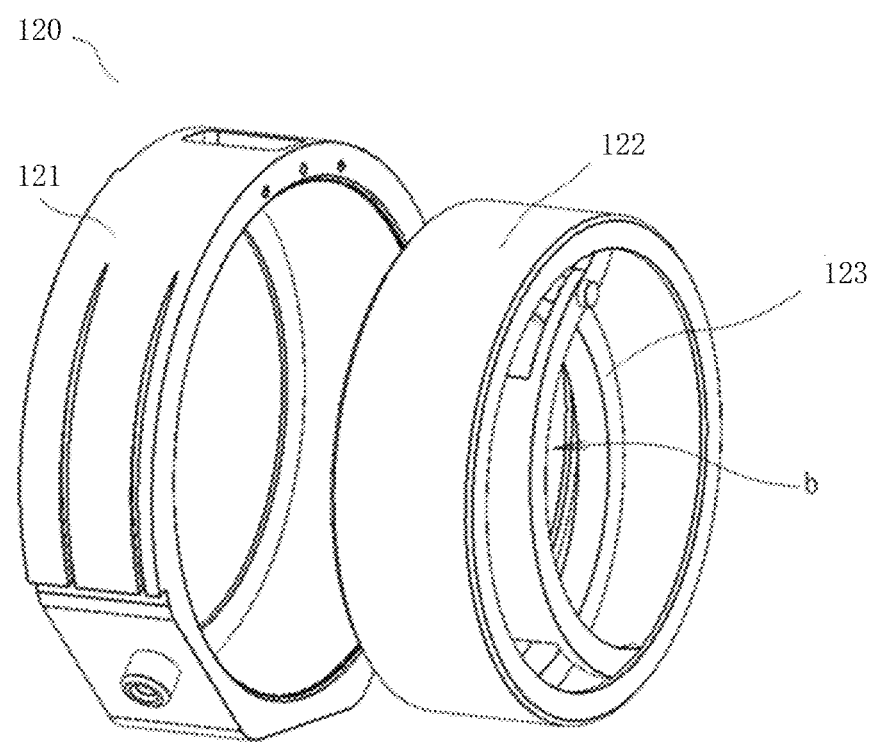
FIG. 23 is a schematic structural view of the attachment assembly according to an embodiment of the present application.

In another embodiment, as shown in FIG. 23, an attachment assembly 120 includes a fixing member 121, an attachment member 122, and a wrist sleeve member 123.

The fixing member 121 is in a shape of a ring. It can be understood that the ring may be a closed ring, or a non-closed ring such as a C-shaped ring or a U-shaped ring. The non-closed ring may also be a partially overlapped ring, such as a spiral ring. The attachment member 122 is detachably connected to the fixing member 121.

As shown in FIGS. 23-25 and FIGS. 31-32, as an implementable embodiment of the present application, the attachment member 122 is an integrally formed closed ring, and the attachment member 122 is detachably connected to the fixing member 121 through magnetic connection. Specifically, the attachment member 122 is made of a magnetic material, such as a ferrous material, and an electromagnet is installed on the fixing member 121. When the electromagnet is electrified, the electromagnet generates magnetism, which magnetically attracts the sleeve ring, so that the attachment member 122 is connected to the inner side of the fixing member 121. When the electromagnet is not electrified, the magnetism disappears, and the attachment member 122 may be removed from the inner side of the fixing member 121. It should be noted that, in other embodiments, the fixing member may also be made of magnetic material, and an electromagnet is installed on the sleeve ring. In other implementable embodiments, the attachment member 122 is pasted on the inner side of the fixing member 121 by a Velcro, and the connection and cooperation between the attachment member 122 and the fixing member 121 are realized by pasting or tearing off the Velcro.

Figure 27:
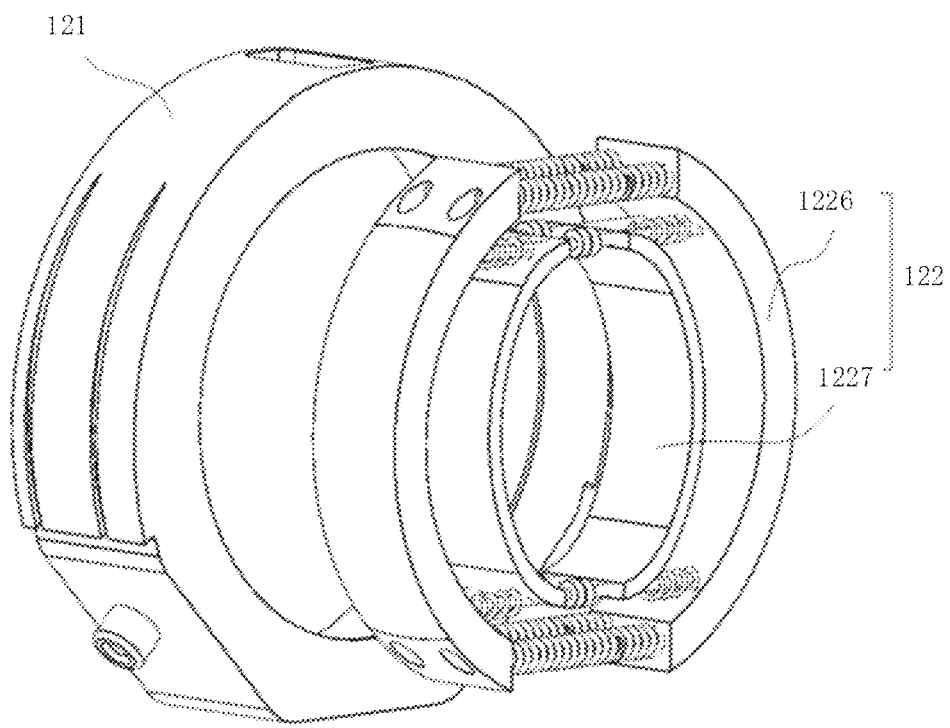
FIG. 27 is a schematic structural view of the attachment member and the wrist sleeve member according to yet another embodiment of the present application.
Figure 28:
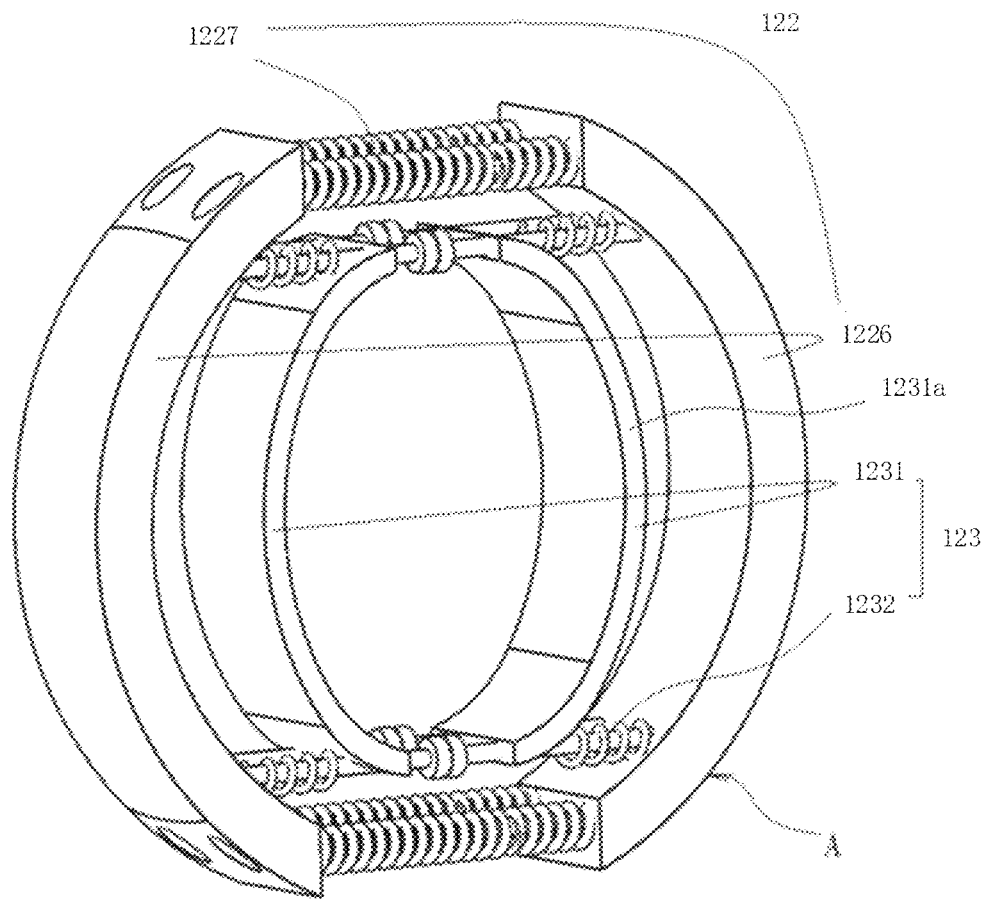
FIG. 28 is a schematic structural view of the attachment member and the wrist sleeve member in FIG. 27.

For the attachment member 122, it only needs to be able to be detachably installed on the inner side of the fixing member 121. Therefore, the attachment member is not limited to an integrally formed structure of a closed ring. For example, in some embodiments, as shown in FIGS. 27-28, the attachment member 122 includes a curved unit ring 1226 and an adjusting member 1227. The curved unit ring 1226 and the adjusting member 1227 enclose to form a closed annular ring A, and the adjusting member 1227 drives the closed annular ring A to be elastically clamped on the inner side of the fixing member 121.

As seen obviously from FIGS. 27-28, the curved unit ring 1226 and the adjusting member 1227 are staggered and arranged at intervals. The adjusting member 1227 is an elastic element, more precisely, is a compression spring 1227. When the attachment member 122 is being placed into the fixing member 121, the compression spring 1227 stretches, and the closed annular ring A is elastically driven to expand in a radial direction, so that the curved unit ring 1226 abuts against the inner side of the fixing member 121. When two curved unit rings 1226 and two adjusting members 1227 are provided as shown in the figures, they constitute a structure as follows: two ends of one curved unit ring 1226 are arranged correspondingly to two ends of the other curved unit ring 1226, and the adjusting members 1227 each are installed between one end of one curved unit ring 1226 and one end of the other curved unit ring 1226, to drive the two curved unit rings 1226 to move in a radial direction away from each other and then abut against the inner side of the fixing member 121. When the attachment member 122 needs to be removed, the two curved unit rings 1226 are squeezed to force the compression spring 1227 to retract and shorten.

It can be understood that the number of the curved unit ring 1226 and the adjusting member 1227 may be determined according to actual situations. When the number is one, the curved unit ring is a C-shaped ring with an annular angle slightly less than 360 degrees. The adjusting member 1227 is disposed between the two ends of the C-shaped ring, and is configured to press the C-shaped ring against the inner side of the fixing member 121.

Figure 29:
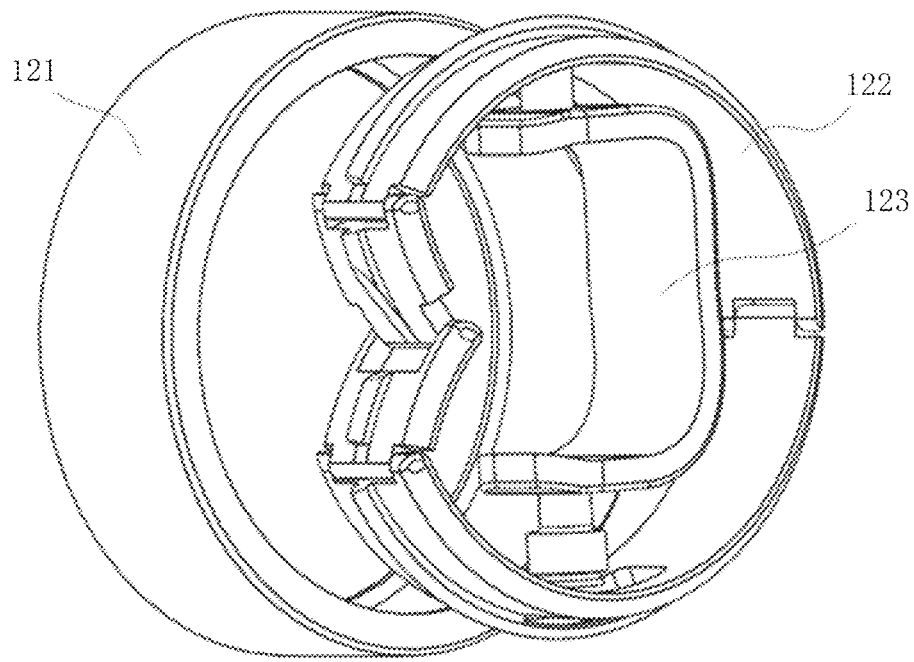
FIG. 29 is a schematic structural view of the attachment assembly according to another embodiment of the present application.
Figure 30:
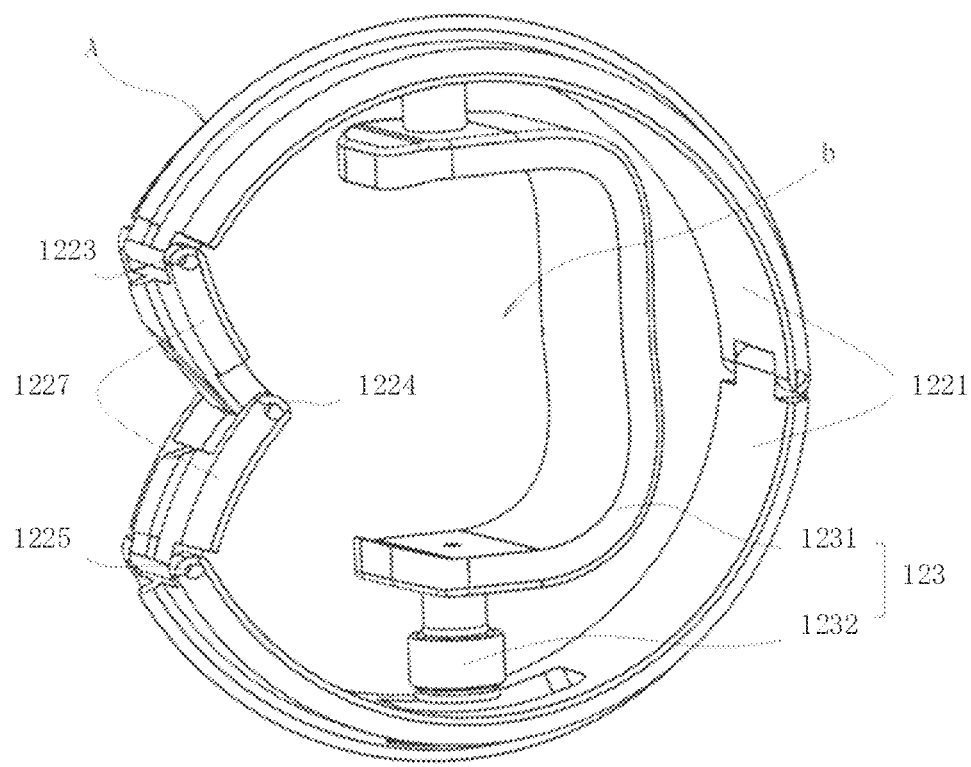
FIG. 30 is a schematic structural view of the attachment member in FIG. 29.

In other similar embodiments, as shown in FIGS. 29-30, the attachment member 122 includes two curved unit rings 1226 and two adjusting members 1227. The adjusting member 1227 is a curved connecting member 1227 with the same radius as the curved unit ring 1226. The two adjusting members 1227 and the two curved unit rings 1226 enclose to form a closed annular ring A. One end of one curved unit ring 1226 and one end of the other curved unit ring 126 are hinged, and the other end of each curved unit ring is hinged with the curved connecting member 1227, and the ends of the curved connecting members 1227 away from the corresponding curved unit ring 1226 are hinged with each other.

Continuing to refer to FIGS. 27-30, in this embodiment, when the attachment member 122 is not connected to the fixing member 121, the two curved connecting members 1227 are respectively installed on the corresponding ends of the curved unit ring 1226 through the first connecting pin 1223 and the third connecting pin 1225, and the ends of the two curved connecting members 1227 away from the curved unit ring 1226 are hinged to a second connecting pin 1224. When the portions, where the two curved connecting members 1227 are hinged, are bent inwards, the closed annular ring A formed by the two curved unit rings 1226 and the two curved connecting members 1227 collapses inwardly. The attachment member 122, as a whole, may be placed into the fixing member 121. After the wrist is put into the curved unit ring 1226, the portion where the second connecting pin 1224 is disposed is pushed outwards by the hand, and at this time, the two curved connecting members 1227 rotate clockwise and counterclockwise, respectively, so that the two curved connecting members 1227 stretch the two curved unit rings 1226, till a circular ring is formed. It should be noted that in this process, when the first connecting pin 1223, the second connecting pin 1224, and the third connecting pin 1225 are located in a straight line, there will be certain elastic forces which are caused by deformation of the parts themselves. At this time, continuing to squeeze is needed to overcome the deformation, and then the attachment member 122 cannot automatically overcome the deformation to return to its original state, so the sleeve ring is tensioned inside the fixing member 121.

Figure 24:
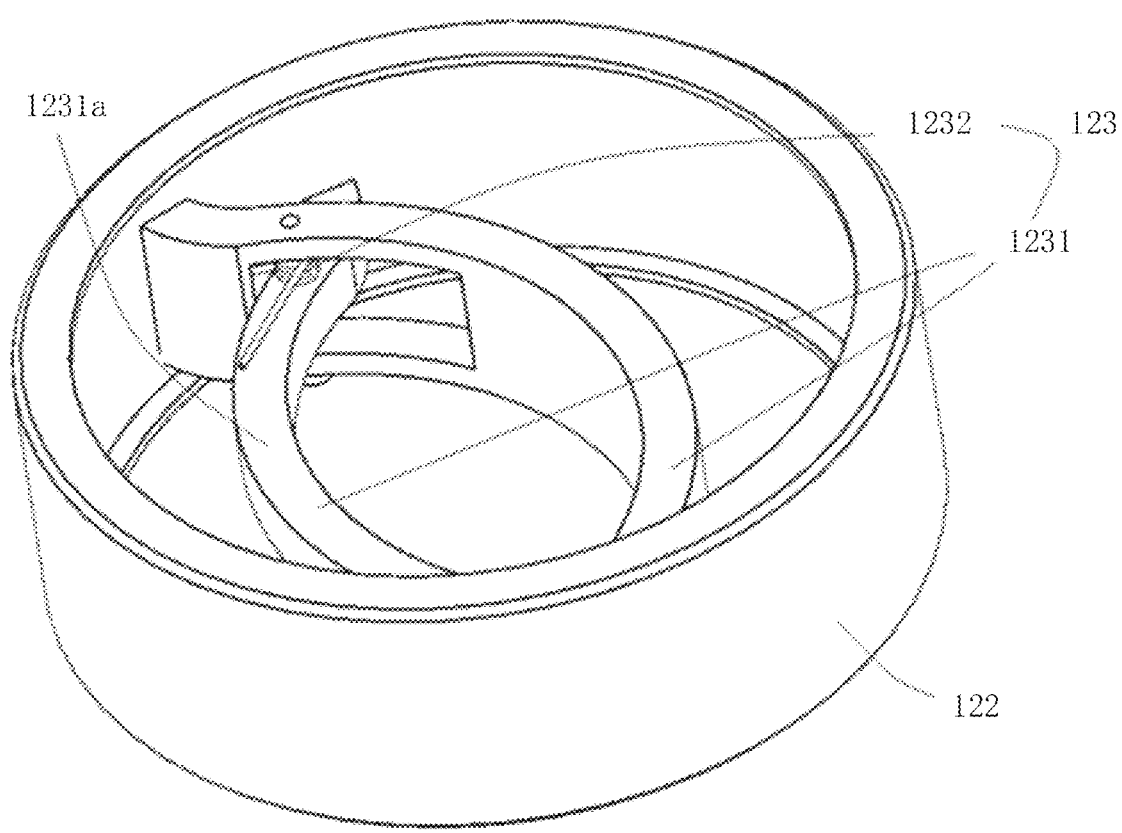
FIG. 24 is a schematic structural view of the attachment member and a wrist sleeve member in FIG. 23.
Figure 25:
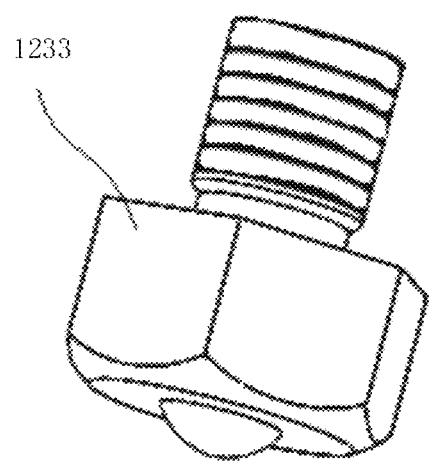
FIG. 25 is a schematic structural view of a universal ball in FIG. 23.

The wrist sleeve member 123 is attached to the inner side of the attachment member 122 and is configured to be attached to the user's forearm or wrist. Specifically, as shown in FIG. 24, the wrist sleeve member 123 includes a clamping member 1231 and a driving member 1232. The clamping member 1231 is disposed on the inner side of the attachment member 122 and configured to clamp the user's forearm or wrist. The driving member 1232 is drivably connected to the clamping member 1231 and configured to keep the clamping member 1231 clamping the user's forearm or wrist.

Optionally, as shown in FIGS. 23-24, the clamping member 1231 includes at least two clamping arms 1231a disposed on the inner side of the attachment member 122. A receiving space b for receiving the user's forearm or wrist is formed between the clamping arms 1231a. The driving member 1232 is connected to the clamping arms 1231a and configured to drive the clamping arms 1231a to move in the direction of reducing the receiving space b.

In this embodiment, two clamping arms 1231a are provided, and the driving member 1232 is a torsion spring 1232. The two clamping arms 1231a are hinged with each other, the torsion spring 1232 is disposed at the hinge of the clamping arms 1231a, and the torsion spring 1232 drives the clamping arms 1231a to come close to each other. In order to ensure comfort, the clamping arms 1231a each are in a shape of a curve, and openings of the two clamping arms 1231a are arranged opposite to each other, and a hole enclosed between the two openings is the receiving space b. Two ends of each the clamping arm 1231a elastically abut against the inner side of the attachment member 122. In order to enable the clamping members 1231 to smoothly roll inside the attachment member 122, the inner side of the attachment member 122 is a spherical surface, and two ends of each clamping arm 1231a are provided with universal balls 1233, respectively, and the universal balls 1233 rollably abut against the inner side wall of the attachment member 122.

When the user equips the forearm or the wrist with the attachment member 122, five fingers get together and reach the hole, and the receiving space b formed by the two clamping arms 1231a is braced open by overcoming the force of the torsion spring 1232. After the forearm or wrist is put in, the torsion spring 1232 is reset to an original state and drives the two clamping arms 1231a to hold the user's forearm or wrist.

Figure 26:
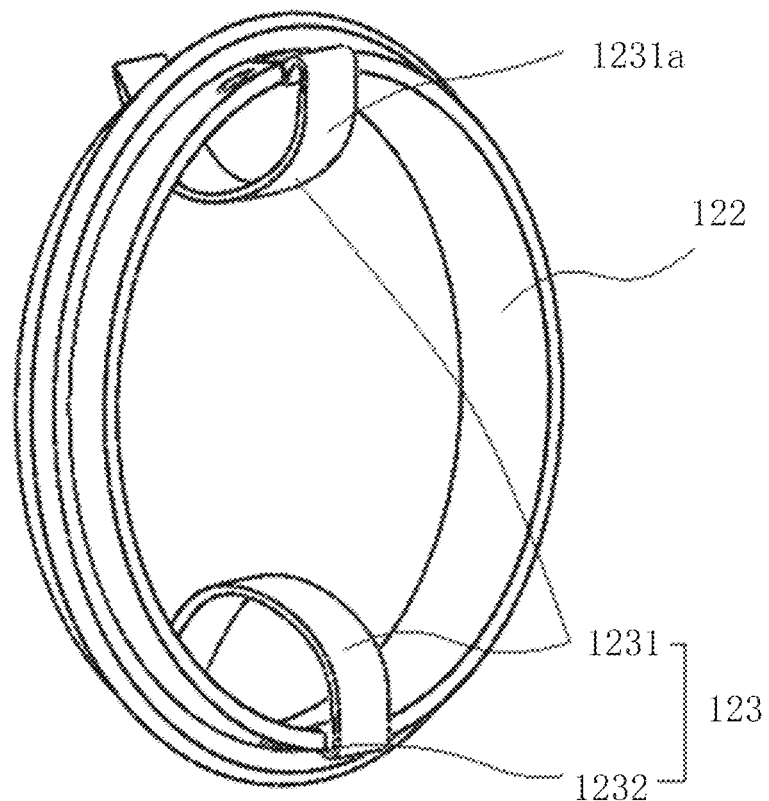
FIG. 26 is a schematic structural view of the attachment member and the wrist sleeve member according to another embodiment of the present application.

In other embodiments, the wrist sleeve member 123 is configured to be a structure shown in FIG. 26, that is, the driving member 1232 is a torsion spring 1232, and the clamping arm 1231a is a bent rod. One end of the clamping arm 1231a is hinged with the attachment member 122, and the torsion spring 1232 is disposed at the hinge of the clamping arm 1231a and the attachment member 122. The torsion spring 1232 drives the other end of the clamping arm 1231a to rotate towards the inner side of the attachment member 122, thus clamping the user's forearm or wrist. The number of clamping arms in the figure is two. In actual use, the number of the clamping arms may be configured by the user according to body comfort, and the bending angle of the clamping arm 1231a and the elastic strength of the torsion spring may even be determined according to the shape of the wrist.

In other embodiments, the wrist sleeve member 123 is configured to be a structure shown in FIGS. 27-28, that is, the driving member 1232 is a spring 1232, the clamping arms 1231a enclose to form a ring, and the spring 1232 is installed between the clamping arm 1231a and the inner side of the attachment member 122, to drive the clamping arm 1231a to move towards the center of the attachment member 122. Specifically, the number of the clamping arms 1231a is two, the spring 1232 is disposed between the end of the clamping arm 1231a and the attachment member 122, and two ends of each clamping arm 1231a are provided with the springs 1232, respectively. All the springs 1232 are arranged in parallel to ensure the movement stability of the clamping arm 1231a. When the user intends to attach the wrist sleeve member 123 to the wrist, the user only needs to get the five fingers together and stretch them into the annular hole formed by the two clamping arms 1231a, and the two openings may be braced open by overcoming the elastic forces of the springs 1232. After the wrist is put into the hole, the spring 1232 is reset to an original state and the wrist is held.

The above embodiment provides the clamping member 1231 having two or more clamping arms 1231a for clamping. In an actual application, as shown in FIGS. 29-32, the clamping member 1231 may also be a U-shaped member 1231 made of an elastic material. One side of the U-shaped member 1231 is opened, and the inside of the opening is the receiving space b for receiving the user's wrist or forearm. The driving member 1232 is connected to at least one end of the U-shaped member 1231 and configured to drive the U-shaped member 1231 to elastically deform, thereby changing a volume of the receiving space b.

For example, as shown in FIGS. 29-30, the driving member 1232 is an extensile and retractable valve 1232. The extensile and retractable valve 1232 is installed on the inner side of the attachment member 122, and the extensile and retractable end of the extensile and retractable valve 1232 abuts against one end of the U-shaped member 1231, another end of the U-shaped member 1231 abuts against the sleeve ring. When the extensile and retractable end of the extensile and retractable valve 1232 extends and retracts, the volume of the receiving space inside the U-shaped member 1231 changes. During use, the user stretches the forearm or wrist into the opening of the U-shaped member 1231, and then rotates the extensile and retractable valve 1232, and the extensile and retractable valve is prolonged, so that the opening of the U-shaped member 1231 changes smaller, thus the receiving space b is reduced, and the side wall of the U-shaped member 1231 clamps the user's forearm or wrist.

Figure 31:
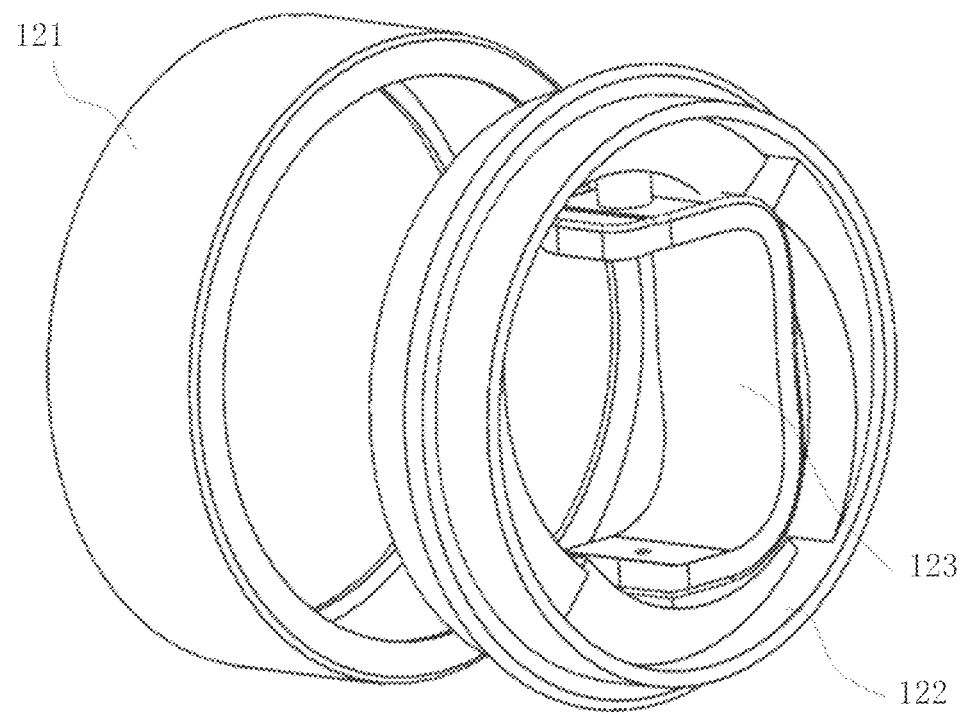
FIG. 31 is a schematic structural view of the attachment assembly according to another embodiment of the present application.
Figure 32:
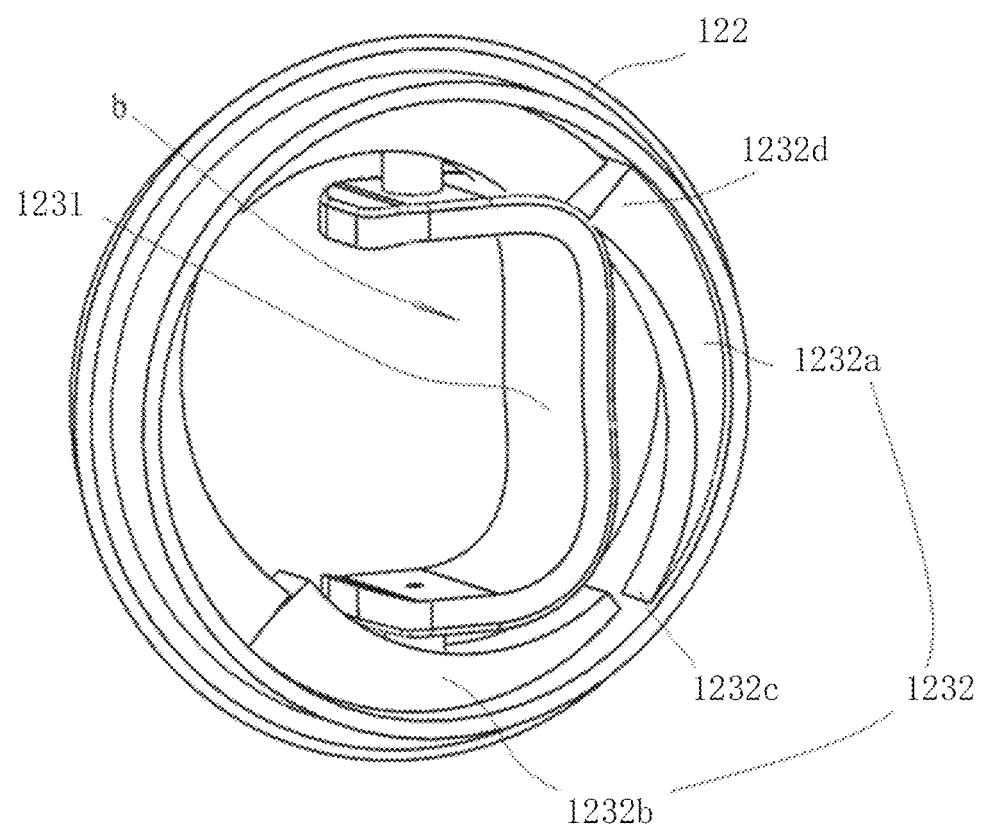
FIG. 32 is a schematic structural view of the attachment member in FIG. 31.

In some embodiments, the fixing assembly is configured to be a structure as shown in FIGS. 31-32, the driving member 1232 includes two curved sliding tracks 1232a, which extend circumferentially along the inner side of the attachment member 122 and are connected to the inner side of the attachment member 122, and the tapered slidable blocks 1232b which are connected at the outer sides of two ends of the U-shaped member 1231. One end of the curved sliding track 1232a is gradually approaching the center of the attachment member 122 relative to the other end, that is, the curved sliding track 1232a has a certain height difference inside the attachment member 122 along its length direction. Two curved sliding tracks 1232a are arranged opposite to each other, and the two tapered slide blocks 1232b slidably engage with the two curved sliding tracks 1232a correspondingly. When the slidable block 1232b slides along the curved sliding track 1232a, the receiving space b inside the U-shaped member 1231 changes.

Specifically, as shown in FIG. 32, the curved sliding track 1232a has a proximal end 1232c and a distal end 1232d, and along a length direction of the curved sliding track 1232a, the distal end 1232d is gradually away from the inner side wall of the attachment member 122 relative to the proximal end 1232c, that is, a distance of the distal end 1232d from the inner side of the attachment member 122 is greater than a distance of the proximal end 1232c from the inner side of the attachment member 122. Specifically, when the slidable block 1232b is located at the proximal end 1232c of the corresponding curved sliding track 1232a, the opening of the U-shaped member 1231 is larger, and the user may insert the forearm or wrist into the opening of the U-shaped member 1231. Then the U-shaped member 1231 is rotated, correspondingly the slidable block 1232b slides on the corresponding curved sliding track 1232a towards the distal end 1232d, so that the two slidable blocks 1232b are radially close to each other in the sleeve ring, and the opening of the U-shaped member 1231 becomes gradually smaller, thereby clamping the user's wrist.

It can be understood that the U-shaped member 1231 made of elastic material is only a brief summary of its shape and structure, and those skilled in the art may design it as a C-shaped member or a U-shaped member according to actual needs, both of which may be used in the application scenario.

Figure 33:
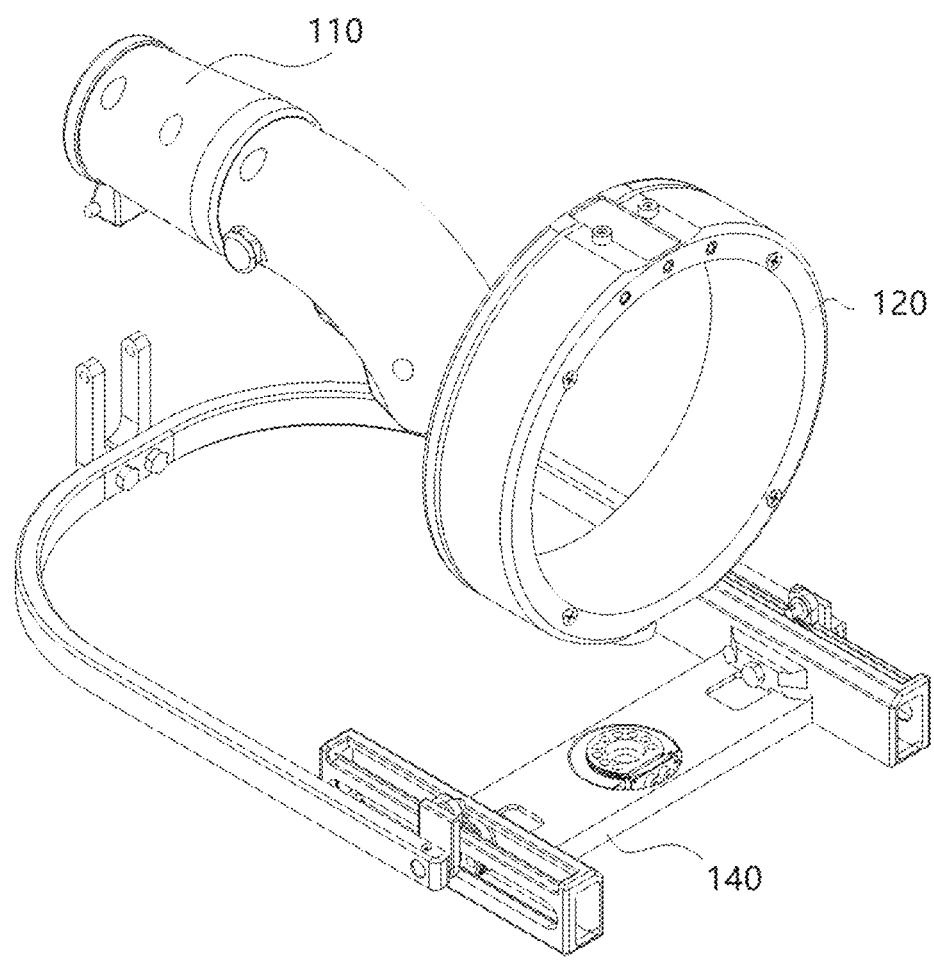
FIG. 33 is a schematic structural view of a series motion mechanism according to an embodiment of the present application.
Figure 34:
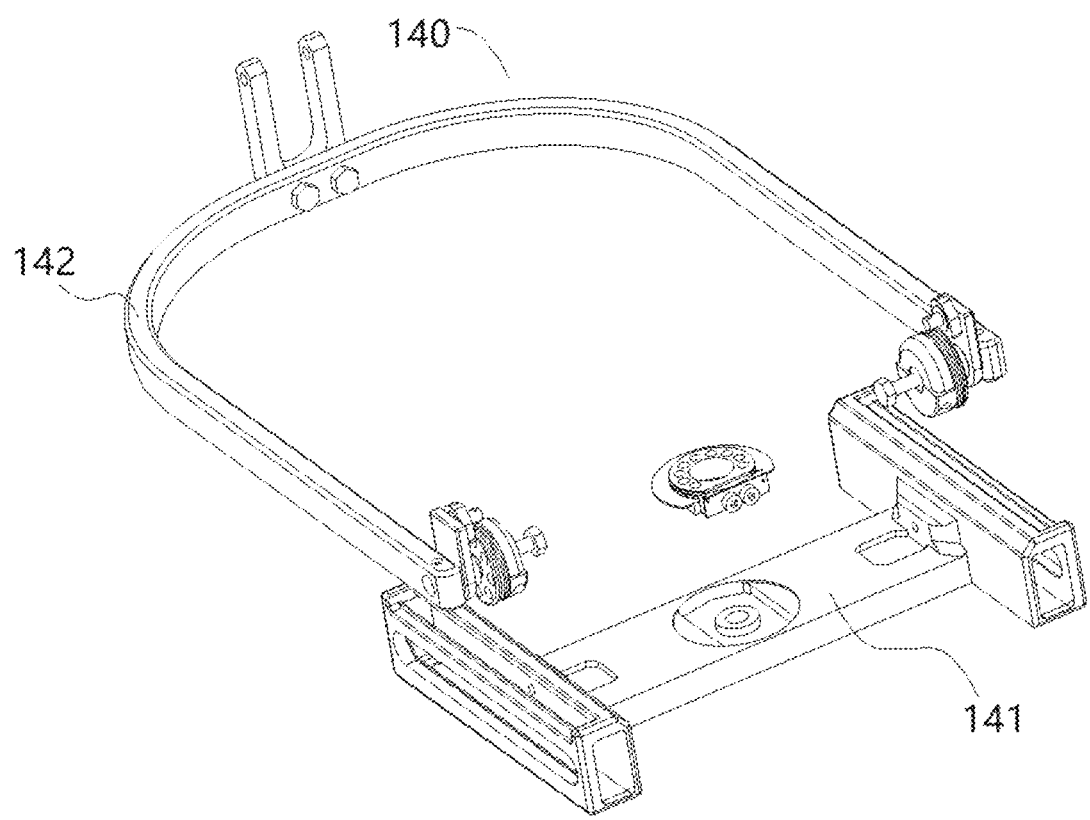
FIG. 34 is an exploded schematic structural view of a series joint in FIG. 33.
Figure 35:
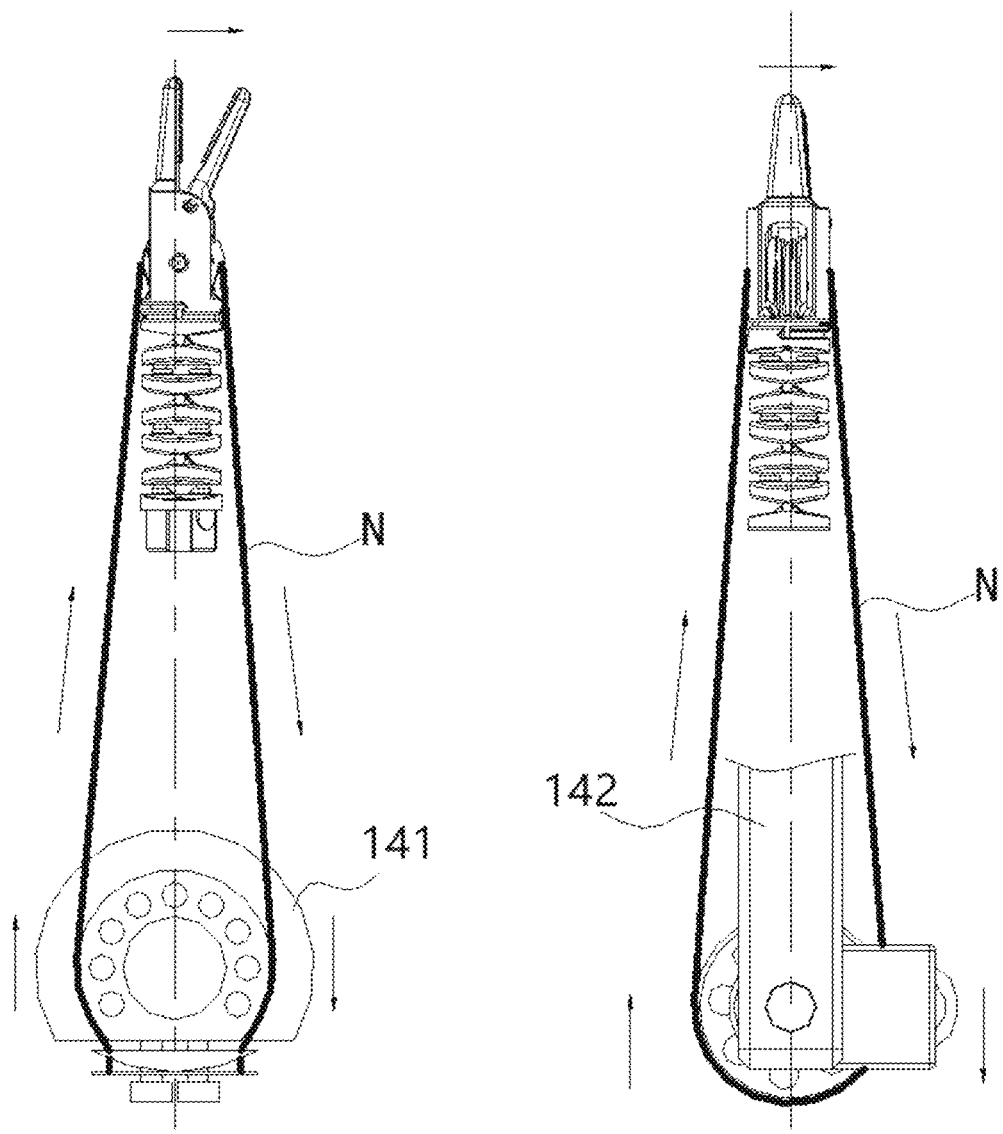
FIG. 35 is a schematic view showing a positional relationship among a deflection assembly, a pitching assembly, and an execution assembly connected by wire according to an embodiment of the application.

In an embodiment, referring to FIGS. 33-35, the main control assembly 10 also includes a series joint 140. An embodiment of the present application provides a series motion mechanism for controlling a motion of a surgical instrument. The series motion mechanism includes the control handle 110, the attachment assembly 120 and the series joint 140 above.

The series joint 140 is a series double-joint rotation mechanism, including two joints, and rotation axes of the two joints are perpendicular to each other. The control handle 110 and the attachment assembly 120 are connected by the series joint 140, to resolve the motion state of the control handle 110 and convert the motion state into joint motions of the series joint 140, so as to use the control handle as a control source. That is, by applying an external force to the control handle 110, and taking the attachment assembly 120 as a fulcrum, the two joints of the series joint 140 are rotated, so that rotations of the joints of the series joint 140 are converted into motion of the surgical instrument by using the wire N or other transmissions.

Specifically, as shown in FIGS. 33-34, the series joint 140 includes a deflection assembly 141 and a pitching assembly 142. The deflection assembly 141 is rotatably connected to the control handle 110 through the pitching assembly 142 to form a pitching rotation joint, and the deflection assembly 141 is also rotatably connected to the attachment 120 to form a deflection rotation joint. The rotation axis of the pitching rotation joint is perpendicular to the rotation axis of the deflection rotation joint.

In this embodiment, the rotation axis of the deflection assembly 141 is perpendicular to the horizontal plane, and the rotation axis of the pitching assembly 142 is parallel to the horizontal plane. After the wrist passes through the attachment assembly 120 and holds the control handle 110, by applying an external force parallel to the horizontal plane through the wrist to the control handle 110, the control handle 110 may drive the deflection assembly 141 to deflect relative to the attachment assembly 120 in a direction parallel to the horizontal plane. By applying an external force perpendicular to the horizontal plane through the wrist to the control handle 110, the control handle 110 may drive the pitching assembly 142 to rotate relative to the deflection assembly 141 in a direction perpendicular to the horizontal plane.

It can be understood that by applying both the force parallel to the horizontal plane and the force perpendicular to the horizontal plane to the control handle 110 through the wrist, or by applying the force perpendicular to the horizontal plane or the force parallel to the horizontal plane alone to the control handle 110, the control handle 110 drives the deflection assembly 141 to rotate relative to the attachment assembly 120 in the direction parallel to the horizontal plane and/or drives the pitching assembly 142 to rotate relative to the deflection assembly 141 in the direction perpendicular to the horizontal plane. By applying forces to the control handle 110 through the wrist, which means that, the arm is used as a lever, and the arm and the attachment assembly 120 are used as a fulcrum to move the held control handle 110.

The surgical instrument is connected to the deflection assembly 141 and the pitching assembly 142 by a wire N, so that after the arm passes through the attachment assembly 120 and holds the control handle 110, and then applies an external force to the control handle 110, the external force applied to the control handle 110 is transmitted to the surgical instrument by the wire N, thereby achieving the effect of controlling the deflection of the surgical instrument by means of the movements of the wrist.

Figure 36:
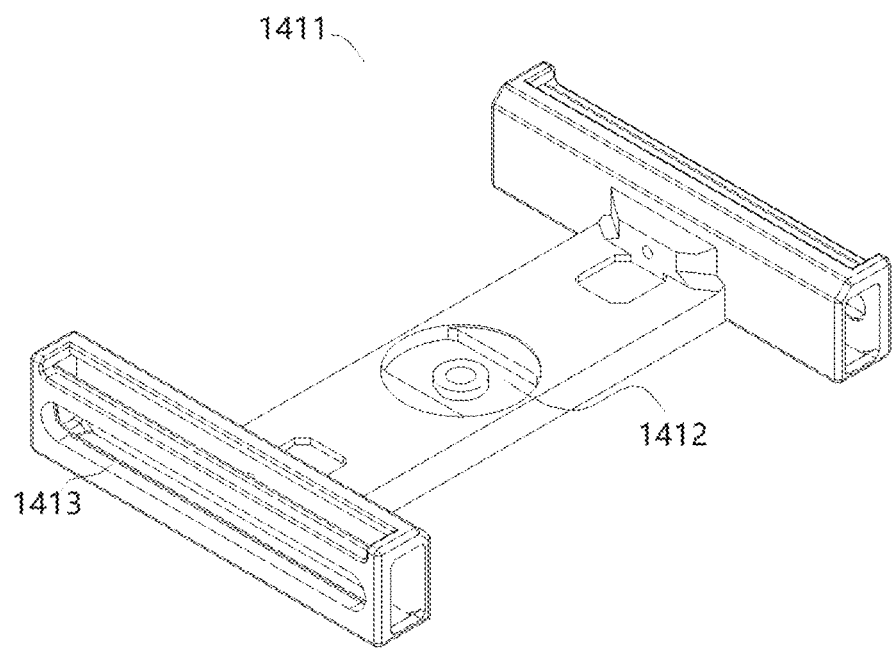
FIG. 36 is a schematic structural view of a traction frame in FIG. 34.
Figure 37:
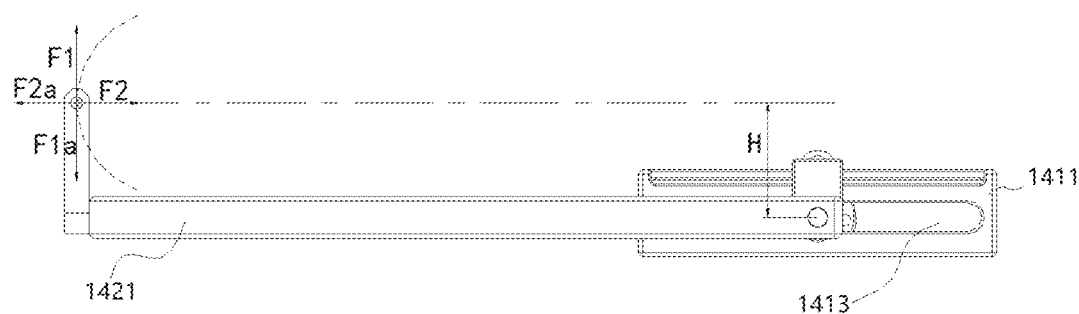
FIG. 37 is a schematic principle view of the control handle rotating in a direction perpendicular to a horizontal plane.

In an embodiment, as shown in FIGS. 36-37, the deflection assembly 141 includes a traction frame 1411. A rotation groove 1412 and a sliding slot 1413 are disposed on the traction frame 1411. The attachment assembly 120 is rotatably plugged into the rotation groove 1412. The pitching assembly 142 is movably connected into the sliding slot 1413, and is slidable in the sliding slot 1413 and rotatable relative to the traction frame 1411.

Specifically, when a force is applied to the control handle 110 through the rotation of the wrist to force the pitching assembly 142 to rotate relative to the traction frame 1411, a movement trajectory of the wrist is not a straight line perpendicular to the horizontal plane, but an arc. That is, when the force exerted by the wrist on the control handle 110 is transmitted to the pitching assembly 142, it may be resolved into a force F1/F1a perpendicular to the horizontal plane and a force F2/F2a parallel to the horizontal plane. The force F1/F1a perpendicular to the horizontal plane drives the pitching assembly 142 to rotate relative to the traction frame 1411 in the direction perpendicular to the horizontal plane, and the force F2/F2a parallel to the horizontal plane drives the pitching assembly 142 to move in the direction parallel to the horizontal plane. By arranging the sliding slot 1413, the movement of the pitching assembly 142 in the direction parallel to the horizontal plane may be compensated, that is, the pitching assembly 142 may move in the sliding slot 1413, so as to avoid stuttering of the pitching assembly 142 due to a lack of the motion compensation in the direction parallel to the horizontal plane during rotation.

It can be understood that, in some embodiments, the center of the pitching assembly 142 may also be configured to be on the axis of the force-applying arm, so that the pitching assembly 142 is only subjected to the external force of rotation. That is, a height difference between a height of the center of the pitching assembly 142 and a height of the axis of the force-applying arm, which is in the direction perpendicular to the horizontal plane, is zero. In this case, even if the wrist holds the control handle 110 to make a movement in a curve, since the center of the pitching assembly 142 and the center of the curve are collinear, a distance from the center of the pitching assembly 142 to any point on the curve is the same. Accordingly, only the pitching assembly 142 needs to be rotatably connected to the traction frame 1411, and the sliding slot 1413 needs not to be provided on the traction frame 1411.

Further, in this embodiment, the number of the sliding slots 1413 is two, and the two sliding slots are arranged on two sides of the traction frame 1411, respectively. It can be understood that in some embodiments, only one sliding slot 1413 may be provided, as long as the displacement compensation of the pitching assembly 142 is achieved by the sliding slot 1413 after the pitching assembly 142 is subjected to a force in the direction parallel to the horizontal plane. It can be understood that the sliding slot 1413 may be in a shape of a rectangle or a curve, as long as the pitching assembly 142 can move within the sliding slot 1413.

Figure 38:
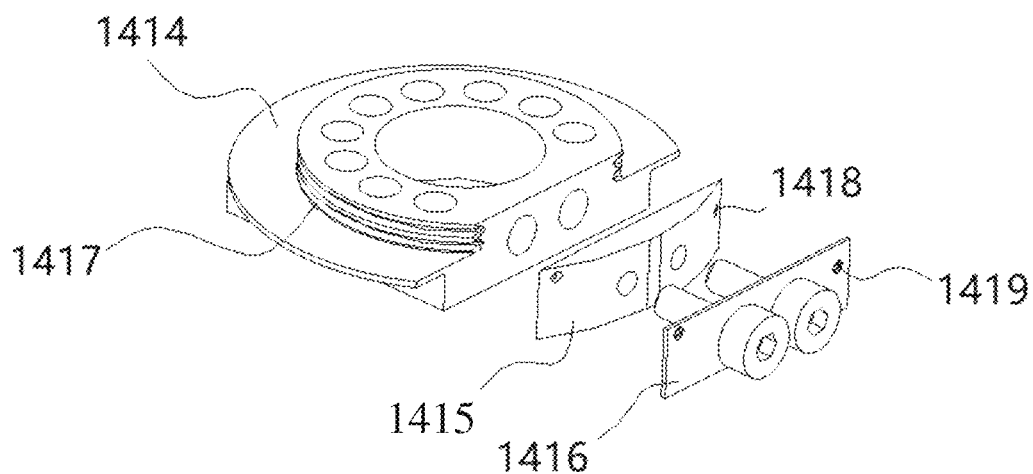
FIG. 38 is a schematic structural view of the deflection assembly in FIG. 34.
Figure 39:
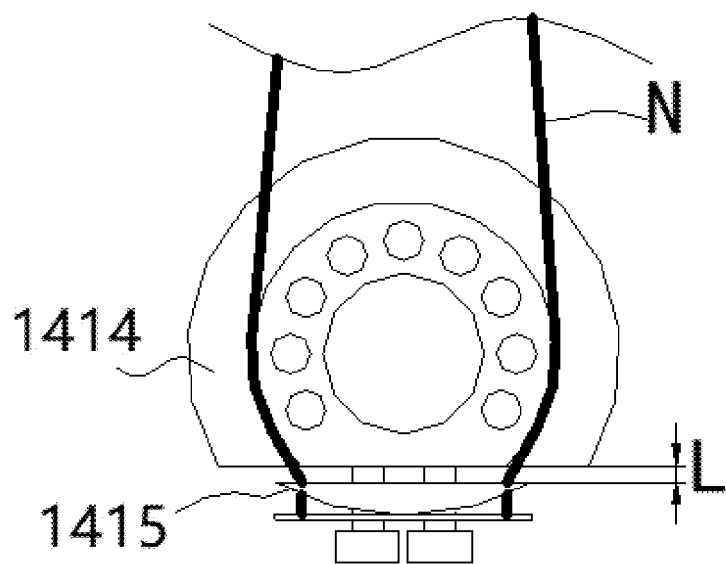
FIG. 39 is a schematic view showing a positional relationship and a force principle of the wire connected to the deflection assembly.
Figure 39:
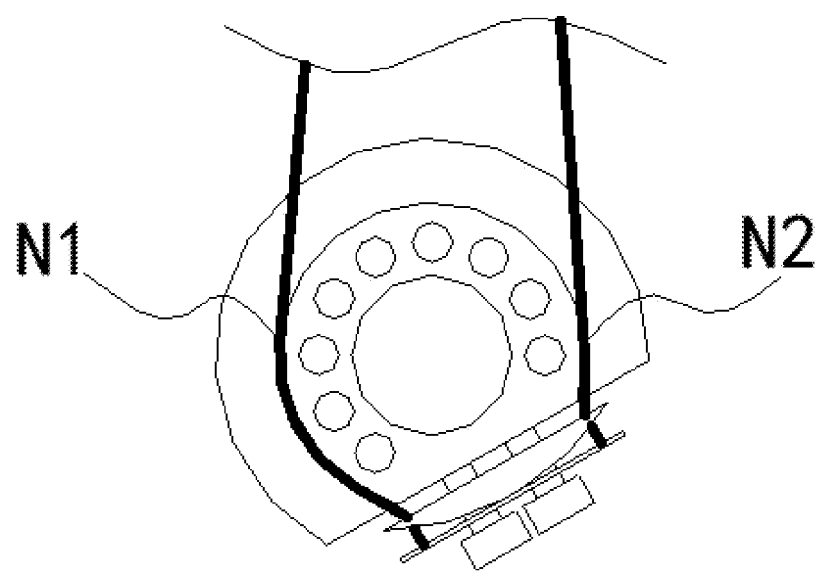

Referring to FIGS. 38-39, the deflection assembly 141 further includes a deflection pulley 1414, a tension pulley 1415, and a connecting piece 1416. The deflection pulley 1414, the tension pulley 1415 and the connecting piece 1416 are sequentially connected by screws, and are all disposed in the rotation groove 1412. The tension pulley 1415 is located between the deflection pulley 1414 and the connecting piece 1416. The deflection pulley 1414 is provided with a deflection wire slot 1417, and the deflection wire slot 1417 is arranged to surround the deflection pulley 1414. The tension pulley 1415 is provided with a first through hole 1418, the connecting piece 1416 is provided with a second through hole 1419. The number of the first through holes 1418 and the number of second through holes 1419 are both two. The first through holes 1418 are disposed on two sides of the tension pulley 1415, respectively, and the second through holes 1419 are disposed on opposite two sides of the connecting piece 1416, respectively. The first through hole 1418 and the corresponding second through hole 1419 are concentric.

After the wire N passes through the deflection wire slot 1417, it passes through the two first through holes 1418 and the two second through holes 1419, and is connected to the connecting piece 1416. When the deflection pulley 1414 deflects, the connecting piece 1416 rotates together with the deflection pulley 1414, and drives the wire N connected to the connecting piece 1416 to move.

It can be understood that the wire N passes through the two second through holes 1419 disposed on two sides of the connecting piece 1416, respectively, that is, the connecting piece 1416 driving the wire N to move is that a swinging of the connecting piece 1416 pulls the wire N disposed on the two sides of the connecting piece, thus one side is a tension side N1, on which the wire N is in a tensioned state, and the other side is a relaxed side N2, on which the wire N is in a relaxed state. The wire N on the tension side N1 is wound on the deflection wire slot 1417, while the wire N on the relaxed side N2 is separated from the deflection wire slot 1417. The wire N on one side is wound and contracted, and the wire N on the other side is separated and extends, thus achieving the effect of pulling the surgical instrument to deflect towards the tension side on which the wire N is tensioned.

It can be understood that wires N of different lengths may be applicable by adjusting a distance L between the tension pulley 1415 and the deflection pulley 1414.

Referring FIGS. 37 and 40-43, the pitching assembly 142 includes a connecting frame 1421, a pitching pulley 1422, a wiring member 1423, and a connecting shaft 1424. The pitching pulley 1422 and the wiring member 1423 are connected by the connecting shaft 1424. The pitching pulley 1422 is disposed inside the sliding slots 1413, and the wiring member 1423 is fixedly connected to the connecting frame 1421. After a force is applied to the control handle 110 through the movement of the wrist, the external force applied to the control handle 110 is transmitted to the pitching pulley 1422 through the connecting frame 1421, so that the pitching pulley 1422 rotates relative to the traction frame 1411 and moves inside the sliding slot 1413.

It can be understood that the rotation of the pitching pulley 1422 is also achieved by forming the relaxed wire N on one side and the tensioned wire N on the other side, so as to form a state of contraction and a state of extension of the wire N on two sides of the pitching pulley 1422, respectively, thereby driving the surgical instrument to swing in the direction perpendicular to the horizontal plane.

Further, a pitching wire slot 1428 is disposed on the pitching pulley 1422, and the pitching wire slot 1428 is arranged to surround the pitching pulley 1422. By embedding the wire N in the pitching wire slot 1428, the wire N is connected to the pitching pulley 1422.

Figure 40:
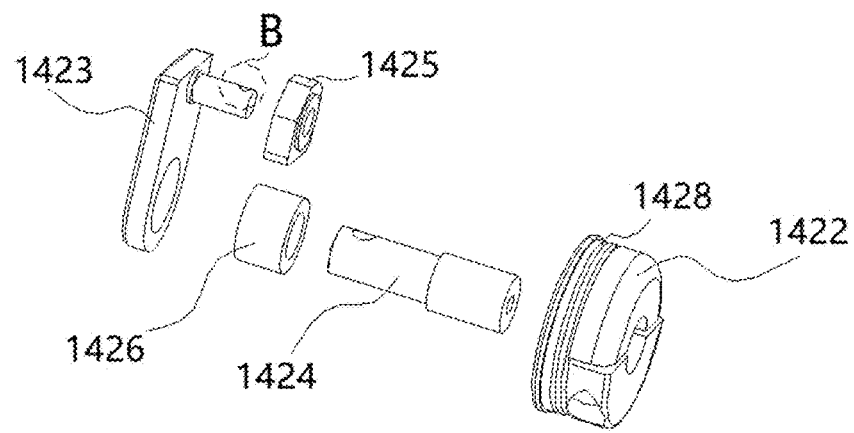
FIG. 40 is an exploded schematic structural view of a pitching assembly in FIG. 34.
Figure 41:
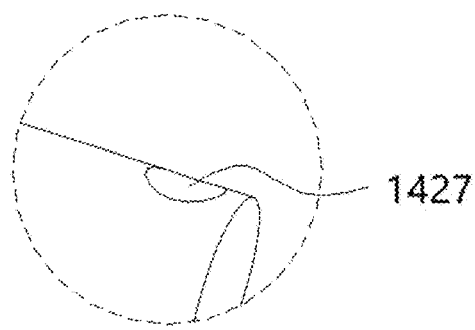
FIG. 41 is a partial enlarged view of portion B in FIG. 40.
Figure 42:
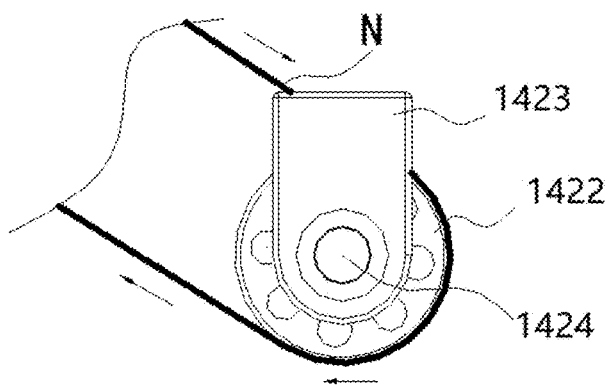
FIG. 42 is a schematic view showing a positional relationship of a traction belt connected to the pitching assembly.
Figure 43:
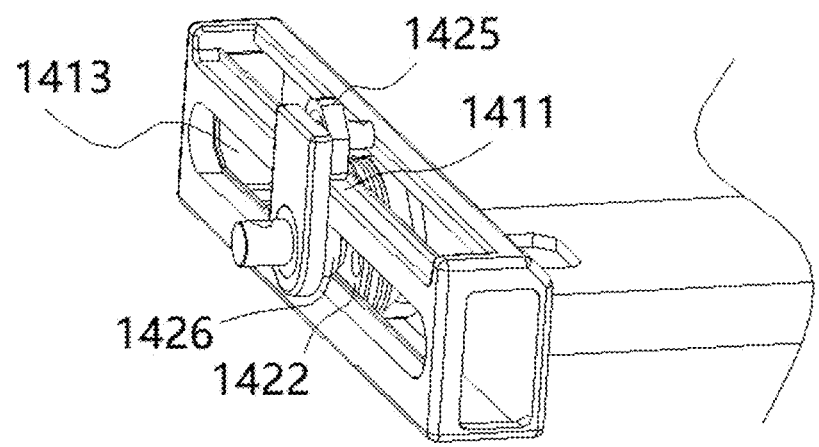
FIG. 43 is a schematic view showing a positional relationship of the pitching assembly and a traction frame.

Further, as shown in FIG. 40, the pitching assembly 142 further includes a sliding block 1425. The sliding block 1425 is connected to the wiring member 1423, is disposed outside the sliding slot 1413 and is in contact with the traction frame 1411. When the pitching pulley 1422 is moving inside the sliding slot 1413, the slidable block 1425 slides on the traction frame 1411 along with the pitching pulley 1422.

Further, as shown in FIG. 40, the pitching assembly 142 further includes a sliding bearing 1426. The sliding bearing 1426 is sleeved on the connecting shaft 1424 and is in contact with the side wall of the sliding slot 1413. When the pitching pulley 1422 moves inside the sliding slot 1413, the sliding bearing 1426 rolls on the side wall of the sliding slot 1413.

It can be understood that, by arranging the slidable block 1425 and the slidable bearing 1426, the pitching assembly 142 may be supported to avoid a friction between the wire N on the pitching pulley 1422 and the inner wall of the sliding slot 1413.

Further, the wiring member 1423 has a wiring hole 1427, and after passing through the wiring hole 1427, the wire N is connected to the pitching pulley 1422, so as to tension the wire N through the distance between the wiring hole 1427 and the pitching pulley 1422.

It can be understood that the control handle 110 may be a handle, a finger sleeve or any other device for controlling the movement of the surgical instrument. In this embodiment, the surgical instrument is a clamp, and the handle controls the clamp to clamp or loosen.

It can be understood that the control handle 110 may control the movement of the surgical instrument by a traction of a wire line, or by providing a driving device such as a motor, a cylinder etc. cooperating with a corresponding control circuit, as long as the movement of the surgical instrument may be controlled by the control handle 110.

Figure 44:
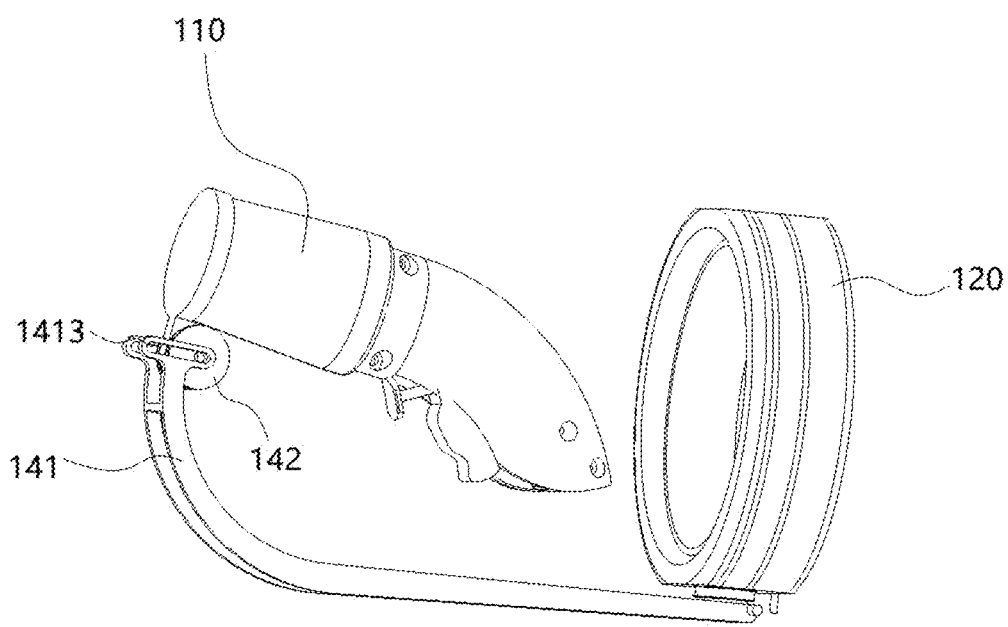
FIG. 44 is a schematic view showing a positional relationship of a rotational connection formed between the deflection assembly and the control handle by the pitching assembly.

In an embodiment, as shown in FIG. 44, the two ends of the deflection assembly 141 may be rotatably connected to the attachment assembly 120 directly and form a rotatable connection with the control handle 110 through the pitching assembly 142, respectively. The axis of the rotatable connection formed between the deflection assembly 141 and the attachment assembly 120 is perpendicular to the axis of the rotatable connection formed between the deflection assembly 141 and the control handle 110 through the pitching assembly 142. The rotatable connection formed between the deflection assembly 141 and the control handle 110 through the pitching assembly 142 forms a pitching rotation joint, and the rotatable connection between the deflection assembly 141 and the attachment assembly 120 forms a deflection rotation joint.

It can be understood that when the pivot point of the rotatable connection formed between the deflection assembly 141 and the control handle 110 through the pitching assembly 142 is located on the axis of the attachment assembly 120, the deflection assembly 141 may be rotatably connected to the control handle 110 directly. In this case, a component such as a rotation shaft cooperating with a shaft hole, a bearing or a hinge arranged between the deflection assembly 141 and the control handle 110, etc., through which the rotatable connection is formed between the deflection assembly 141 and the control handle 110, may be understood as the pitching assembly 142. The pitching rotation joint is formed between the deflection assembly 141 and the control handle 110 through the pitching assembly 142.

However, when the pivot point of the rotatable connection formed between the deflection assembly 141 and the control handle 110 through the pitching assembly 142 is not located on the axis of the attachment assembly 120, since the motion path is a spherical surface when the control handle 110 is operated, as shown in FIG. 44, the displacement-compensated sliding slot 1413 is necessarily provided on the deflection assembly 141.

It can be understood that in this embodiment, the rotation axis of the pitching rotation joint formed between the deflection assembly 141 and the control handle 110 through the pitching assembly 142 is parallel to the horizontal plane, while the rotation axis of the deflection rotation joint formed between the deflection assembly 141 and the attachment assembly 120 is perpendicular to the horizontal plane. In other embodiments, the structure of the deflection assembly 141 or the structure of the pitching assembly 142 may be adjusted to ensure that the rotation axis of the rotation joint formed between the deflection assembly 141 and the control handle 110 through the pitching assembly 142 is perpendicular to the horizontal plane, while the rotation axis of the deflection rotation joint formed between the deflection assembly 141 and the attachment assembly 120 is parallel to the horizontal plane.

Figure 45:
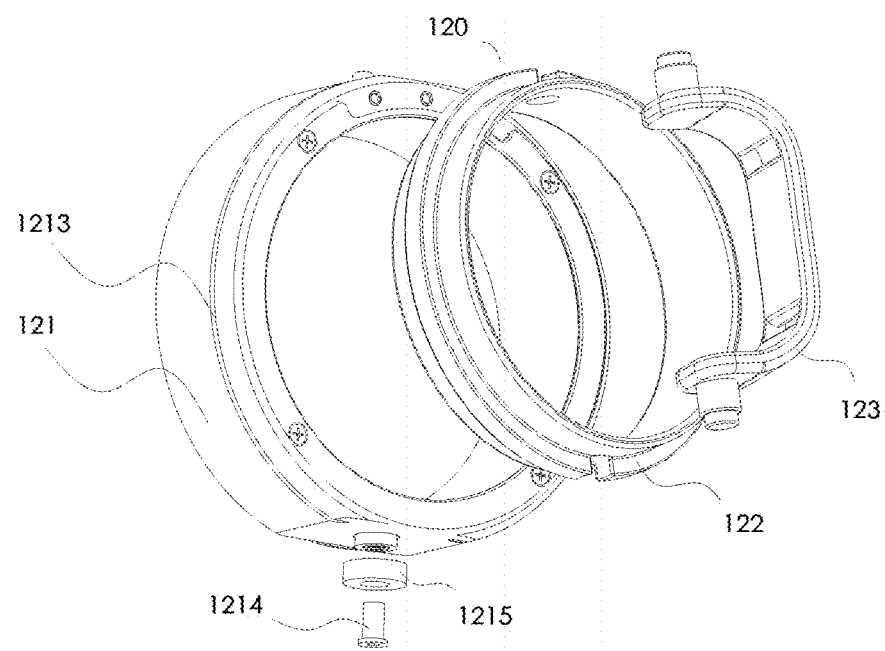
FIG. 45 is a schematic structural view of the attachment assembly in FIG. 33.
Figure 46:
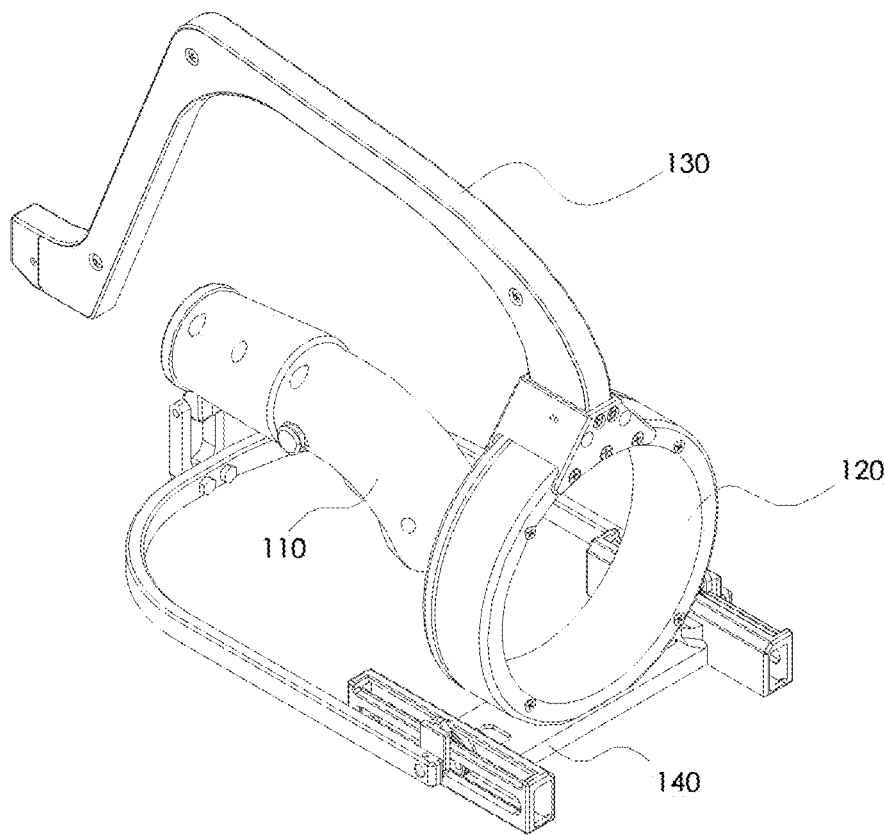
FIG. 46 is a schematic structural view of the series motion mechanism and a frame according to another embodiment of the present application.
Figure 47:
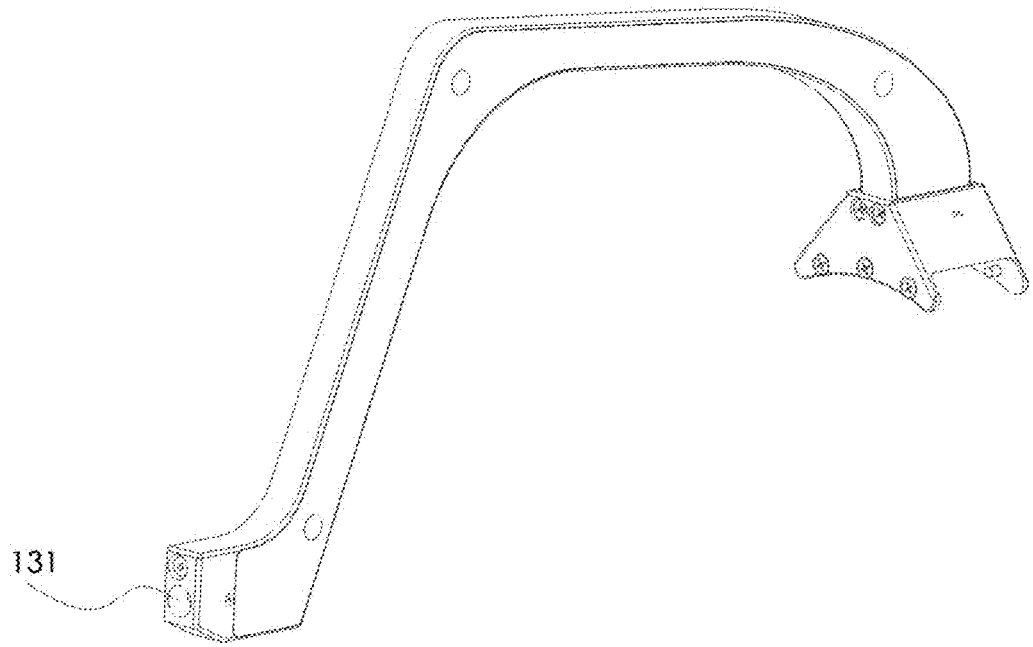
FIG. 47 is a schematic structural view of the frame in FIG. 46.

In an embodiment as shown in FIG. 45, the attachment assembly 120 is provided with a wiring groove 1213, and the wiring groove 1213 is disposed on and surrounds the outer wall of the attachment assembly 120. After the wire N is connected to the deflection assembly 141, the portion of the wire N passing through the attachment assembly 120 is received in the wiring groove 1213. It can be understood that when the deflection assembly 141 deflects to pull the surgical instrument through the wire N, the wire N slides inside the wiring groove 1213.

Further, the fixing member 121 is rotatably connected to the traction frame 1411, the wiring groove 1213 is disposed on and surrounds the outer wall of the fixing member 121, and the attachment member 122 is embedded in the inner wall of the fixing member 121.

Further, a rotation shaft 1214 is provided on the outer wall of one end of the fixing member 121 where the fixing member 121 is rotatably connected to the traction frame 1411, and a rotation bearing 1215 is sleeved on the rotation shaft 1214. The rotation bearing 1215 is arranged on and connected to the traction frame 411, such that the rotational connection between the attachment assembly 120 and the series joint 140 is achieved by a relative rotation between the rotation shaft 1214 and the rotation bearing 1215.

A linkage is formed between the series motion mechanism and the surgical instrument by the wire N, so that when a medical staff applies a force to the control handle 110, the surgical instrument is driven to move by means of the wire N, thereby controlling the surgical instrument to rotate and change direction only by the wrist exerting force, and reducing a workload of the medical staff.

Specifically, one end of the frame 130 is provided with a connecting part 131 connected to the surgical instrument. One end of the surgical instrument may be connected to the frame 130 through the connecting part 131, and the attachment assembly 120 is fixedly connected to the other end of the frame 130 away from the connecting part 131.

It can be understood that the connecting part 131 may be any part such as a buckle, a groove, a magnetic member, etc., as long as the surgical instrument may be connected to the frame 130 through the connecting part 131.

In this embodiment, the wire N is connected to two sides parallel to the horizontal plane and two sides perpendicular to the horizontal plane of one end of the surgical instrument away from the frame 130, respectively. The wire N connected to two sides parallel to the horizontal plane of the surgical instrument is also connected to the deflection assembly 141, and the wire N connected to the two sides perpendicular to the horizontal plane of the surgical instrument is also connected to the pitching assembly 142. After the arm passes through the attachment assembly 120 and holds the control handle 110, and when the wrist deflects along the horizontal plane, by taking the arm as the lever, and taking the contact point between the arm and the attachment assembly 120 as the fulcrum, the control handle 110 drives the series joint 140 to deflect together, so that the series joint 140 rotates relative to the attachment assembly 120, namely, so that the deflection assembly 141 on the series joint 140 is forced to deflect. The wire N is connected between the deflection assembly 141 and the end of the surgical instrument away from the frame 130, and one end of the surgical instrument is connected to the connecting part 131 of the frame 130, therefore, when the deflection assembly 141 deflects, the wire N drives the surgical instrument to deflect in the direction parallel to the horizontal plane.

When the wrist moves in the direction perpendicular to the horizontal plane, by taking the contact point between the arm and the attachment assembly 120 as a fulcrum, the control handle 110 drives the pitching assembly 142 on the connecting frame 1421 to rotate relative to the traction frame 1411, such that the wire N drives the surgical instrument to deflect in the direction perpendicular to the horizontal plane.

It can be understood that the wire N is a rigid wire, and when being connected to the surgical instrument, the deflection assembly 141 and the pitching assembly 142, the wire N is in a tensioned state. In this embodiment, the wire N is a steel wire.

It can be understood that the wire N is connected to the pitching assembly 142 by being wound on the pitching assembly 142. When the pitching assembly 142 rotates relative to the traction frame 1411, the frictional force between the wire N and the pitching assembly 142 drives the wire N to exert force on the surgical instrument.

It can be understood that in this embodiment, the surgical instrument may be a clamp, a needle, or a knife, etc., and an execution end thereof is provided with a movable joint, which is connected to the frame 130 through a rigid pole, so that when the wire N exerts an external traction force on the surgical instrument, by taking the location where the rigid pole and the frame are connected as the fulcrum, the surgical instrument is driven to move by means of the movable joint.

Figure 48:
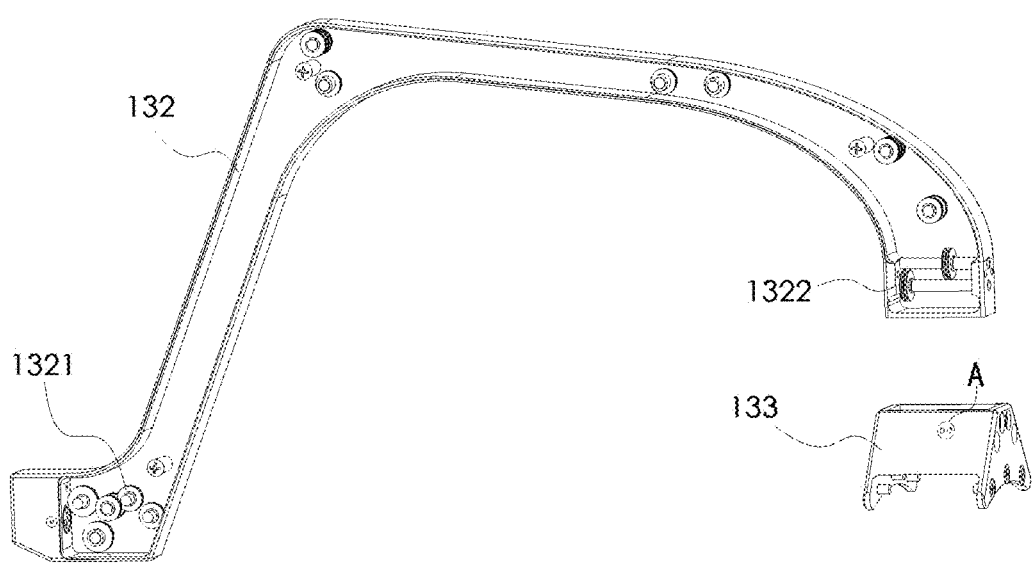
FIG. 48 is an exploded schematic structural view of the frame in FIG. 47.
Figure 49:
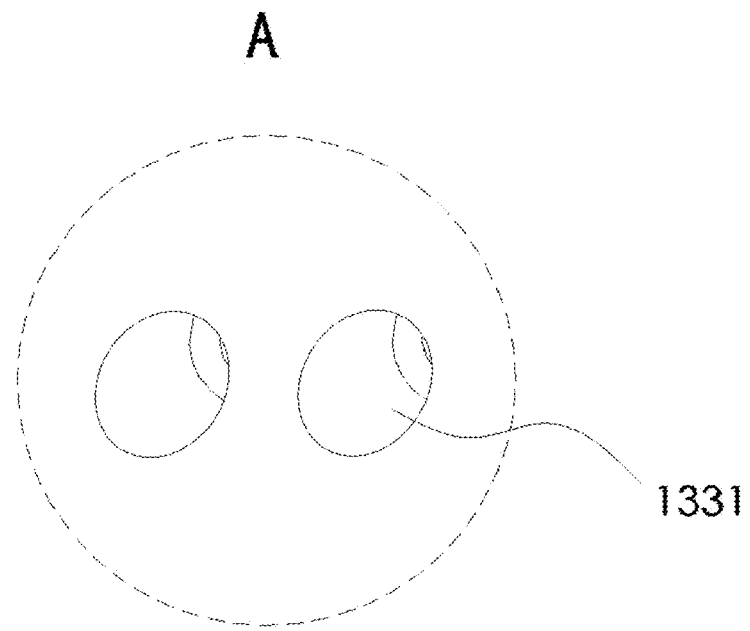
FIG. 49 is a partial enlarged schematic view of portion A in FIG. 48.

In an embodiment, as shown in FIGS. 48-49, the frame 130 includes a wiring frame 132 and a tying case 133. The connecting part 131 is arranged at one end of the wiring frame 132, the tying case 133 is connected to the end of the wiring frame 132 away from the connecting part 131, and the wiring frame 132 is connected to the attachment assembly 120 through the tying case 133. The wiring frame 132 is hollow. After the wire N is connected to the surgical instrument, it extends from the end of the wiring frame 132 proximate to the connecting part 131 into the tying case 133, and passes through the tying case 133 and then is connected to the deflection assembly 141 and the pitching assembly 142.

Specifically, a wiring hole 1331 is defined in the tying case 133. After the wire N extends to the tying case 133, the wire N passes through the wiring hole 1331 of the tying case 133 to connect the pitching assembly 142 and the surgical instrument, thereby realizing a connection with the pitching assembly 142.

Further, both the wiring hole 1427 and the wiring hole 1331 are countersunk holes, and a spring sleeve (not shown) is arranged between the wiring hole 1427 and the wiring hole 1331. Two ends of the spring sleeve are inserted into the wiring hole 1427 and the wiring hole 1331, respectively. After passing through the wiring hole 1331, the wire N passes through the spring sleeve and enters the wiring hole 1427.

It can be understood that the function of the spring sleeve is to provide elastic forces for the wire N when the pitching pulley 1422 slides inside the sliding slot 1413, thereby preventing the wire N from loosening.

It can be understood that after the attachment assembly 120 is connected to the tying case 133, the tying case 133 does not close the wiring groove 1213, so that the wire N can enter the wiring groove 1213 from the tying case 133.

Further, a plurality of guiding wheels 1321 are provided inside the wiring frame 132. After the wire N enters the wiring frame 132 from the connecting part 131, it is guided by the plurality of guiding wheels 1321, which help the wire N in changing a direction while the wire N extends from the connecting part 131 to the tying case and keep the wire N tensioned.

It can be understood that the positions of the guiding wheels 1321 inside the wiring frame 132 may be adjusted according to the shape of the wiring frame 132, as long as the guiding wheels 1321 may help the wire N in changing the direction inside the wiring frame 132 and keep the wire N tensioned.

It can be understood that, in some embodiments, the guiding wheel 1321 may not be provided, and the direction of the wire N may be changed and the wire N may be kept tensioned by means of the inner wall of the wiring frame 132 directly.

Further, a steering pulley 1322 is also provided inside the wiring frame 132, and the steering pulley 1322 is arranged at one end of the wiring frame 132 away from the tying case 133. After the wire N passes through the steering pulley 1322, it passes through the tying case 133 through the wiring hole 1331, so as to be connected to the pitching assembly 142.

It can be understood that the execution assembly 20 includes multiple movable joints, which may be in the form of hinges and levers, as long as the wire and the series motion mechanism may drive the execution assembly 20 to deflect in the directions parallel to or perpendicular to the horizontal plane.

The principle of the series motion mechanism provided in the present application is as follows: first, the wire is connected to the opposite sides parallel to the horizontal plane and the opposite sides perpendicular to the horizontal plane of one end of the execution assembly 20 away from the frame 130; the wire connected to the two opposite sides parallel to the horizontal plane is connected to the deflection assembly 141, and the wire connected to the opposite sides perpendicular to the horizontal plane is connected to the pitching assembly 142, so that the execution assembly 20, the pitching assembly 142 and the deflection assembly 141 are connected together by the wire. Then, the arm passes through the attachment assembly 120 and holds the control handle 110. When the surgical instrument needs to deflect left and right in the directions parallel to the horizontal plane, the wrist only needs to twist left and right, so that, by taking the contact point where the arm contacts the attachment assembly 120 as the fulcrum, the control handle 110 drives the connecting frame 1421 and the traction frame 1411 to rotate relative to the attachment assembly 120, that is, the deflection assembly 141 located on the traction frame 1411 rotates, thereby pulling the surgical instrument to deflect to left and right through the wire. When the surgical instrument needs to deflect up and down in the direction perpendicular to the horizontal plane, the wrist only needs to twist up and down, so that the control handle 110 drives the connecting frame 1421 to rotate relative to the traction frame 1411, that is, the pitching assembly 142 connected to the connecting frame 1421 rotates relative to the traction frame 1411, thereby pulling the surgical instrument to deflect up and down in the direction perpendicular to the horizontal plane by means of the wire connected to the pitching assembly 142.

The series joint 140 is driven by the control handle 110 to resolve the compound motion of the control handle 110 into a rotation parallel to the horizontal direction and a rotation perpendicular to the horizontal plane, and the rotational motions are transmitted to the execution assembly 20, so that the operation of the execution assembly 20 may be performed only through the control handle 110, thereby reducing the workload due to the frequent movement of the arm and reducing inconvenience of operation during the surgery.

Figure 50:
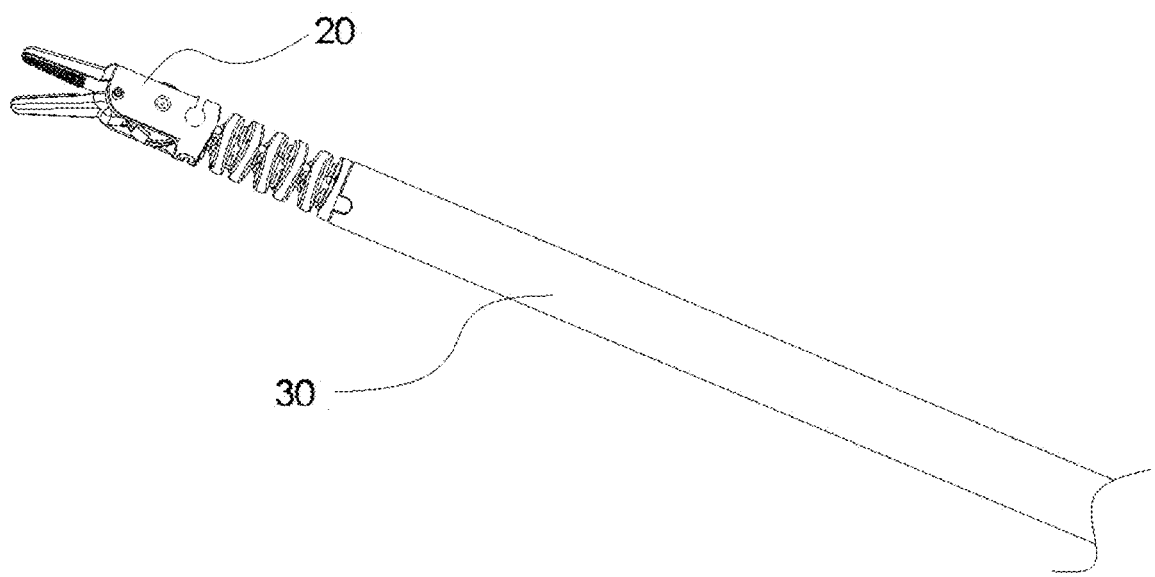
FIG. 50 is a schematic structural view of the execution assembly and the connecting rod in FIG. 1.

In an embodiment, as shown in FIG. 50, the execution assembly 20 includes multiple movable joints, which may be in the form of hinges and levers, as long as the wire and the series motion mechanism may drive the execution assembly 20 to deflect in the directions parallel to or perpendicular to the horizontal plane.

In an embodiment, as shown in FIG. 1, the connection assembly 40 includes a master transmission mechanism 400 and a slave transmission mechanism 500.

Figure 51:
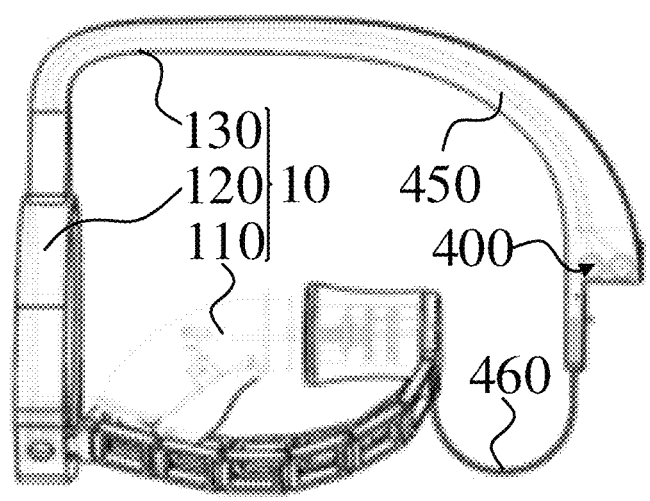
FIG. 51 is a schematic assembly structure view of a main control assembly and a master transmission mechanism in FIG. 1.
Figure 52:
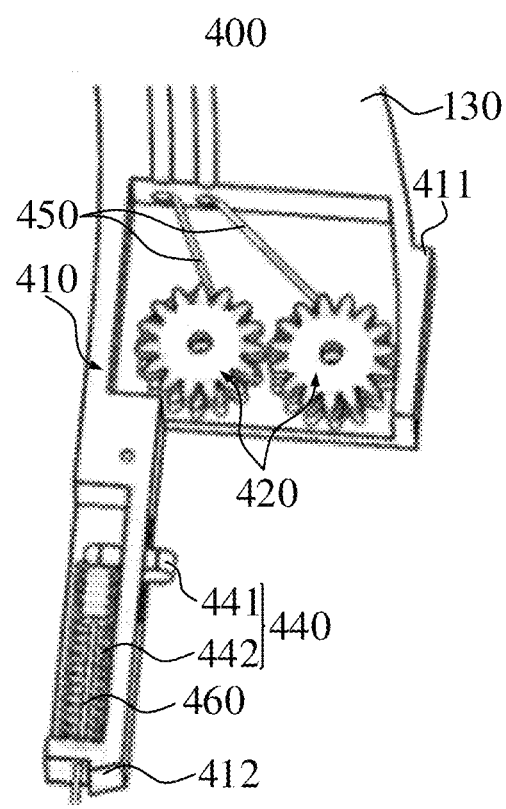
FIG. 52 is an enlarged schematic structural view of the master transmission mechanism according to an embodiment of the present application.
Figure 53:
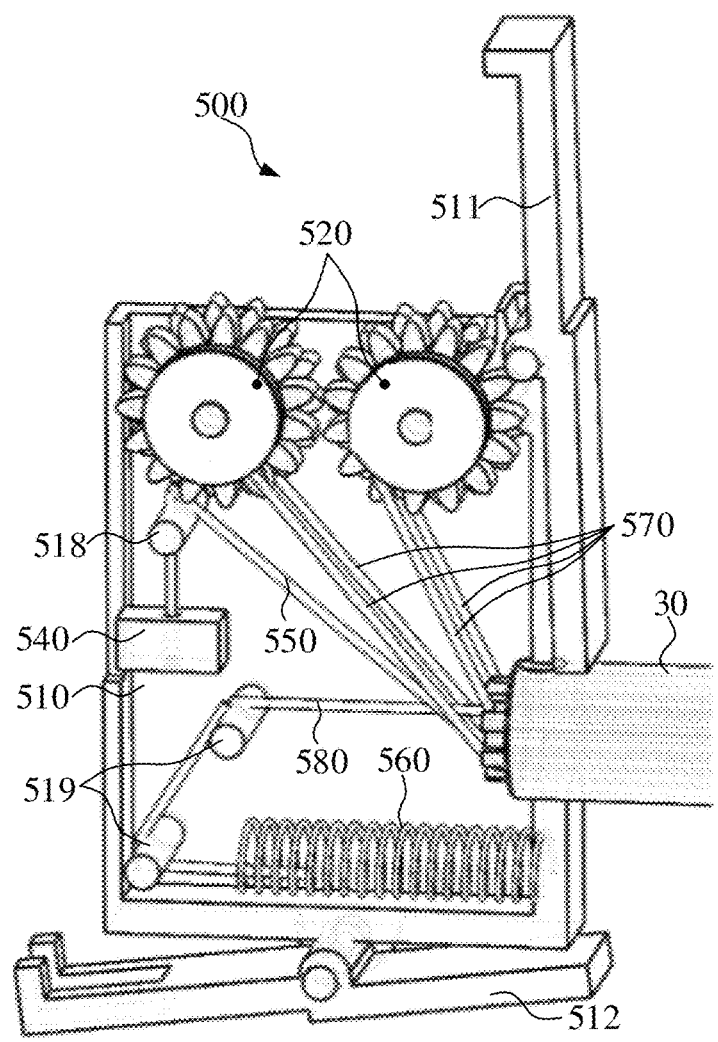
FIG. 53 is an enlarged schematic structural view of a slave transmission mechanism according to an embodiment of the present application.

Specifically, as shown in FIGS. 51-53, the master transmission mechanism 400 includes a master transmission basal body 410 and a master transmitting member. The master transmission basal body 410 may be fixedly connected to the main control assembly 10 configured to output an execution action, and the master transmitting member is disposed on the master transmission basal body 410, and the master transmitting member may also be drivably connected to the main control assembly 10. The slave transmission mechanism 500 includes a slave transmission basal body 510 and a slave transmitting member. The slave transmission basal body 510 may be fixedly connected to the execution assembly 20 configured to receive an execution action. The slave transmitting member is disposed on the slave transmission basal body 510, and the slave transmitting member may also be drivably connected to the execution assembly 20. The master transmission basal body 410 is detachably engaged with the slave transmission basal body 510, and when the master transmission basal body 410 engages with the slave transmission basal body 510, the master transmitting member is drivably connected to the slave transmitting member.

For the connection assembly 40 in the minimally invasive surgical instrument, not only the connection assembly 40 can be drivably connected to the main control assembly 10 and the execution assembly 20, respectively, to realize the transmission function between the main control assembly 10 and the execution assembly 20, but also the detachable engagement relationship between the master transmission mechanism 400 and the slave transmission mechanism 500 in the connection assembly 40 also allows the main control assembly 10 to be separated from the execution assembly 20. The connection assembly 40 provided in the present application not only allows the main control assembly 10 to be used in conjunction with different types of execution assemblies 20, but also disinfection and sterilization of corresponding specifications may be performed on the used main control assembly 10 and the used execution assembly 20, thereby effectively saving a disinfection cost of the minimally invasive surgical instrument, and reducing the disinfection difficulty of the minimally invasive surgical instrument.

Optionally, the master transmission basal body 410 and the main control assembly 10 are fixedly connected directly or through the intermediate connection assembly 40. Similarly, the slave transmission basal body 510 and the execution assembly 20 are fixedly connected directly or through the intermediate connection assembly 40. The master transmission basal body 410 and the other end of the frame 130 away from the attachment assembly 120 are integrally formed.

Further, as shown in FIG. 1 and FIG. 50, the minimally invasive surgical instrument further includes a hollow connecting rod 30. One end of the connecting rod 30 is connected to the execution assembly 20, the other end of the connecting rod 30 is fixedly connected to the slave transmission basal body 510, and the inside of the connecting rod 30 allows a structural member configured to drivably connect the execution assembly 20 to the slave transmitting member to go through. In this embodiment, the structural member is the wire. The connecting rod 30 may effectively increase the distance between the main control assembly 10 and the execution assembly 20, allowing the surgeon to have a larger operating space. During use, the connecting rod 30 is connected to the frame 130 through the connection assembly 40. After use, the connecting rod 30 is easily separated from the frame 130, which facilitates subsequent sterilization or replacement of the execution assemblies 20 of different types. The sequential transmission among the main control assembly 10, the master transmitting member, the slave transmitting member and the execution assembly 20 ensures that the execution assembly 20 operates under the control of the main control assembly 10.

In an embodiment of the present application, the master transmitting member includes the first master transmitting part and the second master transmitting part, the first master transmitting part and the second master transmitting part are fixedly connected, the first master transmitting part and the second master transmitting part are arranged on the master transmission basal body 410, and the first master transmitting part may be drivably connected to the main control assembly 10. The slave transmitting member include the first slave transmitting part and the second slave transmitting part, the first slave transmitting part and the second slave transmitting part are fixedly connected, the first slave transmitting part and the second slave transmitting part are arranged on the slave transmission basal body 510, and the first slave transmitting part may be drivably connected to the execution assembly 20. When the master transmission basal body 410 engages with the slave transmission basal body 510, the second master transmitting part is drivably connected to the second slave transmitting part. In this embodiment, the main control assembly 10, the first master transmitting part, the second master transmitting part, the second slave transmitting part, the first slave transmitting part and the execution assembly 20 are drivably connected in sequence. Optionally, the first master transmitting part is fixedly connected to the second master transmitting part, and the first slave transmitting part is fixedly connected to the second slave transmitting part by means of respective fixing pieces. Alternatively, the first master transmitting part and the second master transmitting part is integrally formed, and the first slave transmitting part and the second slave transmitting part is integrally formed. In this embodiment, the first master transmitting part, the second master transmitting part, the second slave transmitting part, and the first slave transmitting part cooperate to realize the drivable connection between the main control assembly 10 and the execution assembly 20, and such a structure is stable and has the advantage of easy disassembly.

As another implementable embodiment, the drivable connections between the first master transmitting part and the second master transmitting part, and between the first slave transmitting part and the second slave transmitting part may also be implemented in other manners. It can be understood that in the embodiments above, when the master transmission basal body 410 is separated from the slave transmission basal body 510, the second master transmitting part and the second slave transmitting part are also separated, so that corresponding subsequent operations (such as disinfection, etc.) may be performed on the main control assembly 10 and the execution assembly 20, respectively.

The main control assembly 10 and the master transmission mechanism 400 are connected by wires, and the execution assembly 20 and the slave transmission mechanism 500 are connected by wires. In this embodiment, as shown in FIGS. 52-53, wires include a control wire 450 and an execution wire 570. In an embodiment of the present application, the type of the first master transmitting part or the first slave transmitting part includes reel, sprocket or pulley. Correspondingly, the first master transmitting part and the main control assembly 10 are drivably connected by the control wire 450, a control chain, or a control belt, and the first master transmitting part allows the control wire 450, the control chain, or the control belt to be wound or to pass. The first slave transmitting part and the execution assembly 20 are drivably connected by the execution wire 570, an execution chain, or an execution belt, and the first slave transmitting part allows the execution wire 570, the execution chain, or the execution belt to be wound or to pass. The transmission modes of wire, chain, and belt may effectively realize a drivable connection between the first master transmitting part and the main control assembly 10 and a drivable connection between the first slave transmitting part and the execution assembly 20. As an implementable embodiment, as shown in FIGS. 51-53, the first master transmitting part and the main control assembly 10 are drivably connected by the control wire 450, and the first slave transmitting part and the execution assembly 20 are drivably connected by the execution wire 570. Correspondingly, the first master transmitting part and the first slave transmitting part are reels, respectively. The wire-type transmission can simplify the structure of the first master transmitting part and the first slave transmitting part. Further, the control wire 450 and the execution wire 570 are flexible wires, such as steel wires, ropes, and the like.

In an embodiment of the present application, as shown in FIGS. 52-53, both the second master transmitting part and the second slave transmitting part include gears, and the second master transmitting part and the second slave transmitting part constitute a gear pair. When the master transmission basal body 410 engages with the slave transmission basal body 510, the second master transmitting part engages with the second slave transmitting part to realize a transmission. A gear transmission facilitates quick engagement and disengagement, and has good interchangeability. When the first master transmitting part and the first slave transmitting part are reels, respectively, the first master transmitting part and the second master transmitting part form a master wiring gear wheel 420, which is rotatably mounted on the master transmission basal body 410. A slave wiring gear wheel 520 is formed between the first slave transmitting part and the second slave transmitting part, and the slave wiring gear wheel 520 is rotatably installed on the slave transmission basal body 510. The master wiring gear wheel 420 is connected to the main control assembly 10 through the control wire 450, and the slave wiring gear wheel 520 is connected to the execution assembly 20 through the execution wire 570. When the master transmission basal body 410 engages with the slave transmission basal body 510, the master wiring gear wheel 420 and the slave wiring gear wheel 520 realize a gear transmission, and when the master transmission basal body 410 is separated from the slave transmission basal body 510, the master wiring gear wheel 420 disengages from the slave wiring gear wheel 520.

Figure 56:
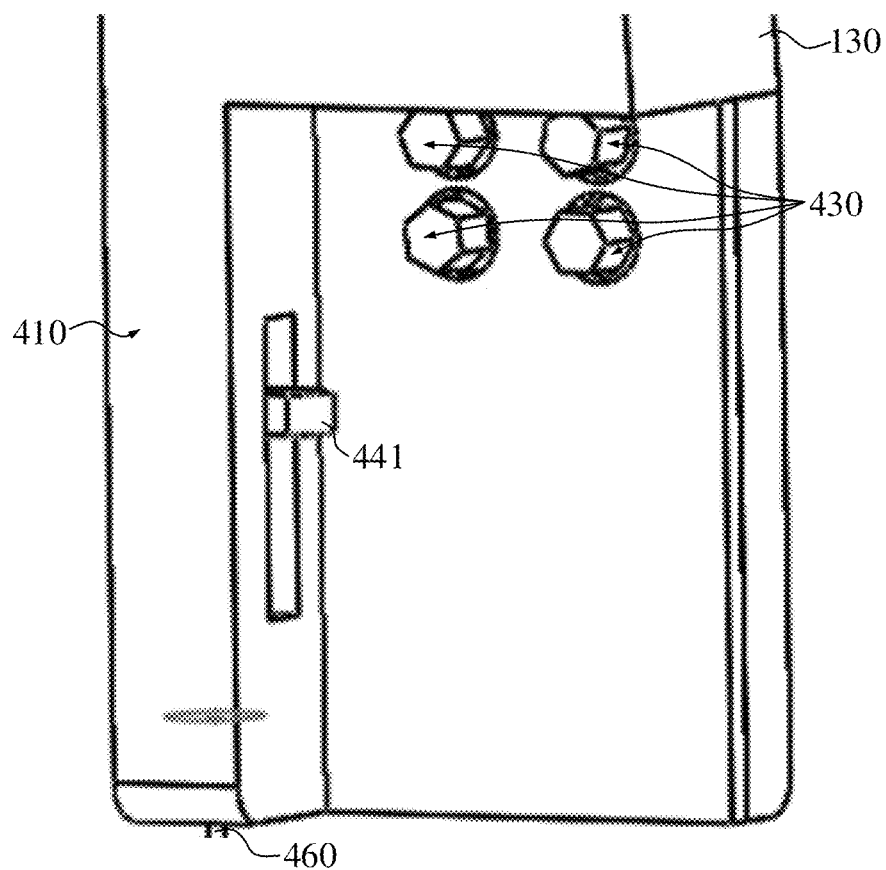
FIG. 56 is a schematic view of the master transmission mechanism according to another embodiment of the present application.
Figure 57:
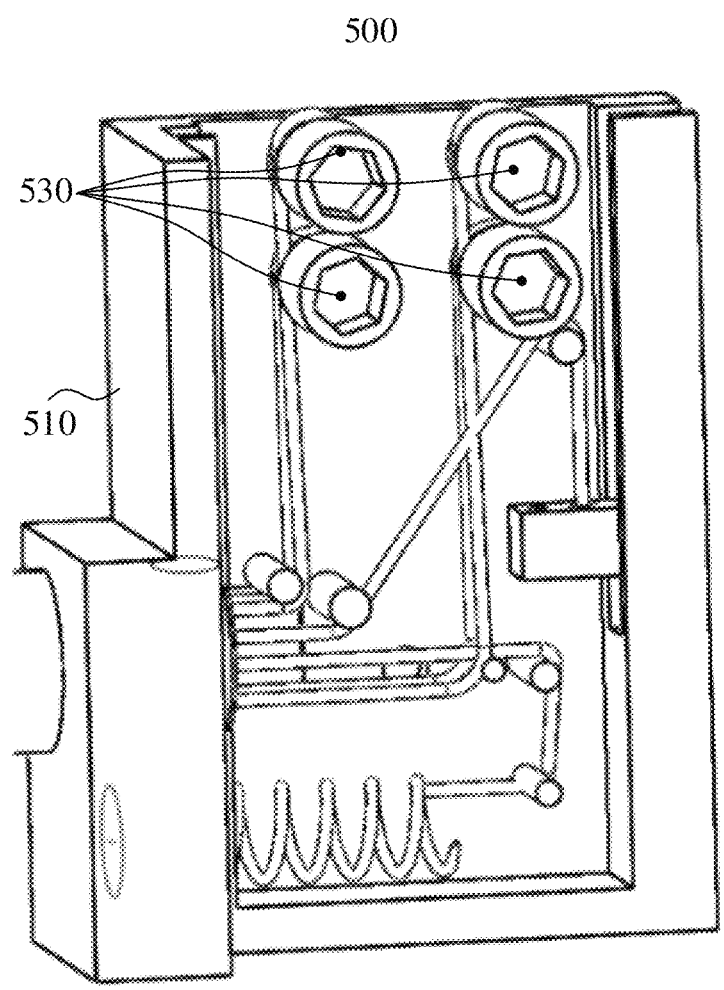
FIG. 57 is a schematic view of the slave transmission mechanism according to another embodiment of the present application.

In another embodiment of the present application, the second master transmitting part includes a polygonal shaft (or a polygonal slot), and the second slave transmitting part includes a polygonal slot (or a polygonal shaft). When the master transmission basal body 410 engages with the slave transmission basal body 510, the second master transmitting part engages with the second slave transmitting part by plugging. The configuration of the polygonal shafts and the adapted polygonal slots (e.g., hexagon slots) may also facilitate transmission engagement and disengagement between the second master transmitting part and the second slave transmitting part. As shown in FIGS. 56-57, when the first master transmitting part and the first slave transmitting part are reels, respectively, the first master transmitting part and the second master transmitting part form a male wire pulley 430, and the male wire pulley 430 is rotatably arranged on the master transmission basal body 410. A female wire pulley 530 is formed between the first slave transmitting part and the second slave transmitting part, and the female wire pulley 530 is rotatably arranged on the slave transmission basal body 510. The male wire pulley 430 is connected to the main control assembly 10 through the control wire 450, and the female wire pulley 530 is connected to the execution assembly 20 through the execution wire 570. When the master transmission basal body 410 engages with the slave transmission basal body 510, the male wire pulley 430 and the female wire pulley 530 engage to realize a transmission. When the master transmission basal body 410 is separated from the slave transmission basal body 510, the male wire pulley 430 disengages from the female wire pulley 530. Of course, in other embodiments, the first master transmitting part may also form a female wire pulley, and the second master transmitting part may form a male wire pulley.

Figure 54:
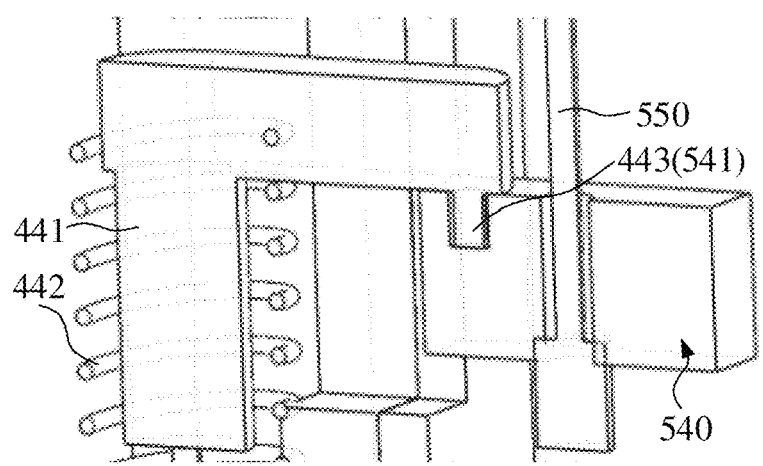
FIG. 54 is a schematic assembly structure view of a master closing part and a slave closing part according to an embodiment of the present application.

In an embodiment of the present application, a pitching or a deflection of the execution assembly 20 is realized when the first master transmitting part and the second master transmitting part engage, and when the first slave transmitting part and the second slave transmitting part engage. The execution assembly 20 may implement the pitching or the deflection, thereby effectively enhancing the generality and the adaptability of the execution assembly 20 to actual working conditions. Further, as shown in FIGS. 52-54, the master transmitting member includes four groups of first master transmitting parts and second master transmitting parts, and the four first master transmitting parts each are drivably connected to the main control assembly 10. The slave transmitting member includes four groups of first slave transmitting parts and second slave transmitting parts, and the four first slave transmitting parts each are drivably connected to the execution assembly 20. The four second master transmitting parts each are drivably connected to a corresponding second slave transmitting part. The four groups of first master transmitting parts and second master transmitting parts, and the four groups of first slave transmitting parts and second slave transmitting parts are configured to drive the execution assembly 20 to realize a down motion, an up motion, a left deflection or a right deflection, respectively.

As an implementable embodiment, as shown in FIGS. 51-53, the master transmitting member includes four master wiring gear wheels 420, and the slave transmitting member also includes four slave wiring gear wheels 520. The four master wiring gear wheels 420 engage with four wiring gear wheels 520 one-to-one to realize a transmission. The main control assembly 10 controls the down motion, the up motion, the left deflection or the right deflection of the execution assembly 20 by means of the control wire 450 and the execution wire 570. As another implementable embodiment, as shown in FIGS. 56-57, the master transmitting member includes four male wire pulleys 430, and the slave transmitting member also includes four female wire pulleys 530. The four male wire pulleys 430 engage with the four female wire pulleys 530 one-to-one to realize the transmission, and the main control assembly 10 controls the down motion, the up motion, the left deflection, or the right deflection of the execution assembly 20 by means of the control wire 450 and the execution wire 570. It should be noted that the down motion and the up motion in this embodiment are different-direction rotations of the execution assembly 20 around the same pitching rotation shaft, and the left deflection and right deflection are different-direction rotations of the execution assembly 20 around the same deflection rotation shaft. The axis of the pitching rotation shaft, the axis of the deflection rotation shaft, and the axis of the connecting rod 30 are perpendicular to each other.

In an embodiment of the present application, as shown in FIGS. 52-54, the master transmitting member further includes a master closing part 440. The master closing part 440 is arranged on the master transmission basal body 410, and may be drivably connected to the main control assembly 10. The slave transmitting member also includes a slave closing part. The slave closing part is arranged on the slave transmission basal body 510, and drivably connected to the execution assembly 20. When the master transmission basal body 410 engages with the slave transmission basal body 510, the master closing part 440 is drivably connected to the slave closing part. When the master closing part 440 is actuated by the main control assembly 10, the master closing part 440 actuates the slave closing part to control the execution assembly 20 to close. The engagement of the master closing part 440 and the slave closing part may allow the main control assembly 10 to control the execution assembly 20 to close. Optionally, the drivable connection between the master closing part 440 and the main control assembly 10 and the drivable connection between the slave closing part and the execution assembly 20 may be realized by means of wire, chain or transmission belt. As an implementable embodiment, the master closing part 440 and the main control assembly 10 are connected through the master closing wire 460, and the master closing part 440 is slidably arranged on the master closing basal body. The slave closing part and the execution assembly 20 are connected through the slave closing wire 550. The slave transmission basal body 510 is provided with a closing pin roll 518, and the closing pin roll 518 allows one end of the slave closing wire 550 proximate to the slave closing part to pass and to change its extension direction. When sliding, the master closing part 440 pushes the slave closing part to move synchronously, thereby stretching the slave closing wire 550 to realize the closing of the execution assembly 20.

Further, as shown in FIGS. 52-54, the master closing part 440 includes a master closing slidable block 441 and a master resetting member 442. The master closing slidable block 441 is slidably arranged on the master closing basal body. The master closing slidable block 441 is fixedly connected to the control handle 110 in the main control assembly 10 through the master closing wire 460. The master resetting member 442 is arranged between the master transmission basal body 410 and the master closing slidable block 441. The slave closing part includes a slave closing block 540. The slave closing block 540 may be fixedly connected to one end of the slave closing wire 550 away from the execution assembly 20. When the master transmission basal body 410 engages with the slave transmission basal body 510, the master closing slidable block 441 abuts against the slave closing block 540. When the master closing slidable block 441 moves under a pull of the master closing wire 460, the master closing slidable block 441 drives the slave closing slidable block to move in the direction of tightening the slave closing wire 550, and at the same time, the master closing slidable block 441 compresses the master resetting member 442, the master resetting member 442 pushes the master closing slidable block 441 in the direction of releasing the slave closing wire 550. The master resetting member 442 may push the master closing slidable block 441 to reset when the tension force on the master closing wire 460 disappears, thereby allowing the execution assembly 20 to open. Alternatively, the master resetting member 442 may be a spring or elastic rubber or the like. Further, a closing protrusion 443 is arranged on the master closing slidable block 441, and a closing groove 541 is disposed on the slave closing block 540. When the master transmission basal body 410 engages with the slave transmission basal body 510, the closing protrusion 443 on the master closing slidable block 441 engages with the closing groove 541 on the slave closing block 540. The closing protrusion 443 and the closing groove 541 may enhance the stability of the connection between the slave closing block 540 and the master closing slidable block 441.

In an embodiment of the present application, as shown in FIG. 53, the slave transmission mechanism 500 further includes an opening part. The opening part is drivably connected to the execution assembly 20. The opening part keeps the execution assembly 20 in an open state when the opening part acts alone. The opening part may drive the execution assembly 20 in a closed state to open. As an implementable embodiment, the opening part includes an opening spring 560. An opening pin roll 519 is disposed on the slave transmission basal body 510. One end of the opening spring 560 is fixedly connected to the slave transmission basal body 510, and the other end (a free end) of the opening spring 560 is connected to the execution assembly 20 through an opening wire 580, and after winding through the opening pin roll 519, the opening wire 580 is fixedly connected to the free end of the opening spring 560. When the execution assembly 20 is in the closed state, the opening spring 560 is in a pulled state, and when the tension of the master closing wire 460 disappears, the master resetting member 442 pushes the master closing slidable block 441 to reset, while the opening spring 560 restores at least part of its elasticity and then drives the execution assembly 20 to open.

In an embodiment of the present application, as shown in FIG. 1, FIG. 53, FIGS. 56-57 and FIG. 59, the master transmission basal body 410 and the slave transmission basal body 510 are both in a shape of a shell. The master transmission basal body 410 and the slave transmission basal body 510 each surround and form a cavity with an opening. The master transmitting member and the slave transmitting member are respectively disposed in the corresponding cavities. When the master transmission basal body 410 engages with the slave transmission basal body 510, the master transmitting member and the slave transmitting member are drivably connected at the openings of the corresponding cavities. The shell-type master transmission basal body 410 and slave transmission basal body 510 may realize a protection for the master transmitting member and the slave transmitting member, and may also reduce the weight of the connection assembly 40. Further, the master transmission basal body 410 and the slave transmission basal body 510 are detachably and fixedly connected to each other through a snap connection or a screw connection, and these two modes may realize the detachable and fixed connection between the master transmission basal body 410 and the slave transmission basal body 510, which have the advantages of stable connection and being used repeatedly.

Figure 55:
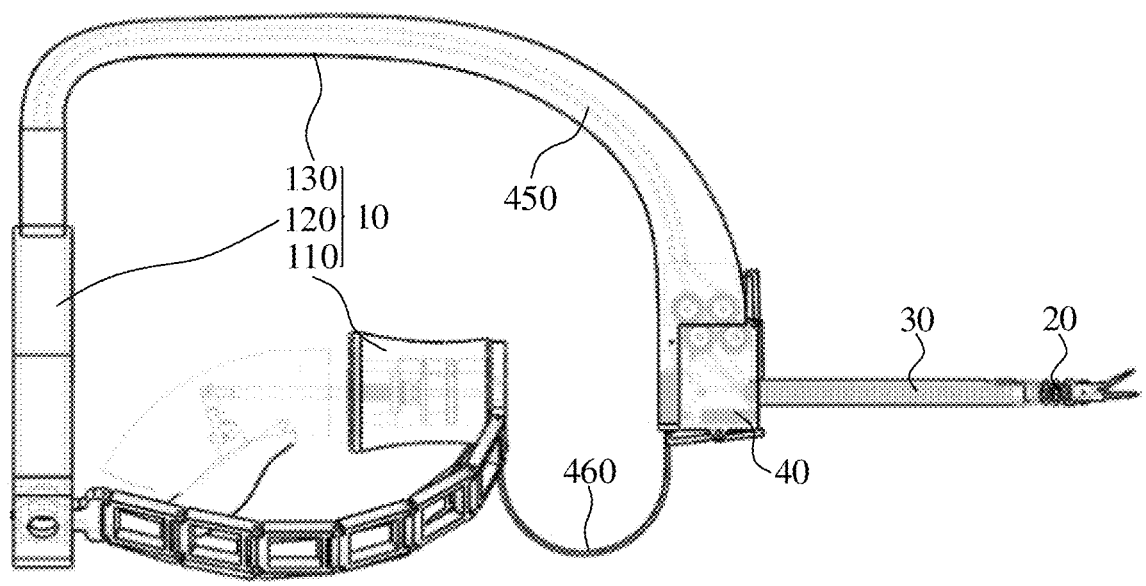
FIG. 55 is a schematic plane structure view of a minimally invasive surgical instrument according to an embodiment of the present application.

As an implementable embodiment, as shown in FIG. 53 and FIG. 55, the connection assembly 40 further includes a first claw 511 and a second claw 512. The first claw 511 and the second claw 512 each are rotatably disposed on the slave transmission basal body 510, and the first claw 511 and the second claw 512 may clamp the master transmission basal body 410 in directions perpendicular to each other. Torsion springs are arranged at the rotation shafts of the first claw 511 and the second claw 512, respectively. Driven by the corresponding torsion springs, the first claw 511 and the second claw 512 rotate in the directions of clamping the master transmission basal body 410. The first claw 511 may engage with the first buckle 411 on the master transmission basal body 410, and the second claw 512 may engage with the second buckle 412 on the master transmission basal body 410. When the device is intended to be quickly disassembled, it is only needed to grasp the connecting rod 30 with hand, hold the second claw 512 with thumb, and press against the first claw 511 with index finger to force the two jaws to be opened, and move downwards to force the four pairs of line winding gears to be separated from each other, and to force the master closing slidable block 441 and the slave closing block 540 to be separated from each other. It should be noted that disassembly and assembly had better be performed when the pitching and the deflection of the execution assembly 20 are 0 degree and when the opening and closing angle is the largest, which may ensure the same conditions of use after the instrument is changed each time. Optionally, the first claw 511 and the second claw 512 may also clamp the master transmission basal body 410 in directions not perpendicular to each other, for example, the first claw 511 and the second claw 512 have an included angle of 30 degrees, 45 degrees, 60 degrees, 75 degrees or 120 degrees, etc.

In a normal state, the first claw 511 rotates counterclockwise under the action of the torsion spring, and the second claw 512 rotates clockwise under the action of the torsion spring. When the hand grasps the connecting rod 30, the thumb holds the second claw 512, and the index finger presses against the first claw 511, thus the two jaws may be opened. Then a detachable box is close to an interface of the frame 130, and after the four pairs of gears and two joints engage, respectively, the thumb and the index finger are removed, and the first claw 511 and the second claw 512 may automatically rotate under the action of the torsion springs to clamp the first buckle 411 and the second buckle 412, respectively, as shown in FIG. 55.

Figure 58:
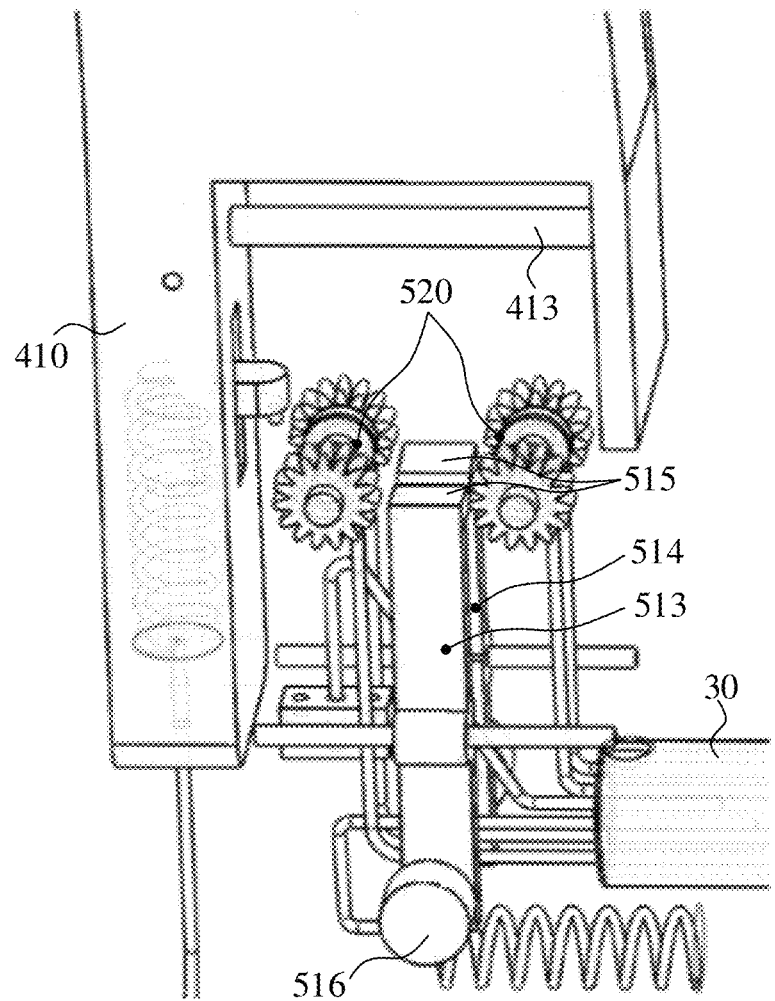
FIG. 58 is a schematic first three-dimensional structural view of a connection assembly according to another embodiment of the present application.
Figure 59:
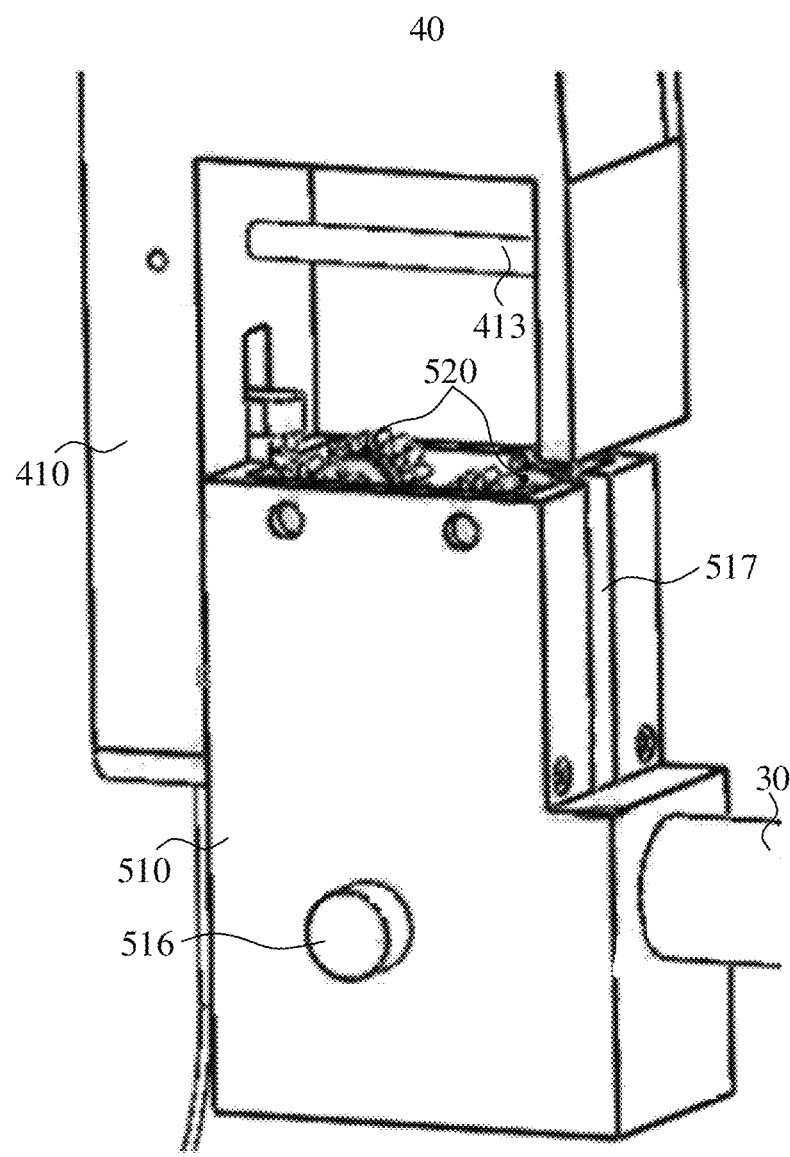
FIG. 59 is a schematic assembly structure view of the connection assembly according to another embodiment of the present application.
Figure 60:
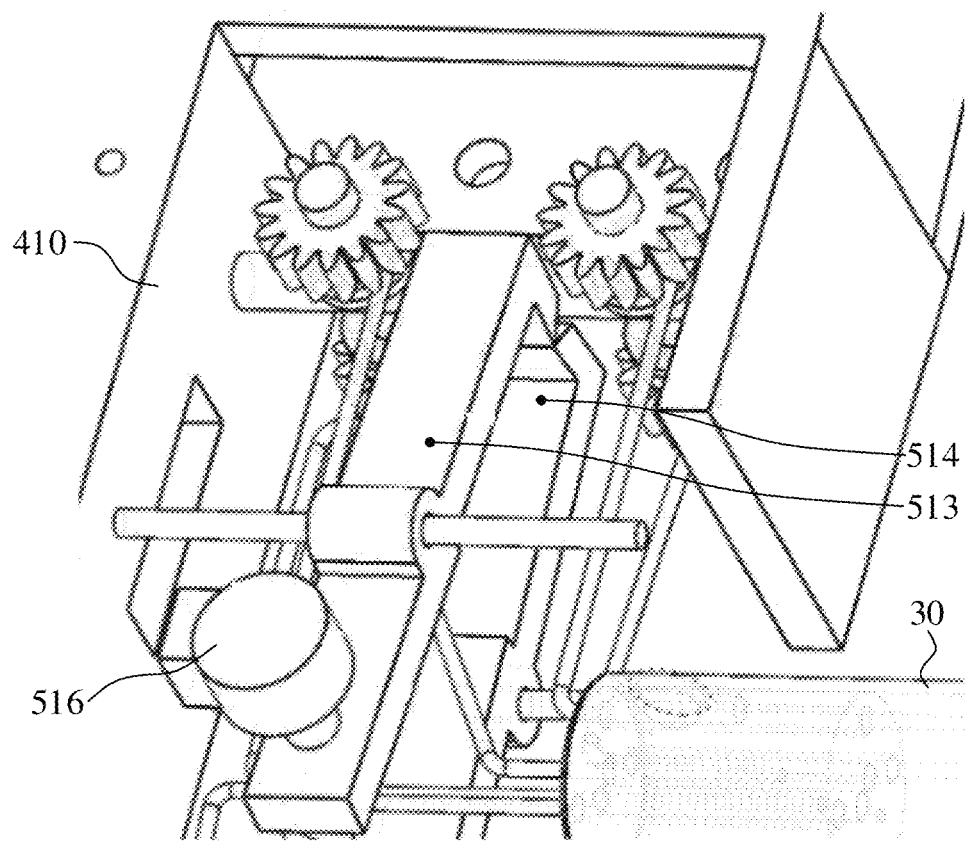
FIG. 60 is a schematic second three-dimensional structural view of the connection assembly according to another embodiment of the present application.

As another implementable embodiment, as shown in FIGS. 58-60, the connection assembly 40 further includes a third claw 513 and a fourth claw 514. Two ends of the third claw 513 and two ends of the fourth claw 514 are clamping ends 515 and pressing ends, respectively. A middle portion of the third claw 513 and a middle portion of the fourth claw 514 each are rotatably arranged on the slave transmission basal body 510. Torsion springs are provided at the rotation shafts of the third claw 513 and the fourth claw 514, respectively, and the clamping end 515 of the third claw 513 and the clamping end 515 of the fourth claw 514 are driven by the corresponding torsion springs, respectively, to come close to each other and form a clamping slot 517. A positioning lever 413 is arranged on the master transmission basal body 410. When the master transmission basal body 410 engages with the slave transmission basal body 510, the positioning lever 413 is clamped into the clamping slot 517 formed by the clamping end 515 of the third claw 513 and the clamping end 515 of the fourth claw 514. When the pressing end of the third claw 513 and the pressing end of the fourth claw 514 are pressed, the clamping end 515 of the third claw 513 and the clamping end 515 of the fourth claw 514 move away from each other, and the third claw 513 and the fourth claw 514 release the positioning lever 413. Correspondingly, a positioning groove is disposed on the slave transmission basal body 510, and the positioning groove may evade the positioning lever 413 in the process of clamping the positioning lever 413.

Further, main bodies of the third claw 513 and fourth claw of 514 are disposed inside the slave transmission basal body 510, and buttons 516 are provided at the pressing ends of the third claw 513 and fourth claw 514, respectively, and the buttons 516 pass through the slave transmission basal body 510 to the outside. An operator presses the buttons 516 to press the pressing ends of the third claw 513 and the fourth claw 514.

Further, as shown in FIGS. 58-60, the pressing end of the third claw 513 is in a shape of a slanted surface, and the pressing end of the fourth claw 514 is also in a shape of a slanted surface. The pressing end of the third claw 513 and the pressing end of the fourth claw 514 form V-shaped surfaces. When the master transmission basal body 410 engages with the slave transmission basal body 510, the positioning lever 413 pushes the V-shaped surfaces to move in directions away from each other, and the positioning lever 413 is clamped into the clamping slot 517. The third claw 513 and the fourth claw 514 provided by this embodiment may make it convenient for the operator to directly engage the master transmission basal body 410 with the slave transmission basal body 510 to realize the stable connection therebetween.

In an embodiment of the present application, as shown in FIG. 1 and FIG. 55, the main control assembly 10 and the master transmission mechanism 400, and the execution assembly 20 and the slave transmission mechanism 500 are connected by wires, respectively. The wire between the execution assembly 20 and the slave transmission mechanism 500 passes through the connecting rod 30. The slave transmission basal body 510 and the connecting rod 30 are fixedly connected by the connection assembly 40 or by integral molding. The master transmission basal body 410 and the main control assembly 10 are fixedly connected by the connection assembly 40, or the master transmission basal body 410 and the terminal end of the main control assembly 10 are integrally formed. Further, the types of execution assembly 20 include a forceps instrument, a scissor instrument, a hook instrument, and a puncturing instrument. The wire between the main control assembly 10 and the master transmission mechanism 400 at least partially passes through frame 130.

The technical features of the embodiments above may be combined arbitrarily. In order to make the description concise, not all possible combinations of the technical features of the embodiments above are described. However, as long as there is no contradiction in the combinations of these technical features, the combinations should be considered to be within the range described in this specification. For example, the minimally invasive surgical instrument formed by the combination of any embodiment of the attachment assembly, any embodiment of the control handle, and any embodiment of the series joint should also be considered to be within the scope of this specification.

The embodiments above are merely some embodiments for illustrating the present invention, and the description for the embodiments are relatively specific and detailed, but should not be construed as a limitation on the scope of the patent application. It should be noted that for those of ordinary skill in the art, various modifications and improvements may also be made without departing from the concept of the present invention, and these modifications and improvements all belong to the protection scope of the present invention. Therefore, the protection scope of the present invention should be subject to the appended claims.

What is claimed is:

1. A series motion mechanism, characterized by comprising:
    an attachment assembly;
    a control handle; and
    a series joint, comprising two joints, wherein rotation axes of the two joints are perpendicular to each other, the control handle and the attachment assembly are connected by the series joint to resolve a motion state of the control handle and convert the motion state into joint motions of the series joint; wherein the series joint comprises:
        a deflection assembly; and
        a pitching assembly;
        wherein the deflection assembly is rotatably connected to the control handle through the pitching assembly to form a pitching rotation joint; the deflection assembly is further rotatably connected to the attachment assembly to form a deflection rotation joint; a rotation axis of the pitching rotation joint is perpendicular to a rotation axis of the deflection rotation joint;
        wherein the deflection assembly comprises a traction frame; a rotation groove and a sliding slot are disposed on the traction frame; the attachment assembly is rotatably connected to the rotation groove; the pitching assembly is movably connected into the sliding slot, and is slidable in the sliding slot and rotatable relative to the traction frame; and
        wherein the number of the sliding slots is two, and the two sliding slots are arranged on two sides of the traction frame, respectively; the deflection assembly further comprises a deflection pulley, a tension pulley, and a connecting piece, which are sequentially connected and are all disposed inside the rotation groove; the deflection pulley is provided with a deflection wire slot, and the deflection wire slot is arranged to surround the deflection pulley; the tension pulley is provided with a first through hole; the connecting piece is provided with a second through hole; and the first through hole and the second through hole are concentric.

2. The series motion mechanism according to claim 1, wherein the pitching assembly comprises a connecting frame, a pitching pulley, a wiring member, and a connecting shaft; the wiring member is fixedly connected to the connecting frame; the pitching pulley is disposed inside the sliding slots; the pitching pulley and the wiring member are connected by the connecting shaft; and a pitching wire slot is disposed on the pitching pulley, and the pitching wire slot is arranged to surround the pitching pulley.

3. The series motion mechanism according to claim 2, wherein the pitching assembly further comprises a sliding block and a sliding bearing; the sliding block is connected to the wiring member, and is disposed outside the sliding slot and is in contact with the traction frame; and the sliding bearing is sleeved on the connecting shaft and in contact with an inner side wall of the sliding slot.

4. A minimally invasive surgical instrument, characterized by comprising:
    a main control assembly, comprising the series motion mechanism of claim 1;
    an execution assembly; and
    a connection assembly, disposed between the main control assembly and the execution assembly, and comprising:
        a master transmission mechanism, comprising a master transmission basal body and a master transmitting member, the master transmission basal body being fixedly connected to the main control assembly configured to output an execution action, the master transmitting member being disposed on the master transmission basal body, and the master transmitting member being further drivably connected to the main control assembly;
        a slave transmission mechanism, comprising a slave transmission basal body and a slave transmitting member, the slave transmission basal body being fixedly connected to the execution assembly configured to receive an execution action, the slave transmitting member being disposed on the slave transmission basal body, and the slave transmitting member being further drivably connected to the execution assembly;
    wherein, the master transmission basal body is detachably engaged with the slave transmission basal body; and when the master transmission basal body engages with the slave transmission basal body, the master transmitting member is drivably connected to the slave transmitting member.

5. The minimally invasive surgical instrument of claim 4, wherein the master transmitting member comprises a first master transmitting part and a second master transmitting part; the first master transmitting part and the second master transmitting part are fixedly connected; the first master transmitting part and the second master transmitting part are arranged on the master transmission basal body; the first master transmitting part is drivably connected to the main control assembly; the slave transmitting member comprises a first slave transmitting part and a second slave transmitting part; the first slave transmitting part and the second slave transmitting part are fixedly connected; the first slave transmitting part and the second slave transmitting part are arranged on the slave transmission basal body; the first slave transmitting part is drivably connected to the execution assembly; when the master transmission basal body engages with the slave transmission basal body, the second master transmitting part is drivably connected to the second slave transmitting part.

6. The minimally invasive surgical instrument of claim 5, wherein both the second master transmitting part and the second slave transmitting part comprise gears; the second master transmitting part and the second slave transmitting part constitute a gear pair; and when the master transmission basal body engages with the slave transmission basal body, the second master transmitting part engages with the second slave transmitting part to realize a transmission.

7. The minimally invasive surgical instrument of claim 5, wherein the second master transmitting part comprises a polygonal shaft or a polygonal slot; the second slave transmitting part comprises a polygonal slot or a polygonal shaft; when the master transmission basal body engages with the slave transmission basal body, the second master transmitting part engages with the second slave transmitting part by plugging.

8. The minimally invasive surgical instrument according to claim 5, wherein the first master transmitting part and the second master transmitting part engage, and the first slave transmitting part and the second slave transmitting part engage, to realize a transmission and drive the execution assembly to pitch and/or deflect;

the master transmitting member further comprises a master closing part; the master closing part is arranged on the master transmission basal body, and is drivably connected to the main control assembly; the slave transmitting member further comprises a slave closing part; the slave closing part is arranged on the slave transmission basal body, and drivably connected to the execution assembly; when the master transmission basal body engages with the slave transmission basal body, the master closing part is drivably connected to the slave closing part; and when the master closing part is actuated by the main control assembly, the master closing part actuates the slave closing part to control the execution assembly to close.

9. The minimally invasive surgical instrument according to claim 8, wherein the master closing part and the main control assembly are connected through a master closing wire; the master closing part is slidably arranged on the master closing basal body; the slave closing part and the execution assembly are connected through a slave closing wire; the slave transmission basal body is provided with a closing pin roll, and the closing pin roll allows one end of the slave closing wire proximate to the slave closing part to pass and to change an extension direction.

10. The minimally invasive surgical instrument according to claim 9, wherein the master closing part comprises a master closing slidable block and a master resetting member; the master closing slidable block is slidably arranged on the master closing basal body; the master closing slidable block is fixedly connected to a control handle in the main control assembly through the master closing wire; the master resetting member is arranged between the master transmission basal body and the master closing slidable block; the slave closing part comprises a slave closing block; the slave closing block is fixedly connected to one end of the slave closing wire away from the execution assembly; when the master transmission basal body engages with the slave transmission basal body, the master closing slidable block abuts against the slave closing block; when the master closing slidable block moves under a pull of the master closing wire, the master closing slidable block drives the slave closing slidable block to move in a direction of tightening the slave closing wire, and at the same time, the master closing slidable block compresses the master resetting member, and the master resetting member pushes the master closing slidable block in a direction of releasing the slave closing wire.

11. The minimally invasive surgical instrument of claim 8, wherein the slave transmission mechanism further comprises an opening part; the opening part is drivably connected to the execution assembly; and the opening part keeps the execution assembly in an open state when the opening part acts alone.

12. The minimally invasive surgical instrument of claim 5, wherein the master transmitting member comprises four groups of first master transmitting parts and second master transmitting parts; four first master transmitting parts each are drivably connected to the main control assembly; the slave transmitting member comprises four groups of first slave transmitting parts and second slave transmitting parts; four first slave transmitting parts each are drivably connected to the execution assembly; four second master transmitting parts each are drivably connected to a corresponding second slave transmitting part; the four groups of first master transmitting parts and second master transmitting parts, and the four groups of first slave transmitting parts and second slave transmitting parts, are configured to drive the execution assembly to realize a down motion, an up motion, a left deflection or a right deflection, respectively.

13. The minimally invasive surgical instrument according to claim 4, wherein the master transmission basal body and the slave transmission basal body are both in a shape of a shell; the master transmission basal body and the slave transmission basal body each surround and form a cavity with an opening; the master transmitting member and the slave transmitting member are disposed in corresponding cavities, respectively; when the master transmission basal body engages with the slave transmission basal body, the master transmitting member and the slave transmitting member are drivably connected at the openings of the corresponding cavities; and the master transmission basal body and the slave transmission basal body are detachably and fixedly connected to each other through a snap connection or a screw connection.

14. The minimally invasive surgical instrument according to claim 13, wherein the connection assembly further comprises a first claw and a second claw; the first claw and the second claw each are rotatably disposed on the slave transmission basal body; the first claw and the second claw are configured to clamp the master transmission basal body; torsion springs are arranged at rotation shafts of the first claw and the second claw, respectively; and driven by the corresponding torsion springs, the first claw and the second claw rotate in directions of clamping the master transmission basal body.

15. The minimally invasive surgical instrument according to claim 13, wherein the connection assembly further comprises a third claw and a fourth claw; two ends of the third claw and two ends of the fourth claw are clamping ends and pressing ends, respectively; a middle portion of the third claw and a middle portion of the fourth claw each are rotatably arranged on the slave transmission basal body; torsion springs are provided at rotation shafts of the third claw and the fourth claw, respectively; the clamping end of the third claw and the clamping end of the fourth claw are driven by corresponding torsion springs, respectively, to come close to each other and form a clamping slot; a positioning lever is arranged on the master transmission basal body; when the master transmission basal body engages with the slave transmission basal body, the positioning lever is clamped into the clamping slot formed by the clamping end of the third claw and the clamping end of the fourth claw; and when the pressing end of the third claw and the pressing end of the fourth claw are pressed, the clamping end of the third claw and the clamping end of the fourth claw move away from each other, and the third claw and the fourth claw release the positioning lever.

16. The minimally invasive surgical instrument according to claim 15, wherein the pressing end of the third claw is in a shape of a slanted surface; the pressing end of the fourth claw is also in a shape of a slanted surface; the pressing end of the third claw and the pressing end of the fourth claw form V-shaped surfaces; when the master transmission basal body engages with the slave transmission basal body, the positioning lever pushes the V-shaped surfaces to move in directions away from each other; and the positioning lever is clamped into the clamping slot.

17. The minimally invasive surgical instrument according to claim 4, wherein the minimally invasive surgical instrument further comprises a hollow connecting rod; one end of the connecting rod is connected to the execution assembly; the other end of the connecting rod is fixedly connected to the slave transmission basal body; the main control assembly and the master transmission mechanism, and the execution assembly and the slave transmission mechanism are connected by wires, respectively; the wire between the execution assembly and the slave transmission mechanism passes through the connecting rod; the slave transmission basal body and the connecting rod are fixedly connected by the connection assembly or by integral molding; and the master transmission basal body and the main control assembly are fixedly connected by the connection assembly, or the master transmission basal body and a terminal end of the main control assembly are integrally formed.

* * * * *